United States Patent
Hance et al.

(10) Patent No.: US 10,822,170 B2
(45) Date of Patent: Nov. 3, 2020

(54) WAREHOUSE AND SUPPLY-CHAIN COORDINATOR

(71) Applicant: Google LLC, Mountain View, CA (US)

(72) Inventors: Chris Hance, San Jose, CA (US); Thibault Vrevin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 180 days.

(21) Appl. No.: 16/110,014

(22) Filed: Aug. 23, 2018

(65) Prior Publication Data

US 2019/0066035 A1 Feb. 28, 2019

Related U.S. Application Data

(60) Provisional application No. 62/551,181, filed on Aug. 28, 2017.

(51) Int. Cl.
| | |
|---|---|
| *G06Q 10/08* | (2012.01) |
| *B65G 1/137* | (2006.01) |
| *G01C 21/34* | (2006.01) |
| *B65G 67/04* | (2006.01) |
| *G05D 1/02* | (2020.01) |

(52) U.S. Cl.
CPC ............ *B65G 1/1373* (2013.01); *B65G 1/137* (2013.01); *B65G 67/04* (2013.01); *G01C 21/343* (2013.01); *G01C 21/3407* (2013.01); *G05D 1/021* (2013.01); *G06Q 10/08* (2013.01); *G06Q 10/083* (2013.01); *G06Q 10/087* (2013.01);

(Continued)

(58) Field of Classification Search
CPC .......... G06Q 10/08; G06Q 10/04; B07C 3/18; G05D 2201/0216
See application file for complete search history.

(56) References Cited

U.S. PATENT DOCUMENTS

| | | | |
|---|---|---|---|
| 5,625,559 A | 4/1997 | Egawa | |
| 6,148,291 A * | 11/2000 | Radican | G06Q 10/08 705/22 |

(Continued)

OTHER PUBLICATIONS http://freightwhisperer.com/2016/12/11/what-does-ltl-stand-for-in-the-transportation-trucking-industry/ (http://freightwhisperer.com/2016/12/11/what-does-ltl-stand-for-in-the-transportation-trucking-industry/.

(Continued)

*Primary Examiner* — Oluseye Iwarere
(74) *Attorney, Agent, or Firm* — McDonnell Boehnen Hulbert & Berghoff LLP

(57) ABSTRACT

Systems and methods related to coordinating warehouses and supply chains are provided. Respective first and second estimated times of arrival at a loading dock of a warehouse are determined for respective first and second vehicles, where the first estimated arrival time is before the second estimated arrival time. A pallet arrangement at the loading dock is determined that includes a first pallet for the first vehicle and a second pallet for the second vehicle, where the first pallet is closer to the loading dock than the second pallet. The first estimated arrival time later changes to be after the second estimated arrival time. After the first estimated arrival time changes to be after the second estimated arrival time, a robot is instructed to modify the arrangement so that the second pallet is closer to the loading dock than the first pallet before the second estimated arrival time.

17 Claims, 25 Drawing Sheets

(52) U.S. Cl.
CPC ... *G06Q 10/0833* (2013.01); *G06Q 10/08355* (2013.01); *G05D 2201/0216* (2013.01)

(56) References Cited

U.S. PATENT DOCUMENTS

| | | | |
|---|---|---|---|
| 7,055,741 B2 | 6/2006 | Bong et al. | |
| 7,770,792 B2 | 8/2010 | Bruns et al. | |
| 7,840,429 B2* | 11/2010 | Benda | G06Q 10/04 705/7.11 |
| 8,075,238 B2 | 12/2011 | Wirz et al. | |
| 8,478,619 B2* | 7/2013 | Benda | G06Q 10/04 705/7.11 |
| 8,639,591 B1 | 1/2014 | Mishra et al. | |
| 8,744,884 B2* | 6/2014 | Benda | G06Q 10/04 705/7.11 |
| 8,756,089 B2* | 6/2014 | Benda | G06Q 10/04 705/7.11 |
| 8,756,090 B2* | 6/2014 | Benda | G06Q 10/04 705/7.11 |
| 8,892,241 B2 | 11/2014 | Weiss | |
| 8,965,562 B1 | 2/2015 | Wurman et al. | |
| 9,047,579 B2 | 6/2015 | Goh et al. | |
| 9,111,251 B1 | 8/2015 | Brazeau | |
| 9,120,622 B1 | 9/2015 | Elazary et al. | |
| 9,367,827 B1* | 6/2016 | Lively | G06Q 10/08355 |
| 9,561,941 B1* | 2/2017 | Watts | B66F 9/063 |
| 9,616,335 B2 | 4/2017 | Grissom et al. | |
| 9,965,730 B2* | 5/2018 | Hance | B65G 57/02 |
| 9,984,339 B2* | 5/2018 | Hance | B65G 1/0492 |
| 10,083,406 B2* | 9/2018 | Hance | B65G 61/00 |
| 10,133,990 B2* | 11/2018 | Hance | G06Q 10/043 |
| 10,147,059 B2* | 12/2018 | Sullivan | G06Q 10/047 |
| 10,282,694 B2* | 5/2019 | Jones | G06Q 10/08355 |
| 10,380,534 B2* | 8/2019 | Khasis | G01C 21/3415 |
| 10,453,002 B2* | 10/2019 | Hance | B65G 57/02 |
| 10,504,055 B2* | 12/2019 | Hance | G06Q 10/043 |
| 2002/0143862 A1 | 10/2002 | Peterson | |
| 2004/0146380 A1 | 7/2004 | Baker et al. | |
| 2005/0197876 A1* | 9/2005 | Benda | G06Q 10/08355 705/333 |
| 2006/0282284 A1* | 12/2006 | Daniel | G06Q 10/08 705/80 |
| 2007/0276558 A1 | 11/2007 | Kim | |
| 2008/0077511 A1 | 3/2008 | Zimmerman | |
| 2008/0131255 A1 | 6/2008 | Hessler et al. | |
| 2009/0063233 A1* | 3/2009 | Kumar | G06Q 10/06 705/28 |
| 2009/0119010 A1 | 5/2009 | Moravec | |
| 2009/0180667 A1 | 7/2009 | Mahan et al. | |
| 2009/0198376 A1 | 8/2009 | Friedman et al. | |
| 2010/0121481 A1 | 5/2010 | Talley et al. | |
| 2010/0249988 A1* | 9/2010 | Baldes | B65G 61/00 700/217 |
| 2011/0029414 A1* | 2/2011 | Benda | G06Q 10/06375 705/28 |
| 2011/0029446 A1* | 2/2011 | Benda | G06Q 10/063 705/330 |
| 2011/0029448 A1* | 2/2011 | Benda | G06Q 10/06316 705/338 |
| 2011/0035327 A1* | 2/2011 | Benda | G06Q 10/08 705/336 |
| 2011/0295411 A1 | 12/2011 | Rotella et al. | |
| 2012/0030070 A1 | 2/2012 | Keller et al. | |
| 2012/0166247 A1 | 6/2012 | Tu et al. | |
| 2012/0330458 A1* | 12/2012 | Weiss | B66F 9/063 700/216 |
| 2013/0173049 A1 | 7/2013 | Brunner et al. | |
| 2013/0317642 A1 | 11/2013 | Asaria et al. | |
| 2014/0267703 A1 | 9/2014 | Taylor et al. | |
| 2014/0277691 A1* | 9/2014 | Jacobus | B66F 9/063 700/216 |
| 2014/0278097 A1 | 9/2014 | Khorsheed et al. | |
| 2014/0285330 A1* | 9/2014 | Kouhia | B66C 19/002 340/425.5 |
| 2014/0297553 A1* | 10/2014 | Benda | G06Q 10/06375 705/337 |
| 2014/0350725 A1 | 11/2014 | LaFary et al. | |
| 2014/0354809 A1 | 12/2014 | Shondel | |
| 2015/0057793 A1 | 2/2015 | Kawano | |
| 2015/0073586 A1 | 3/2015 | Weiss | |
| 2015/0088302 A1 | 3/2015 | Mountz et al. | |
| 2015/0139766 A1 | 5/2015 | Cousins | |
| 2015/0332213 A1 | 11/2015 | Galluzzo et al. | |
| 2015/0360865 A1 | 12/2015 | Massey | |
| 2015/0363758 A1 | 12/2015 | Wu et al. | |
| 2016/0042312 A1 | 2/2016 | Siebrecht et al. | |
| 2016/0129592 A1 | 5/2016 | Saboo et al. | |
| 2016/0350701 A1* | 12/2016 | Brehm | G05D 1/0297 |
| 2017/0046658 A1* | 2/2017 | Jones | G06Q 10/083 |
| 2017/0080566 A1 | 3/2017 | Stubbs et al. | |
| 2017/0200248 A1* | 7/2017 | Murphy | B65G 1/137 |
| 2017/0337511 A1* | 11/2017 | Shroff | G06F 16/9537 |
| 2018/0060764 A1* | 3/2018 | Hance | G06Q 10/06315 |
| 2018/0060765 A1* | 3/2018 | Hance | B65G 57/02 |
| 2018/0068255 A1* | 3/2018 | Hance | G06Q 10/087 |
| 2018/0099751 A1* | 4/2018 | Murphy | B64F 1/368 |
| 2018/0158020 A1* | 6/2018 | Khasis | G01C 21/3453 |
| 2018/0200761 A1* | 7/2018 | Putcha | G06Q 50/28 |
| 2018/0225597 A1* | 8/2018 | Hance | B65G 1/0492 |
| 2018/0232668 A1* | 8/2018 | Hance | B65G 57/02 |
| 2018/0300835 A1* | 10/2018 | Saboo | B25J 5/007 |
| 2018/0357601 A1* | 12/2018 | Jacobus | B66F 9/063 |
| 2018/0365603 A1* | 12/2018 | Hance | B65G 61/00 |
| 2019/0066041 A1* | 2/2019 | Hance | G06Q 10/083 |
| 2019/0347614 A1* | 11/2019 | Khasis | G01C 21/3415 |

OTHER PUBLICATIONS

Motorola White Paper, "The Synchronized Distribution Supply Chain: Best Practices in Warehouse Management," Motorola, Inc.; motorola.com/supplychainmobility, Mar. 2011.

* cited by examiner

2500

2510 Determine a first estimated arrival time for a first vehicle at a loading dock of a warehouse

2520 Determine a second estimated arrival time for a second vehicle at the loading dock of the warehouse, where the first estimated arrival time is before the second estimated arrival time

2530 Determine an pallet arrangement at the loading dock of the warehouse, where the pallet arrangement includes a first pallet associated with the first vehicle and the second pallet associated with the second vehicle, and where the first pallet is closer to the loading dock than the second pallet

2540 After determining the pallet arrangement, determining that the first estimated arrival time has changed to be after the second estimated arrival time

2550 After determining that the first estimated arrival time has changed to be after the second estimated arrival time, instructing a robot to modify the pallet arrangement so that the second pallet is closer to the loading dock than the first pallet before the second estimated arrival time

FIG. 25

WAREHOUSE AND SUPPLY-CHAIN COORDINATOR

CROSS REFERENCE TO RELATED APPLICATION

The present application claims priority to U.S. Provisional patent application Ser. No. 62/551,181 filed on Aug. 28, 2017, the entire contents of which is incorporated herein by reference, as if fully set forth in this description.

BACKGROUND

One or more robots and/or other actors, such as human actors, human-driven vehicles, and autonomous vehicles, can operate throughout a supply chain. The supply chain can include various regions, such as buildings, roadways, flight routes, and seaways. Some of these regions are associated with one or more spaces, such as the interior of part or all of a building and/or its surrounding outdoor regions, where robots and/or the other actors perform tasks and/or otherwise utilize the space(s) together.

An example building in a supply chain is a warehouse, which may be used for storage of goods by a variety of different types of commercial entities, including manufacturers, wholesalers, and transport businesses. Example stored goods may include raw materials, parts or components, packing materials, and finished goods. The warehouse can be visited by various vehicles, such as human-driven and/or autonomous trucks, that load and unload goods at the warehouse. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

SUMMARY

In one aspect, a method is provided. A first estimated arrival time for a first vehicle at a loading dock of a warehouse is determined. A second estimated arrival time for a second vehicle at the loading dock of the warehouse is determined. The first estimated arrival time is before the second estimated arrival time. A pallet arrangement at the loading dock of the warehouse is determined. The pallet arrangement includes a first pallet associated with the first vehicle and a second pallet associated with the second vehicle, where the first pallet is closer to the loading dock than the second pallet; after determining the pallet arrangement, the first estimated arrival time is determined to have changed to be after the second estimated arrival time. In response to determining that the first estimated arrival time has changed to be after the second estimated arrival time, a robot is instructed to modify the pallet arrangement so that the second pallet is closer to the loading dock than the first pallet before the second estimated arrival time.

In another aspect, a computing device is provided. The computing device includes one or more processors and data storage. The data storage includes at least computer-executable instructions stored thereon that, when executed by the one or more processors, cause the computing device to perform functions. The functions include: determine a first estimated arrival time for a first vehicle at a loading dock of a warehouse; determine a second estimated arrival time for a second vehicle at the loading dock of the warehouse, where the first estimated arrival time is before the second estimated arrival time; determine a pallet arrangement at the loading dock of the warehouse, where the pallet arrangement includes a first pallet associated with the first vehicle and the second pallet associated with the second vehicle, and where the first pallet is closer to the loading dock than the second pallet; after determining the pallet arrangement, determine that the first estimated arrival time has changed to be after the second estimated arrival time; and in response to determining that the first estimated arrival time has changed to be after the second estimated arrival time, instruct a robot to modify the pallet arrangement so that the second pallet is closer to the loading dock than the first pallet before the second estimated arrival time.

In another aspect, a non-transitory computer readable medium is provided. The non-transitory computer readable medium has stored thereon instructions, that when executed by one or more processors of a computing device, cause the computing device to perform functions. The functions include: determining a first estimated arrival time for a first vehicle at a loading dock of a warehouse; determining a second estimated arrival time for a second vehicle at the loading dock of the warehouse, where the first estimated arrival time is before the second estimated arrival time; determining a pallet arrangement at the loading dock of the warehouse, where the pallet arrangement includes a first pallet associated with the first vehicle and the second pallet associated with the second vehicle, and where the first pallet is closer to the loading dock than the second pallet; after determining the pallet arrangement, determining that the first estimated arrival time has changed to be after the second estimated arrival time; and after determining that the first estimated arrival time has changed to be after the second estimated arrival time, instructing a robot to modify the pallet arrangement so that the second pallet is closer to the loading dock than the first pallet before the second estimated arrival time.

In another aspect, a device is provided. The device includes: means for determining a first estimated arrival time for a first vehicle at a loading dock of a warehouse; means for determining a second estimated arrival time for a second vehicle at the loading dock of the warehouse, where the first estimated arrival time is before the second estimated arrival time; means for determining a pallet arrangement at the loading dock of the warehouse, where the pallet arrangement includes a first pallet associated with the first vehicle and the second pallet associated with the second vehicle, and where the first pallet is closer to the loading dock than the second pallet; means for, after determining the pallet arrangement, determining that the first estimated arrival time has changed to be after the second estimated arrival time; and means for, after determining that the first estimated arrival time has changed to be after the second estimated arrival time, instructing a robot to modify the pallet arrangement so that the second pallet is closer to the loading dock than the first pallet before the second estimated arrival time.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 25 is a flowchart of another method, in accordance with an example embodiment.

DETAILED DESCRIPTION

Coordinated Logistics and Warehouse Manager

Figure 1:
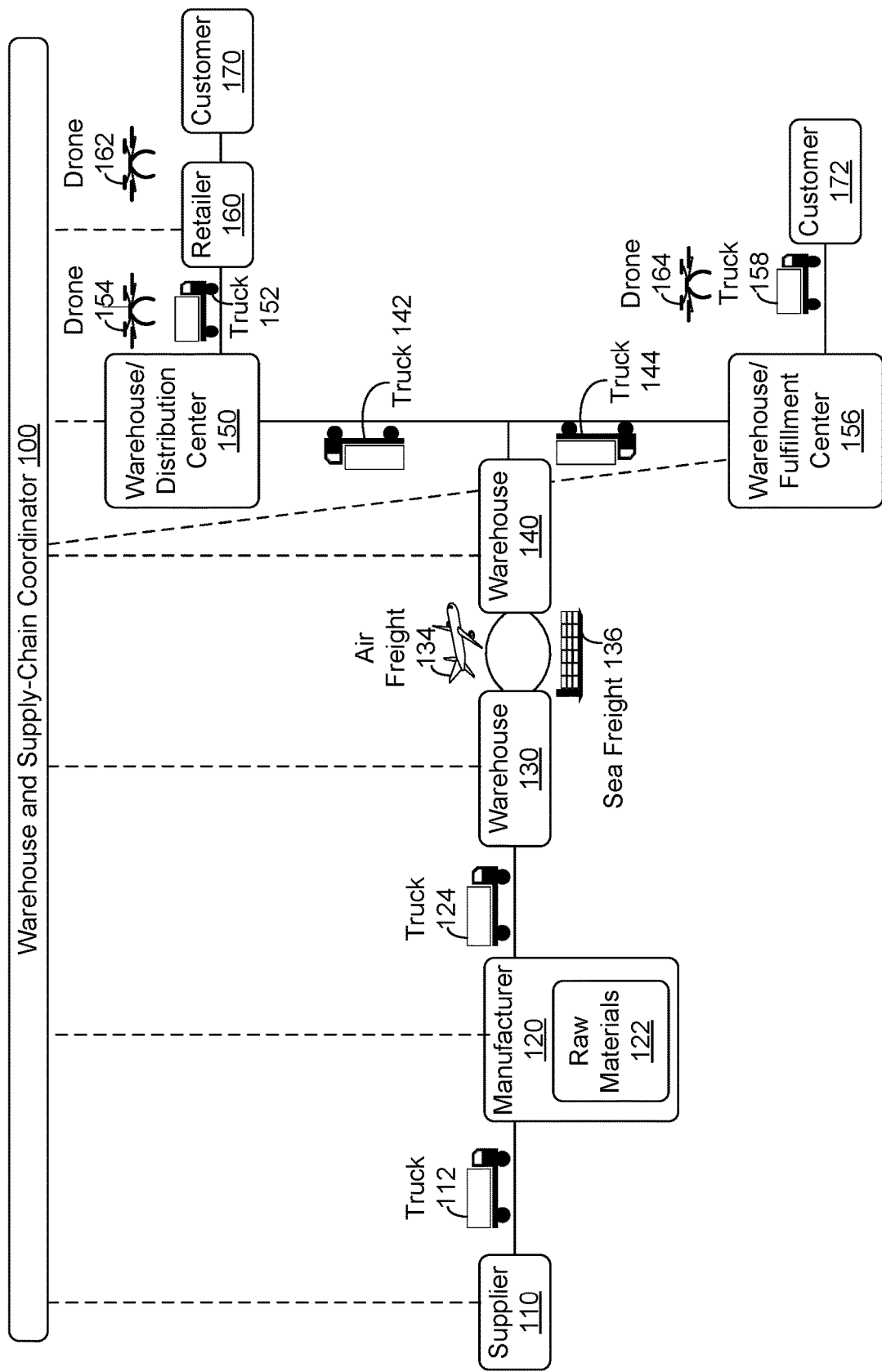
FIG. 1 is a diagram of a supply chain, in accordance with an example embodiment.

A warehouse and supply-chain coordinator is disclosed herein. The warehouse and supply-chain coordinator can coordinate and optimize various elements in one or more supply chains. The warehouse and supply-chain coordinator can receive data from multiple data sources and computer systems, such as, but not limited to: warehouse management systems (WMSs) operating in different warehouses, transportation systems, including freight brokering systems and/or in-vehicle monitoring systems for real-time estimated time of arrival (ETA) estimates, and demand forecasting systems. Some or all of the herein-described functionality of the warehouse and supply-chain coordinator can be implemented using software executing one or more (networked) computing devices; i.e., the warehouse and supply-chain coordinator can be software executing in the "cloud".

The warehouse and supply-chain coordinator can provide services including, but not limited to: warehouse control services; robotic control services for controlling robots in a warehouse and/or autonomous vehicles; services for coordination of replenishment of inventory from multiple supply chain levels; services for coordinating freight and shipping transactions, including combining partial vehicle loads, increasing vehicle utilization, and decreasing empty miles driven; and services for rationalizing shipping networks. In some examples, the warehouse and supply-chain coordinator is used to control one supply chain; e.g., a supply chain for one company or other enterprise. In other examples, the warehouse and supply-chain coordinator is part of a marketplace and/or ecosystem where service providers for warehousing, freight transportation, etc. are matched with demands for services.

Example warehouse control services include, but are not limited to: yard management services for vehicle arrivals to the warehouse, such as routing trucks and/or other vehicles to appropriate loading docks, staging locations, and/or parking locations; services related to coordinating robots and/or other agents with vehicle arrivals at (a loading dock of) the warehouse based upon vehicle traceability and real-time ETA for maximizing warehouse throughput; services related to controlling robots within the warehouse to move inventory; services for automatic virtual receipt of goods based upon knowledge of vehicle contents and successful robotic unloading; services for "slotting" or locating inventory within the warehouse (e.g., locating inventory based on projected and/or actual stock keeping unit (SKU) velocity), services for "re-slotting" or relocating inventory within the warehouse (e.g., based upon changes in projected and/or actual SKU velocity and/or available warehouse space); services for reallocating inventory between customer orders based upon priority or required shipping time; and services for automatic virtual shipment of goods based upon knowledge of vehicle contents and successful robotic loading.

In this document, unless otherwise explicitly stated, the term "pallet" represents a container of one or more goods that can be brought to, stored at, and/or obtained from a warehouse; e.g, a pallet can include one or more: pallets, boxes, bags, bales, cartons, crates, packages, parcels, and/or other containers (or other objects) associated with goods that can be brought to, stored at, and/or obtained from a warehouse.

For example, the warehouse and supply-chain coordinator can estimate times of arrival and departure for vehicles arriving at and departing from a warehouse or other location. The warehouse and supply-chain coordinator can determine a pallet arrangement based on arrival and/or departure times. For example, a pallet arrangement associated with a loading dock can include a first pallet associated with a first vehicle and a second pallet associated with a second vehicle.

If the first vehicle is scheduled to arrive at the loading dock before the second vehicle, then the first pallet can be located closer to the loading dock than the second pallet, so as to shorten a distance between a location of the first pallet and a location of the first vehicle at the loading dock, and thus reduce loading time of the first vehicle. However, if the estimated time of arrival changes so that the first vehicle is now estimated to arrive after the second vehicle, the warehouse and supply-chain coordinator can responsively order one or more robots to modify the pallet arrangement so that the second pallet is closer to the loading dock than the first pallet, and thus reduce loading time of the second vehicle. Example arrangements of pallets (and/or other objects) can include, but are not limited to, one or more of: a line of pallets (and/or other objects), a regular or irregular grid of pallets (and/or other objects), a stack of pallets (and/or other objects), a cube of pallets (and/or other objects), a pyramid of pallets (and/or other objects), and/or other arrangements of pallets (and/or other objects).

As another example, the warehouse and supply-chain coordinator can manage resources associated with the warehouse, such as loading dock time slots, parking locations, storage spaces (e.g., spaces for storing pallets), warehouse access, and robots at the warehouse. Resources can be managed by reserving or allocating a resource for one or more vehicles, robots, and/or other entities, releasing or deallocating a resource from one or more vehicles, robots, and/or other entities, switching reservations between vehicles, robots, and/or other entities, providing information about managed resources (e.g., a schedule of allocated time slots, data whether a particular parking spot is available at a particular time, information about a location of a robot).

In some cases, resources can be allocated based on estimated and/or actual arrival times; e.g., access to a warehouse can be granted to a vehicle when the vehicle actually arrives at the warehouse, a time slot at a loading dock can be reserved for a vehicle scheduled to arrive at the warehouse during the time slot, a robot can be directed to arrive a loading dock at or about the same time that a vehicle arrives at the loading dock. Then, when an estimated arrival time (or departure time) changes, the warehouse and supply-chain coordinator can: (1) release an original time slot at a loading dock and/or parking spot from a vehicle scheduled to arrive at the changed arrival time (or departure time); (2) reserve the original time slot at the loading dock and/or parking spot for a vehicle scheduled to arrive (or depart) before the changed arrival time (or departure time), (3) reserve a new time slot at the loading dock and/or parking spot for the vehicle scheduled to arrive (or depart) at the changed arrival time (or departure time), and (4) schedule one or more robots to be at the loading dock at or before the beginning of the original time slot and/or the new time slot. The original and/or new time slot and/or parking spot can be based on the changed arrival time (or departure time); e.g., a reserved time slot includes/starts at an estimated arrival time, a reserved time slot ends at/before an estimated departure time, a parking spot is reserved from an estimated arrival time to a beginning of a time slot, etc.

Also, other resources, such as warehouse access and robots, can be based on an arrival time or departure; e.g., a warehouse gate can be opened to enable access to a vehicle at an arrival time and/or a departure time, robots can be scheduled to be at a loading dock when a vehicle arrives and/or until a vehicle departs, space in a warehouse can be made available for pallets scheduled to be unloaded from a vehicle arriving at an ETA, pallets can be moved toward and/or to a loading dock at an estimated arrival time to be loaded onto a vehicle arriving at the estimated arrival time. More specifically, robots can be assigned to tasks that are based on an arrival time or departure. These tasks can include picking up one or more pallets and taking the palllet(s) to a loading dock at least X minutes before a truck arrives at the loading dock, where X is an estimated number of minutes estimated to take the pallet(s) from their location(s) in the warehouse to the loading dock. These tasks can be scheduled based on the truck's estimated time of arrival so that congestion at the loading dock is reduced or eliminated to reduce or eliminate delay in delivering the pallet(s) from the warehouse to the truck.

The warehouse and supply-chain coordinator can direct robots to perform various tasks in and around the warehouse, such as, but not limited to: loading a vehicle, unloading a vehicle, pick-and-place operations where a robot gets (or "picks") one or more items, such as pallets, from one location and takes (or "places") the item(s) to a second location, inspecting goods, and swapping item(s) between locations.

To inspect goods, the robot can examine a pallet of goods; e.g., a pallet arriving on a vehicle and/or a pallet already stored in the warehouse, to determine if goods of the pallet are in compliance with a contract. For example, suppose a contract states that a pallet of goods that includes 100 mobile devices is to be shipped on truck T1 to a warehouse W1 where robot R1 is located. In this example, suppose truck T1 only includes one pallet P1 to be unloaded at warehouse W1. Then, upon arrival of truck T1, the robot R1 can examine pallet P1 carried by truck T1, perhaps before P1 is unloaded from truck T1 into warehouse W1, to determine whether pallet P1 actually includes 100 mobile devices. If robot R1 determines that pallet P1 includes 100 mobile devices, then robot R1 can inform the warehouse and supply-chain coordinator that inspection of pallet P1 succeeded, and the warehouse and supply-chain coordinator can both (a) generate a receipt for pallet P1 and (b) direct robot R1 and/or one or more other robots to unload pallet P1 from truck T1 into warehouse W1. Otherwise, if robot R1 determines that pallet P1 does not include 100 mobile devices, then robot R1 can inform the warehouse and supply-chain coordinator that inspection of pallet P1 failed, and the warehouse and supply-chain coordinator can reject delivery of pallet P1 and direct robot R1 and/or one or more other robots to leave pallet P1 on truck T1 as rejected goods. In some cases, rejecting delivery of a pallet of goods includes sending a rejection notice to a supplier of the pallet of goods informing the supplier that the pallet was rejected. Many other examples of inspecting and/or rejecting goods are possible as well.

In some examples, the warehouse and supply-chain coordinator can coordinate additional aspects of a supply chain beyond warehouses. For examples, the warehouse and supply-chain coordinator can determine one or more orders requesting production, storage, and/or delivery of one or more pallets of goods using a supply chain that includes the warehouse and supply-chain coordinator. The supply chain can also include locations, such as supplier locations, warehouses, and retail locations, connected by a plurality of paths such as roads, water shipping routes, and/or airways, where at least one pallet is conveyed from a first location to the second location using a vehicle traveling on a path from the first location to a second location, where at least one of the first location and the second location includes a warehouse capable of storing the at least one pallet, and where the vehicle includes an autonomous vehicle configured to be controlled by the warehouse and supply-chain coordinator. Then, the warehouse and supply-chain coordinator can determine whether an event occurs that is related to the at least one pallet. The event can include, but is not limited to one or more of: an event related to goods of the at least one pallet, an event related to the first and/or second locations, an event related to the autonomous vehicle, a weather-related event, a seasonally-related event, an event related to search queries and/or results, an event related to advertising and/or social media, and other types of events. In some cases, the event includes an event where a location does not store at least a quantity of an item; e.g., the location is running relatively-low and/or has run out of the item.

After determining that the event is related to the at least one pallet, the warehouse and supply-chain coordinator can change the path of the vehicle to a third location in the supply chain. As one specific example, suppose the pallet of goods includes bottled water, and the warehouse and supply-chain coordinator determines that an event E1 occurs where a hurricane or other storm is predicted to reach the third location (thus increasing a demand for the bottled water at the third location) but not reach the second location. Then, the warehouse and supply-chain coordinator can change the path of the vehicle with the pallet having bottled water to the third location. As another specific example, suppose the pallet of goods includes football jerseys and the warehouse and supply-chain coordinator determines that an event E2 occurs where a location of a scheduled football game is moved from the second location to the third location. Then, the warehouse and supply-chain coordinator can change the path of the vehicle with the pallet having the football jerseys to the third location. As a third specific example, suppose that the pallet of goods includes an item I, and the warehouse and supply-chain coordinator determines that an event E3 occurs where search queries and/or results including references to item I with respect to the third location are greatly increased, but search queries and/or results including references to item I associated with the second location are not increased. Then, the warehouse and supply-chain coordinator can change the path of the vehicle with the pallet having the item I to the third location. Many other examples are possible as well.

Some or all locations in the supply chain can have priorities, which can change based on events. Continuing the bottled-water example above, suppose that the priority of the second location before E1 is P2_BEFORE and the priority of the third location before E1 is P3_BEFORE, where P2_BEFORE is higher than P3_BEFORE since the second location is the destination for the pallet of goods having the bottled water. Then, upon determining the E1 has occurred, the warehouse and supply-chain coordinator can recalculate or otherwise determine the priority of the third location to be P3_AFTER, where P3_AFTER is a higher priority than P2_BEFORE. Then, since P3_AFTER is a higher priority than P2_BEFORE, the warehouse and supply-chain coordinator can change the path of the vehicle with the pallet having the bottled water to the third location.

In some cases, the warehouse and supply-chain coordinator can trigger new orders and/or replenishment of supplies based on existing orders and/or changed orders. For example, suppose the warehouse and supply-chain determines that an order O1 orders a quantity Q1 of goods G1 to be carried from a location L1 to a location L2. Then, the warehouse and supply-chain can route and/or otherwise assign a vehicle V1 to pick up at least the quantity Q1 of goods G1 from location L1 and carry the quantity Q1 of goods G1 to location L2. In this example, after routing vehicle V1 to pick up the quantity Q1 of goods G1 at location L1, the warehouse and supply-chain coordinator determines that location L1 does not have the quantity Q1 of goods G1, but another location L3 has at least the quantity Q1 of goods G1. Then, the warehouse and supply-chain coordinator can reroute and/or otherwise reassign vehicle V1 to pick up at least the quantity Q1 of goods G1 from location L3.

The warehouse and supply-chain coordinator can replenish quantities of goods by ordering items from a supplier. Continuing the example above, after the warehouse and supply-chain coordinator determines that location L1 does not have the quantity Q1 of goods G1, the warehouse and supply-chain coordinator can generate and send an order O1 to supplier S1 for a quantity Q2 of goods G1. Upon reception of order O1, supplier S1 can send a response R1 to the warehouse and supply-chain coordinator indicating that order O1 is fulfilled and awaiting shipment. Upon sending order O1, upon receiving response R1, or at some other time, the warehouse and supply-chain coordinator can generate and send an order O2 to vehicle V2 to pick up the quantity Q2 of goods G1 from supplier S1. In some examples, order O2 also directs vehicle V2 to take at least some of the quantity Q2 of goods G1 from supplier S1 to location L1, which did not have a quantity Q1 of goods G1. In other examples, order O2 also directs vehicle V2 to take at least some of the quantity Q2 of goods G1 from supplier S1 to another location L3. In still other examples, order O2 also directs vehicle V2 to take at least some of the quantity Q2 of goods G1 from supplier S1 to location L1 via a waypoint location WL1; e.g., to pick up goods at WL1 and/or to deliver goods to WL1. When vehicle V2 arrives at waypoint location WL1 (or location L1), the warehouse and supply-chain coordinator can receive information I1 that vehicle V2 has arrived at waypoint location WL1 (or location L1) or that vehicle V2 is scheduled to arrive at waypoint location WL1 (or location L1). Upon receiving information I1, the warehouse and supply-chain coordinator can generate and send order O3 to one or more robots at waypoint location WL1 (or location L1) to load and/or unload vehicle V2. After the robot(s) have loaded and/or unloaded vehicle V2, vehicle V2 can leave waypoint location WL1 (or location L1) and continue on to another location. Many other examples of routing vehicles, re-routing vehicles, orders, replenishment, and/or other operations related to warehouses and/or supply chains are possible as well.

The warehouse and supply-chain coordinator can provide services and/or applications related to transportation network rationalization. In some examples, the warehouse and supply-chain coordinator determines movement of goods, reviews possible shipping and warehousing permutations, and generates recommendations for transport network solutions. Such solutions can include, but are not limited to, solutions involving: consolidation of partial vehicle shipments to improve vehicle utilization/decrease empty miles driven, passing of freight between warehouses to increase vehicle and/or warehouse utilization; relocation of warehouses and inventory placement to more economically utilize transportation routes and establish more efficient shipping networks, and in some cases, leverage inventory, warehouses, and vehicles owned by multiple parties.

The warehouse and supply-chain coordinator can coordinate groups of robots efficiently to optimize the loading and unloading of vehicles at a facility, such as a loading dock of a warehouse. In particular, the warehouse and supply-chain coordinator can precisely time the arrival of a pallet at the front of the loading dock when a truck arrives and economically utilize the space at the loading dock; e.g., as a queue of pallets. By planning/coordinating future robot actions the warehouse and supply-chain coordinator can precisely determine where a pallet destined for shipment is located, that is, when the pallet destined for shipment will arrive in the queue, when the pallet destined for shipment will be slotted in the front of the queue for immediate shipment, etc. Designating one or more robots to move pallets in the queue of pallets to save a few minutes for an incoming vehicle may be more feasible than assigning human workers/drivers to move these pallets with a fork truck. Also, some robots are smaller than a standard forklift and so can more easily fit in tight spaces at the loading dock. Further, the use of two or more robots directed and coordinated by the warehouse and supply-chain coordinator can also more easily reorder the queue, both by reducing the number of operations used in queue reordering and by receiving navigation instructions from a single control system as opposed to two autonomous agents trying to coordinate their actions in the confines of a loading dock.

In some examples, instructions and/or messages communicated between the warehouse and supply-chain coordinator and robots are communicated between the warehouse and supply-chain coordinator and other agents than robots, such as, but not limited to, human agents, material handling systems operated and/or managed by humans, and human-assisted robotic devices. Examples of material handling systems include, but are not limited to, electrical systems, mechanical systems, and electro-mechanical systems, such as automated pallet wrapping machines, powered doors, etc.

In other examples, the warehouse and supply-chain coordinator operates using a work plan. In these examples, pallets can be physically placed at or near a loading dock as directed by an expected pallet movement schedule of the work plan. Then, when the warehouse and supply-chain coordinator receives data that truck arrival times and/or estimated times of arrival have changed the warehouse and supply-chain coordinator can update the work plan in accord with the changed truck arrival times/estimated times of arrival. In these examples, the warehouse and supply-chain coordinator changes the work plan based on changes in truck arrival times/estimated times of arrival, rather than typical workflows that schedule work within the warehouse based on scheduled appointments for the arriving trucks.

The use of the warehouse and supply-chain coordinator can make supply chains more flexible, and thus more efficient. Other efficiencies can be gained by coordinating warehouse activities with arriving and departing trucks—time can be saved when the warehouse and supply-chain coordinator arranges for robots to be waiting for incoming trucks and arranges for pallets of goods destined for an outgoing truck to be near its loading dock. Fuel and time expended by trucks waiting for loading docks and goods at warehouses can be saved as well. The warehouse and supply-chain coordinator can provide better visibility into the supply chain. By making supply chains more efficient and flexible, the warehouse and supply-chain coordinator can enable consolidation of shipments, routes, vehicles, warehouses, and suppliers.

Example Warehouse and Supply-Chain Coordinator and Supply Chains

FIG. 1 is a diagram of a supply chain, in accordance with an example embodiment. The supply chain includes warehouse and supply-chain coordinator 100, supplier 110, manufacturer 120, warehouses 130, 140, warehouse/distribution center 150, warehouse/fulfillment center 156, retailer 160, and customers 170, 172. These entities are connected by routes traversed by various vehicles, including trucks 112, 124, 142, 144, 152, 158, air freight 134, sea freight 136, and drones 154, 162. In the supply chain shown in FIG. 1, a route between supplier 110 and manufacturer 120 is traversed by truck 112, a route between manufacturer 120 and warehouse 130 is traversed by truck 124, and routes between warehouse 130 and warehouse 140 are traversed by air freight 134 and sea freight 136.

As indicated by dashed lines in FIG. 1, warehouse and supply-chain coordinator 100 can communicate with supplier 110, manufacturer 120, warehouses 130, 140, warehouse/distribution center 150, warehouse/fulfillment center 152, and retailer 160. In some examples, warehouse and supply-chain coordinator 100 can communicate with additional entities; e.g., some or all of trucks 112, 124, 142, 144, 152, 158, air freight 134, sea freight 136, customers 170, 172, and/or additional entities related to one or more supply chains; e.g., one or more robots and/or other agents working in a warehouse, at a supplier, at a manufacturer, etc.

Also in the supply chain shown in FIG. 1, a route between warehouse 140 and warehouse/distribution center 150 is traversed by truck 142, a route between warehouse 140 and warehouse/fulfillment center 156 is traversed by truck 144, routes between warehouse/distribution center 150 and retailer 160 are traversed by truck 152 and drone 154; i.e., an autonomous aerial vehicle acting as drone 154, a route between retailer 160 and customer 170 is traversed by drone 162, and a route between warehouse/fulfillment center 156 and customer 172 is traversed by truck 158. In other examples, more, fewer, and/or different routes and vehicles traversing routes are possible in a supply chain. In still other examples, more, fewer, and/or other locations in a supply chain are utilized; e.g., there are more and/or different suppliers, there are more and/or different manufacturers, there are more, fewer, and/or different warehouses, etc. In even other examples, drones, such as drones, 154, 162, and 164 are utilized to cover a "last mile" from a warehouse; e.g., a drone is used to deliver goods on routes from warehouses, such as warehouse 140, warehouse/distribution center 150, and/or warehouse/fulfillment center 156, to customers, such as customers 170, 172. In particular, FIG. 1 shows drone 164 delivering goods from warehouse/fulfillment center 156 to customer 172.

In the supply chain shown in FIG. 1, a supplier location provides components used by a manufacturer location to make and/or otherwise prepare one or more goods or shipment. In some examples, a manufacturer location and/or a supplier location store raw materials used to make components and/or goods, such as raw materials 122 stored at manufacturer 120.

A supply chain can have one or more owners. For example, supplier 110 can be owned by a first company, manufacturer 120 can be owned by a second company, warehouses 130 and 140 can be owned by a third company, etc. Also, vehicles in the supply chain may be owned by different entities than own buildings in the supply chain, where buildings are depicted in FIG. 1 using rounded rectangles; e.g., customers 170, 172 can be in buildings such as homes or business related buildings such as offices, factories, and/or other kinds of business-related buildings; some or all of supplier 110, manufacturer 120, and warehouses 130, 140 can include one or more buildings, etc.

A supply chain can be managed by one or more entities, which may or may not own any buildings or vehicles in the supply chain. For example, a warehouse management company can operate warehouse 130 for the owner of warehouse 130; in other examples, the owner of warehouse 130 can manage/operate the warehouse.

Various data can be used to operate the supply chain. For example, data on a per-SKU basis can be maintained; e.g., a quantity of an item represented by a SKU at a particular location in the supply chain, data on SKU velocity, one or more costs, prices, weights, sizes, dimensions, sources, and/or destinations of items represented by a SKU, etc. Data about buildings, locations, and/or vehicles in the supply chain can be maintained; e.g., one or more locations, costs, prices, weights, sizes, dimensions, sources, and/or destinations of buildings and/or vehicles in the supply chain; data about a route One or more computing devices executing software can be utilized as warehouse and supply-chain coordinator 100. For example, the or more computing devices acting as warehouse and supply-chain coordinator 100 can be utilized as a cloud and/or network-based solution. The warehouse and supply-chain coordinator 100 can include and/or communicate with a warehouse management system (WMS)

used to control operations within one or more warehouses and/or to provide information about items/entities that are "upstream" (or logically closer to a supplier location. In the supply chain, such as supplier 110) and/or items/entities that are downstream (or logically closer to a customer location, such as customer 170 or 172).

Warehouse and supply-chain coordinator 100 can provide user interfaces enabling review, creation, updating, and deletion of data used to operate the supply chain and can send and receive messages to control various entities, such as, but not limited to, robots, vehicles, and access control systems such as gates providing ingress and/or egress to a building or other locations. Warehouse and supply-chain coordinator 100 also can control various resources used in operating a warehouse and/or a supply-chain, such as access to a facility, time slots for loading/unloading vehicles, storage locations or "slots", parking spots, cargo capacity of a vehicle. Warehouse and supply-chain coordinator 100 can provide visibility and control of goods moving through the supply chain; e.g, visibility about goods that are upstream and/or downstream of one or more points in the supply chain (e.g., upstream and/or downstream of one or more selected warehouses, suppliers, retailers, and/or customers). This visibility can be provided by tracking shipments of goods through the supply chain and extracting information from these goods at a SKU level, enabling visibility of specific goods within the supply chain; e.g., warehouse and supply-chain coordinator 100 can provide information about locations of goods having one or more given SKUs, locations of shipments carrying goods having one or more given SKUs, pending, in-progress, and/or fulfilled orders of goods having one or more given SKUs from one or more suppliers, etc.

While managing and coordinating shipments through the supply chain, warehouse and supply-chain coordinator 100 can communicate with various transportation modes, such as air, sea, and land-based modes of transportation. Warehouse and supply-chain coordinator 100 can combine loads from multiple warehouses into one shipment and consolidate loads from multiple shipments for storage at one warehouse. Warehouse and supply-chain coordinator 100 can account for various constraints at a given warehouse, such as a number of loading docks, space for loading and/or unloading goods, total amount of available storage, types of storage facilities (e.g., refrigerated storage, climate-controlled storage, storage for liquid and/or gaseous goods), labor and/or robot availability, to reduce and/or avoid inefficiencies at a warehouse. Warehouse and supply-chain coordinator 100 can stage goods for outgoing orders at a loading dock to increase efficiencies of loading goods onto trucks, ships, rail cars, planes, drones, and/or other vehicles; e.g., stage goods in a pallet arrangement that ensure pallets destined for a truck at a loading dock are closest to the loading dock. Warehouse and supply-chain coordinator 100 can also manage storage locations within a warehouse to enable efficient unloading of vehicles at loading docks; e.g., allocate storage close to a loading dock for an incoming vehicle to the incoming vehicle, so that goods can be rapidly unloaded from the incoming vehicle to the allocated storage.

Scenarios 200, 300, 400, 500, and 600 reflect various applications of a flexible supply chain utilizing warehouse and supply-chain coordinator 100, such as the supply chain shown in FIG. 1 discussed above, and in FIGS. 2, 3, 4, 5, and 6 discussed below.

Figure 2:
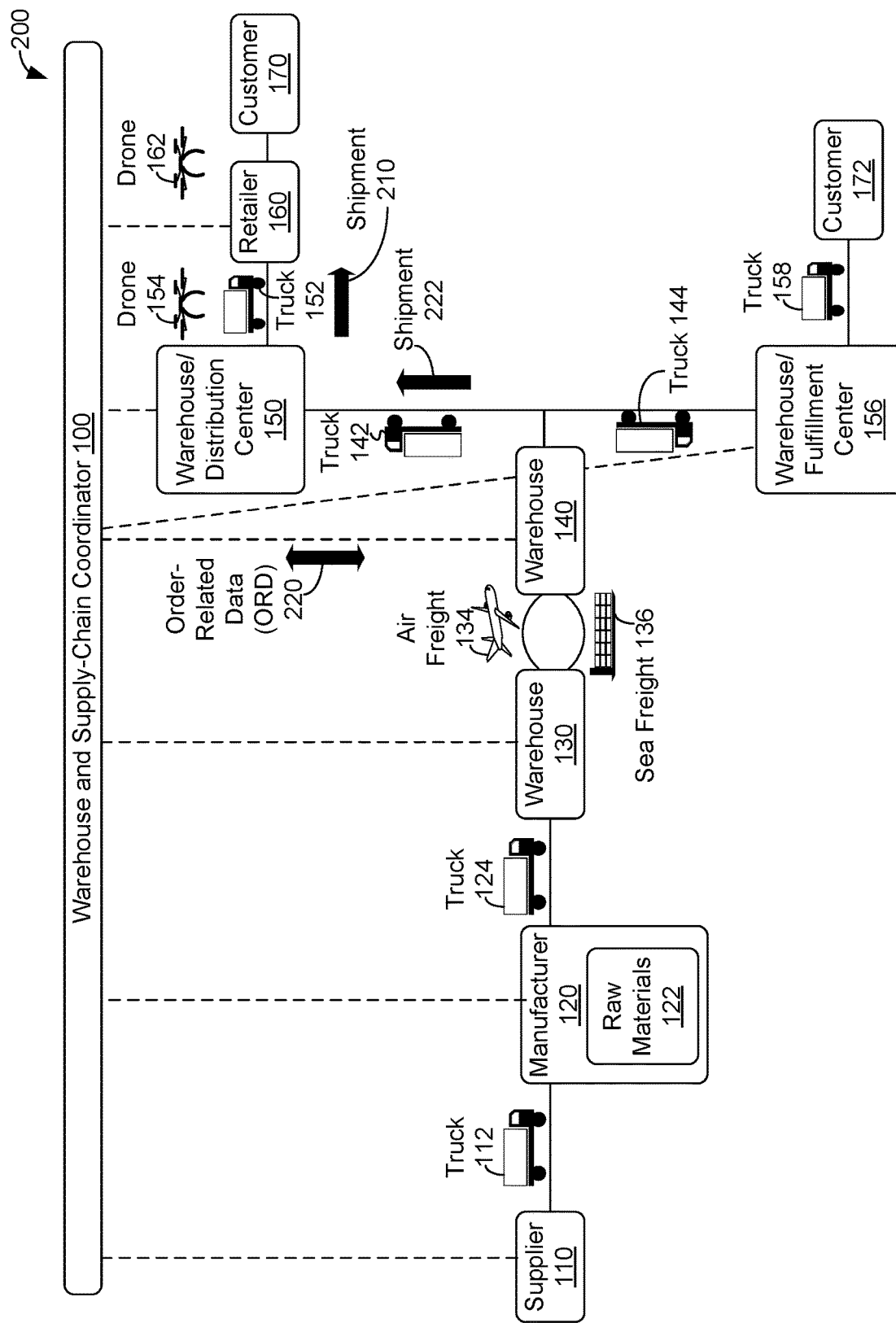
FIG. 2 illustrates a scenario where order-related data triggers a shipment to a retailer, in accordance with an example embodiment.

FIG. 2 illustrates scenario 200 where order-related data (ORD) 220 triggers shipment 222 to retailer 160, in accordance with an example embodiment. Scenario 200 involves shipment 210 of goods G200 from warehouse/distribution center 150 to retailer 160 via truck 152. After shipment 210, order-related data 220 is communicated between warehouse 140 and supply-chain coordinator 100 leading to shipment of goods G200 from warehouse 140 to warehouse/distribution center 150 via truck 142.

Scenario 200 begins with shipment 210 of goods G200 from warehouse/distribution center 150 to retailer 160 via truck 152. Shipment 210 was triggered by an order O200 from retailer 160 for goods G200 (and perhaps other goods) to warehouse and supply-chain coordinator 100 that occurred prior to scenario 200. Upon receiving order O200, warehouse and supply-chain coordinator 100 located a warehouse that had enough of goods G200 to satisfy order O200; in this case, warehouse/distribution center 150 has enough of goods G200 to satisfy order O200. Warehouse and supply-chain coordinator 100 ordered truck 152 to warehouse/distribution center 150 to load goods G200 (and any other goods available at warehouse/distribution center 150 to satisfy order O200) and deliver the loaded goods G200 to retailer 160.

After truck 152 has loaded goods G200, warehouse and supply-chain coordinator 100 communicates order-related data 220 with warehouse 140. In scenario 200, order-related data 220 includes an order from warehouse and supply-chain coordinator 100 to deliver goods G200 from warehouse 140 to warehouse/distribution center 150, an order to truck 142 to load goods G200 from warehouse 140, and orders to robots (and perhaps other agents) at warehouse 140 to load goods G200 onto truck 142. In other examples, warehouse and supply-chain coordinator 100 also includes a confirmation from warehouse 140 that goods G200 are available therein or a notification from warehouse 140 that goods G200 are not available.

After truck 142 is loaded with goods G200 at warehouse 140, shipment 222 begins where truck 142 conveys goods G200 (and perhaps other goods) to warehouse/distribution center 150. Upon arrival at warehouse/distribution center 150, goods G200 are unloaded from truck 142, and scenario 200 can be completed.

In a related scenario, order-related data 220 is communicated before shipment 210 begins. For example, order-related data 220 can include a prediction that retailer 160 will order goods G200 and/or a predictive order of goods G200 placed on behalf of retailer 160 before retailer 160 actually places an order for goods G200 with warehouse and supply-chain coordinator 100. The prediction of an order of goods G200 and/or the predictive order of goods G200 can be based on order-predictive data related to one or more entities, such as retailer 160, where the order-predictive data includes, but is not limited to:

point-of-sale (POS) data from retailer 160 indicating sales of goods G200, an inventory of goods G200 at retailer 160 (e.g., if warehouse and supply-chain coordinator 100 determines that retailer 160 has a relatively small quantity of goods G200, then warehouse and supply-chain coordinator 100 can predictively order goods G200 for retailer 160), data about historical orders from retailer 160 (e.g., retailer 160 has ordered goods G200 most or every day, three days, week, month, quarter, etc., and so warehouse and supply-chain coordinator 100 can predictively order goods G200 for retailer 160), Internet-related data, such as search query data related to goods G200, social-media data, search conversion rates related to goods G200, and/or other data available via the internet indicating customer interest in goods G200 (e.g., if warehouse and supply-chain coordinator 100 determines a relatively-large number of searches involving terms such as "G200" are being placed, perhaps by users in a region at or near retailer 160, then warehouse and supply-chain coordinator 100 can predictively order goods G200 for retailer 160), and data indicating trends in POS data, inventory data, data about historical orders, Internet-related data, and/or other data In the related scenario, order-related data 220 includes a predictive order of goods G200 destined for retailer 160 that is sent to warehouse 140. After communicating the predictive order of goods G200 to warehouse 140, warehouse and supply-chain coordinator 100 orders two shipments: shipment 210 from warehouse 140 to replenish goods G200 at warehouse/distribution center 150 and shipment 222 from warehouse/distribution center 150 to retailer 160. If warehouse/distribution center 150 has enough of goods G200 to satisfy the predictive order, then shipments 210 and 222 can take place in parallel and/or shipment 222 can precede shipment 210. If warehouse/distribution center 150 does not have enough of goods G200 to satisfy the predictive order, then shipment 222 can precede shipment 210.

As such, scenario 200 can be considered to be a "reactive" scenario, where warehouse and supply-chain coordinator 100 reacts to order O200 for goods G200 from retailer 160 to replenish warehouse/distribution center 150. Also, the related scenario mentioned above can be considered to be a "proactive" scenario, where warehouse and supply-chain coordinator 100 issues a predictive order for goods G200 on behalf of retailer 160 without retailer 160 actually placing an order.

Generally speaking, order-related data, such as order-related data 220, can include one or more: orders, order-predictive data, predictions of orders, predictive orders, confirmations of orders, event notifications, notifications that orders cannot be carried out and/or satisfied, data about inspections of goods in and/or related to the supply chain, and/or other data associated with one or more orders involving a supply chain. In some embodiments, order-related data can be used, generated, and/or processed using machine-learning techniques utilizing neural networks to find patterns in data, such as order-related data, and generate predictive orders and/or other commands based on the patterns found in the data. These patterns can include, but are not limited to, patterns in the above-mentioned order-predictive data (e.g., data indicating trends) and/or other data. Other and/or additional techniques for using, generating, and/or processing order-related data can be used as well, or instead of, machine-learning techniques.

Figure 3:
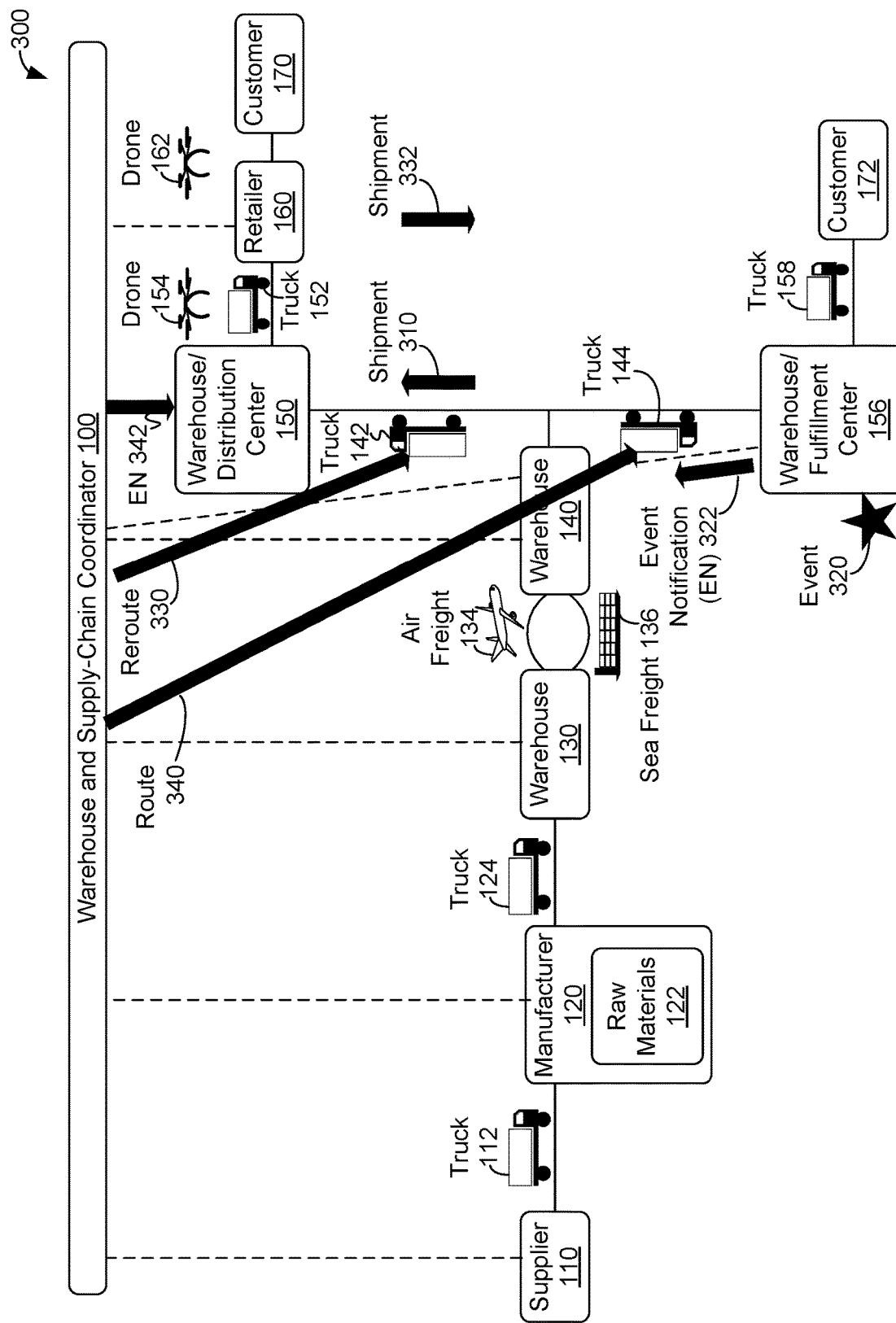
FIG. 3 illustrates a scenario where an event triggers re-routing of a shipment, in accordance with an example embodiment.

FIG. 3 illustrates scenario 300 where event 320 triggers re-routing of a shipment, in accordance with an example embodiment. Scenario 300 involves occurrence of event 320 associated with warehouse/fulfillment center 156 while shipment 310 of goods G300 is en route from warehouse 140 to warehouse/distribution center 150 via truck 142. Warehouse/fulfillment center 156 sends event notification 322 regarding event 320 to warehouse and supply-chain coordinator 100. Warehouse and supply-chain coordinator 100 determines that, because of event 320, warehouse/fulfillment center 156 has a higher priority for goods G300 than warehouse/distribution center 150. Subsequently, warehouse and supply-chain coordinator 100 sends reroute message 330 to reroute truck 142 to deliver goods G300 to warehouse/fulfillment center 156. Warehouse and supply-chain coordinator 100 sends route message 340 to truck 144 to route the truck to warehouse 140 to pick up goods G200 and deliver goods G300 to warehouse/distribution center 150. Additionally, warehouse and supply-chain coordinator 100 sends event notification 342 to inform warehouse/distribution center 150 that truck 142 was rerouted and that truck 144 will bring goods G300 to warehouse/distribution center 150.

At an onset of scenario 300, truck 142 is carrying goods G300 to warehouse/distribution center 150 as part of shipment 310. Then, event 320 occurs, where event 320 is related to warehouse/fulfillment center 156 and goods G300. As one example, if goods G300 includes bottled water, and event 320 is "a hurricane made landfall near warehouse/fulfillment center 156", then warehouse/fulfillment center 156 can have an increased demand for bottled water. As another example, if goods G300 includes team jerseys for Team A, and event 320 is "Team A was just announced as playing a big game near warehouse/fulfillment center 156", then warehouse/fulfillment center 156 can have an increased demand for Team A jerseys. As a third example, event 320 can be "warehouse/fulfillment center 156 has sold out of a month's supply of goods G300 in one day", then warehouse/fulfillment center 156 can have an increased demand for goods G300. Other events related to both goods G300 and warehouse/fulfillment center 156 are possible as well.

After event 320 occurs, warehouse/fulfillment center 156 sends event notification (EN) 322 informing warehouse and supply-chain coordinator 100 of the occurrence of event 320. In some examples, event notification 322 also includes a request for a change in priority for one or more goods; e.g., requesting an increased priority for snow shovels when event 320 is a prediction of an imminent blizzard, requesting a decreased priority for Team B related gear after a game with Team B is canceled, etc. Other reasons than increased or decreased demand for goods are possible for changing priority of delivery (or pick up) of goods to a location, such as a priority of delivery of goods G300 to warehouse/fulfillment center 156, e.g., reasons related to changes in costs, such as monetary costs for delivery and/or goods, reasons related to transportation of goods; e.g., a total amount of miles traveled by a vehicle destined for a location carbon-footprint-related costs, reasons related to an entity in the supply chain, such as a warehouse, vehicle, manufacturer, or supplier; e.g., an increase or decrease in capacity of a, damage to the entity, a surplus or deficit of goods at the entity, etc. Many other reasons for changing priority of goods, shipments, and/or entities in the supply chain are possible as well.

Scenario 300 continues with warehouse and supply-chain coordinator 100 receiving event notification 322. Then, based on event notification 322, warehouse and supply-chain coordinator 100 changes the priority of warehouse/fulfillment center 156 to have a higher priority for goods G300 than warehouse/distribution center 150, and subsequently determines to reroute truck 142 to warehouse/fulfillment center 156 to deliver high-priority goods G300. Rerouting truck 142 effectively cancels shipment 310 to warehouse/distribution center 150. In other scenarios, warehouse and supply-chain coordinator 100 can change one or more priorities associated with goods G300, truck 142, warehouse/distribution center 150, warehouse/fulfillment center 156, and/or shipment 310 for other reasons than event notification 322; e.g., some or all of the reasons listed above for changing priorities.

After warehouse and supply-chain coordinator 100 determines to reroute truck 142, warehouse and supply-chain coordinator 100 sends reroute message 330 to truck 142 to change truck 142's route to deliver goods G300 to warehouse/fulfillment center 156. In response to reroute message 330, truck 142 stops shipment 310 and begins shipment 332 to warehouse/fulfillment center 156.

Scenario 300 continues with warehouse and supply-chain coordinator 100 determining that a quantity of goods G300 are available at warehouse 140, and that truck 144 is available to deliver goods G300 from warehouse 140 to warehouse/distribution center 150. Then, warehouse and supply-chain coordinator 100 sends route message 340 to truck 144 to route the truck to warehouse 140 to pick up goods G300 and deliver goods G300 to warehouse/distribution center 150. Additionally, warehouse and supply-chain coordinator 100 sends event notification 342 to inform warehouse/distribution center 150 that truck 142 was rerouted and that truck 144 will bring goods G300 to warehouse/distribution center 150. In some examples, event notification 342 includes an ETA for truck 142/goods G300.

After truck 142 delivers goods G300 to warehouse/fulfillment center 156 as part of shipment 332, scenario 300 can be completed. In other scenarios, truck 142 delivers goods G300 to warehouse/fulfillment center 156 before truck 144 is routed to warehouse 140 and/or before event notification 342 is sent to warehouse/distribution center 150.

Figure 4:
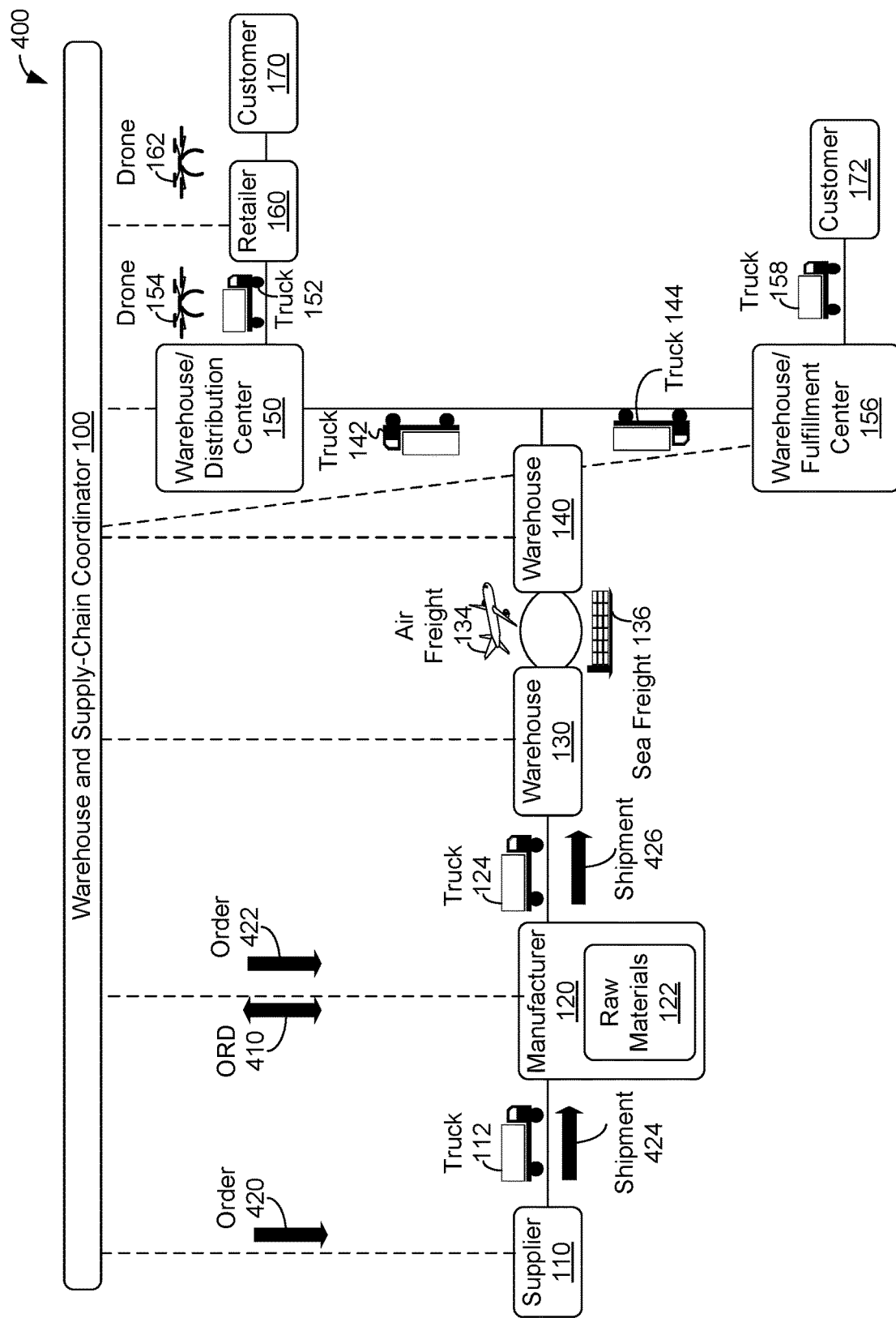
FIG. 4 illustrates a scenario where order-related data triggers shipments from a supplier to a manufacturer and from the manufacturer to a warehouse, in accordance with an example embodiment.

FIG. 4 illustrates scenario 400 where order-related data 410 triggers shipments 424, 426 from a supplier to a manufacturer and from the manufacturer to a warehouse, in accordance with an example embodiment. Scenario 400 involves communication of order-related data 410 between warehouse and supply-chain coordinator 100 and manufacturer 120 leading to warehouse and supply-chain coordinator 100 sending order 420 to supplier 110, where order 420 requests shipment 424 for raw materials 122 to manufacturer 120. Warehouse and supply-chain coordinator 100 also sends order 422 to manufacturer 120 requesting forecast amount FA400 of goods G400 and subsequent shipment of the goods G400 to warehouse 130. The forecast amount FA400 of goods G400 are manufactured by manufacturer 120 and carried as part of shipment 426 using truck 124 to warehouse 130. Once shipment 426 arrives at warehouse 130 and goods G400 are unloaded from truck 124 at warehouse 130, scenario 400 ends.

FIG. 4 shows that scenario 400 begins with communication of order-related data 410 between warehouse and supply-chain coordinator 100 and manufacturer 120. Specifically for scenario 400, order-related data 410 includes a request from warehouse and supply-chain coordinator 100 for a maximum amount of goods G400 that can be made based on an amount of raw materials 122 at a location of manufacturer 120. In response to the request, manufacturer 120 sends a response message informing warehouse and supply-chain coordinator 100 that an amount A400 of goods G400 can be made with the amount of raw materials 122 at the location of manufacturer 120, and that raw materials 122 is a limiting factor; that is, the amount of goods G400 that can be manufactured is limited by an amount of raw materials 122.

After receiving the response message, warehouse and supply-chain coordinator 100 determines a forecast amount FA400 of goods G400 that will likely be required at warehouse 130. In scenario 400, the forecast amount FA400 of goods G400 is determined using order-predictive data for goods G400, where order-predictive data is discussed above in the context of scenario 200 and FIG. 2. More specifically, warehouse and supply-chain coordinator 100 determines forecast amount FA400 based on orders for goods G400 and trends in order data indicating orders for goods G400 that are likely to arrive in the near future.

Warehouse and supply-chain coordinator 100 also determines that the forecast amount FA400 of goods G400 is greater than the amount A400 provided by manufacturer 120 in the response message. The response message also indicates that raw materials 122 are a limiting factor for production of goods G400. As raw materials 122 are a limiting factor for production of goods G400, warehouse and supply-chain coordinator 100 determines manufacturer 120 will need more raw materials 122 to produce at least the forecast amount FA400 of goods G400.

After determining that manufacturer 120 will need more raw materials 122, warehouse and supply-chain coordinator 100 sends order 420 to supplier 110 for raw materials 122 on behalf of manufacturer 120. In response to order 420, supplier 110 produces raw materials 122 and puts raw materials 122 on truck 112 as part of shipment 424 to manufacturer 120. In some scenarios, supplier 110 informs warehouse and supply-chain coordinator 100 and/or manufacturer 120 that raw materials 122 are on truck 112 as part of shipment 424.

Warehouse and supply-chain coordinator 100 also sends order 422 to manufacturer 120 requesting forecast amount FA400 of goods G400 and subsequent shipment of the goods G400 to warehouse 130. Order 422 also informs manufacturer 120 that order 420 for raw materials 122 has been placed on behalf of manufacturer 120. In some scenarios, order 422 includes information about shipment 424 and/or truck 112; e.g., ETA of shipment 424, identifying information about truck 112, a carrier providing shipment 424, etc.

After raw materials 122 in shipment 424 are unloaded at manufacturer 120, and manufacturer 120 receives order 422 for the forecast amount FA400 of goods G400, manufacturer 120 manufactures the forecast amount FA400 of goods G400. Upon manufacture of the forecast amount FA400 of goods G400, the forecast amount FA400 of goods G400 are carried as part of shipment 426 using truck 124 to warehouse 130. Once shipment 426 arrives at warehouse 130 and goods G400 are unloaded from truck 124 at warehouse 130, scenario 400 ends.

Scenario 400 can be considered to be a proactive scenario, as order 420 for raw materials is made before order 422 for goods G400. In a related reactive scenario, warehouse and supply-chain coordinator 100 first places order 422 with manufacturer 120 and manufacturer 120 subsequently places order 420 to supplier 110 for raw materials 122.

Figure 5:
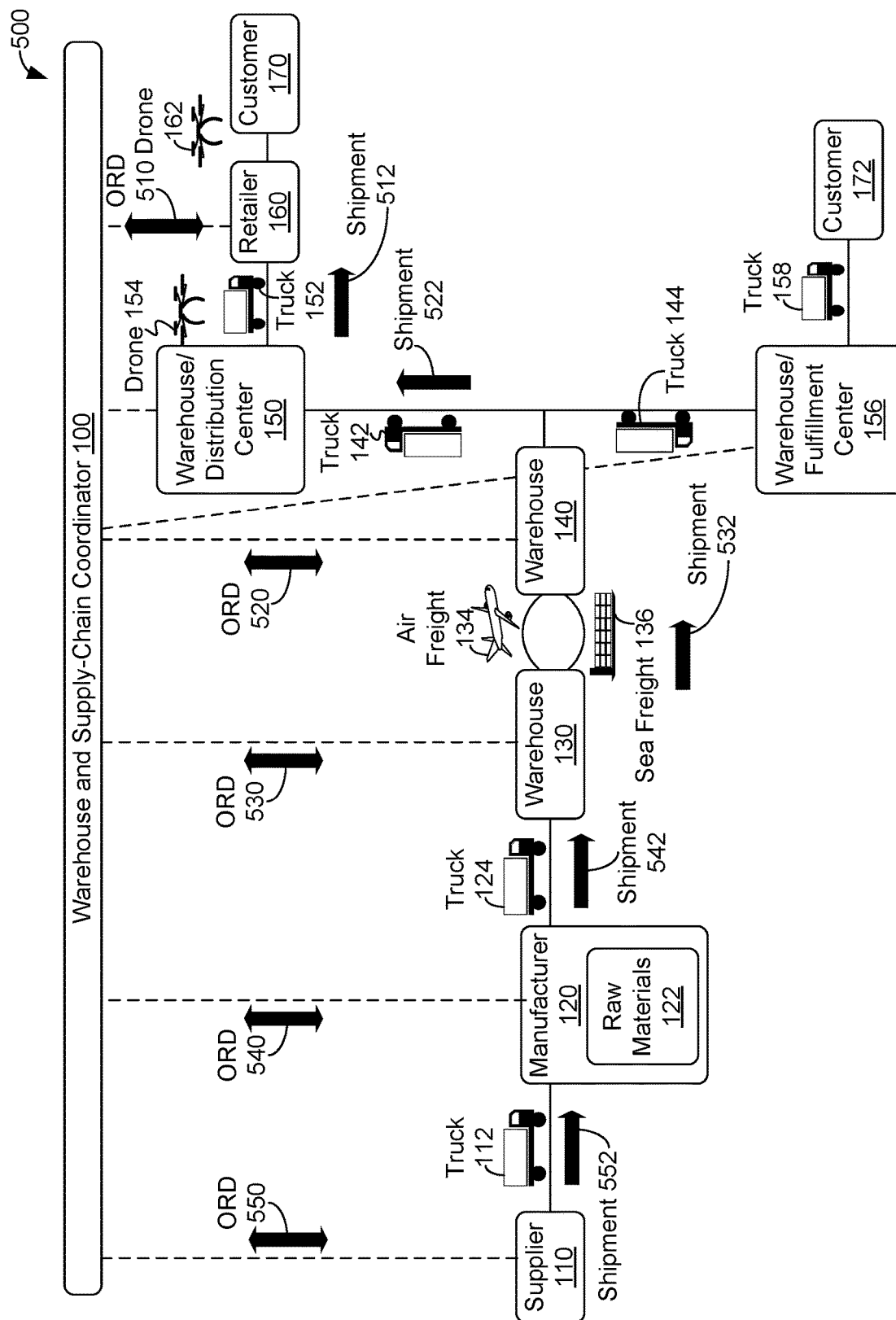
FIG. 5 illustrates a scenario where order-related data triggers shipments throughout a supply chain, in accordance with an example embodiment.

FIG. 5 illustrates a scenario 500 where order-related data 510, 520, 530, 540, 550 triggers shipments 512, 522, 532, 542, 552 throughout a supply chain, in accordance with an example embodiment. Scenario 500 involves order-related data 510, 520, 530, 540, 550 regarding goods G500 communicated between warehouse and supply-chain coordinator 100 and retailer 160, warehouse 140, warehouse 130, manufacturer 120, and supplier 110, respectively. Based on order-related data 510, 520, 530, 540, 550, respective shipments 512, 522, 532, 542, 552 related to goods G500 are made, with shipment 512 between warehouse/distribution center 150 and retailer 160, shipment 522 between warehouse 140 and warehouse/distribution center 150, shipment 532 between warehouse 130 and warehouse 140 (via sea), shipment 542 between manufacturer 120 and warehouse 130, and shipment 542 between supplier 110 and manufacturer 120. Upon completion of all of shipments 512, 522, 532, 542, 552, scenario 500 can be completed.

Scenario 500 is a proactive scenario, where warehouse and supply-chain coordinator 100 first receives order-related data 510 that includes POS data indicating sales of goods G500 at retailer 160. Utilizing the POS data in order-related data 510 and other order-predictive data, warehouse and supply-chain coordinator 100 determines a forecast amount FA500 of goods G500 to be provided throughout the supply chain shown in FIG. 5. Warehouse and supply-chain coordinator 100 also determines that to have sufficient supplies of goods G500 to meet forecast amount FA500 throughout the supply chain that manufacturer 120 needs more raw materials for goods G500 to produce the forecast amount FA500 of goods G500, and that some of the forecast amount FA500 of goods G500 are to be stored at each of warehouse 130, warehouse 140, warehouse/distribution center 150, and an additional amount AM500 of goods G500 are to be ordered on behalf of retailer 160 based on the POS data.

Then, warehouse and supply-chain coordinator 100 and supplier 110 communicate order-related data 550 to order a supply of raw materials for goods G500 on behalf of manufacturer 120, and coordinate shipment of the supply of raw materials for goods G500 to be shipped to manufacturer 120 as part of shipment 552 carried by truck 112. Warehouse and supply-chain coordinator 100 and manufacturer 120 communicate order-related data 540 to inform manufacturer 120 about the supply of raw materials for goods G500 arriving via shipment 552/truck 112, to order the forecast amount FA500 of goods G500, and to coordinate shipment of the forecast amount FA500 of goods G500 to warehouse 130 as part of shipment 542 carried by truck 124.

Scenario 500 continues with warehouse and supply-chain coordinator 100 and warehouse 130 communicating order-related data 530 to inform warehouse 130 about shipment 542 of the forecast amount FA500 of goods G500 arriving via truck 124, to store a portion P130 of the forecast amount FA500 of goods G500 at warehouse 130, and to coordinate shipment of the remaining amount RA130 of goods G500 to warehouse 140 as part of shipment 532 carried by sea freight 136. Then, warehouse and supply-chain coordinator 100 and warehouse 140 communicate order-related data 520 to inform warehouse 140 about shipment 532 of the remaining amount RA130 of goods G500 arriving via sea freight 136, to store a portion P140 of the remaining amount RA130 of goods G500 at warehouse 140, and to coordinate shipment of a now-remaining amount RA140 goods G500 to warehouse/distribution center 150 as part of shipment 522 carried by truck 142.

Scenario 500 continues with warehouse and supply-chain coordinator 100 and warehouse 140 communicating order-related data 520 to inform warehouse 140 about shipment 532 of the remaining amount RA130 of goods G500 arriving via sea freight 136, to store a portion P140 of the remaining amount RA130 of goods G500 at warehouse 140, and to coordinate shipment of additional amount AM500 of goods G500 to retailer 160 via shipment 522 carried by truck 142. In scenario 500, shipment 522 unexpectedly terminates at warehouse/distribution center 150, and so warehouse and supply-chain coordinator 100 arranges shipment 512 of the additional amount AM500 of goods G500 to retailer 160 carried by truck 152. Upon completion of shipment 512, scenario 500 can be completed.

In a related proactive scenario, warehouse and supply-chain coordinator 100 first receives order-related data 550 from supplier 110 indicating that raw materials for producing goods G500 are available and ready for shipment to manufacturer 120. Warehouse and supply-chain coordinator 100 then communicates order-related data 540 to manufacturer 120 requesting production of goods G500 and shipment of the produced goods G500 via shipment 542 on truck 124 to warehouse 130, and communicates additional order-related data 550 to supplier 110 ordering raw materials for goods G500 to be shipped to manufacturer 120 via shipment 552 on truck 112.

Upon reception of the raw materials for goods G500 on shipment 552, manufacturer 120 produces goods G500 and ships the produced goods G500 via shipment 542 on truck 124 to warehouse 130. Warehouse and supply-chain coordinator 100 communicates order-related data 530 to warehouse 130 requesting storage of goods G500 received via shipment 542 and subsequent shipment of goods G500 to warehouse 140 as part of shipment 532 carried by sea freight 136. Warehouse and supply-chain coordinator 100 communicates order-related data 520 to warehouse 140 requesting storage of goods G500 received via shipment 532 and subsequent shipment of goods G500 to warehouse/distribution center 150 as part of shipment 522 carried by truck 142.

Warehouse and supply-chain coordinator 100 communicates order-related data 510 to retailer 160 indicating an order of goods G500 placed on behalf of retailer 160 will arrive from warehouse/distribution center 150 via shipment 512 carried by truck 152. In this related scenario, retailer 160 can have an outstanding, unfulfilled order for goods G500 that is at least partially fulfilled by the order of goods G500 arriving via shipment 512.

In a related reactive scenario, retailer 160 sends order-related data 510 with an order for an additional amount AM500 of goods G500 to warehouse and supply-chain coordinator 100. Warehouse and supply-chain coordinator 100 inquires at manufacturer 120, warehouse 130, and warehouse 140 as part of respective order-related data 540, 530, and 520 to locate the additional amount AM500 of goods G500, but no goods G500 are available. Warehouse and supply-chain coordinator 100 then coordinates with supplier 110 via order-related data 550 and manufacturer 120 to order raw materials for at least the additional amount AM500 of goods G500 from supplier 110 and to ship the raw materials via shipment 552 carried by truck 112. Upon reception of the raw materials, manufacturer 120 manufactures the at least the additional amount AM500 of goods G500 and informs warehouse and supply-chain coordinator 100 that the at least the additional amount AM500 of goods G500 are ready for shipment.

Warehouse and supply-chain coordinator 100 uses order-related data 530, 520, and 510 to coordinate shipment of the additional amount AM500 of goods G500 to retailer 160 via: shipment 542 carried by truck 124 to warehouse 130, shipment 532 carried by sea freight 136 to warehouse 140, and shipment 522 carried by truck 142 to retailer 160 bypassing warehouse/distribution center 150. Upon completion of shipment 522 and delivery of the additional amount AM500 of goods G500 to retailer 160, this related reactive scenario can be completed. Other proactive and reactive scenarios are possible as well.

Figure 6:
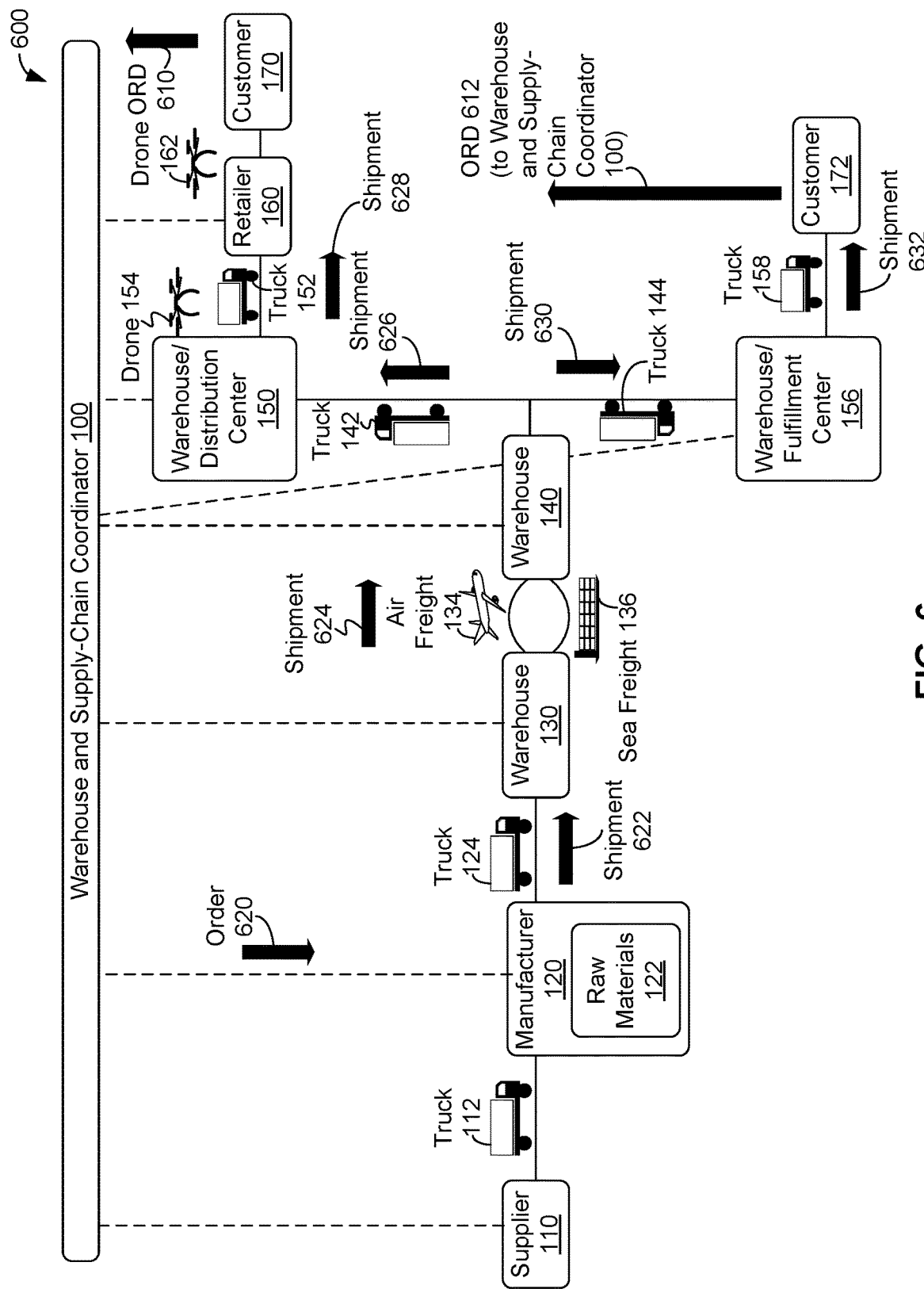
FIG. 6 illustrates a scenario where order-related data from a customer triggers shipments throughout a supply chain, in accordance with an example embodiment.

FIG. 6 illustrates scenario 600 where order-related data 610, 612 from customers 170, 172 triggers order 620 and shipments 622, 624, 626, 628, 630, 632 throughout a supply chain, in accordance with an example embodiment.

Scenario 600 begins with order-related data 610 from customer 170 and order-related data 612 from customer 172 being transmitted to warehouse and supply-chain coordinator 100. In scenario 600, order-related data 610 includes an indication of an electronic commerce (e-commerce) purchase of a quantity Q170 of goods G600 and order-related data 612 includes search query data related to goods G600 and a subsequent conversion of the search query into an e-commerce purchase of a quantity Q172 of goods G600. In other scenarios, other and/or additional order-related data 610, 612 are possible as well.

In scenario 600, warehouse and supply-chain coordinator 100 analyzes order-related data 610, 612 and additional data, such as but not limited to the above-mentioned order-predictive data, to both fulfill the purchases made by respective customers 170, 172 and to order additional goods G600 to be stored in the supply chain; e.g., at warehouse/distribution center 150, warehouse/fulfillment center 156 and/or retailer 160, for future distribution of goods G600. Upon reception of order-related data 610, 612, warehouse and supply-chain coordinator 100 sends order 620 to manufacturer 120 for a complete quantity CQ600 of goods G600.

In scenario 600, warehouse and supply-chain coordinator 100 arranges shipment 622 of complete quantity CQ600 of goods G600 to warehouse 130 via truck 124. For example, warehouse and supply-chain coordinator 100 can send an order to a shipper associated with truck 124 to order pick up of complete quantity CQ600 of goods G600 at a first mutually-agreed upon date and subsequent delivery of the complete quantity CQ600 of goods G600 at warehouse 130 at a second mutually-agreed upon date. In another example where truck 124 is an autonomous vehicle in communication with warehouse and supply-chain coordinator 100, warehouse and supply-chain coordinator 100 determines a pickup time PT600 for complete quantity CQ600 of goods G600 at manufacturer 120. Then, warehouse and supply-chain coordinator 100 directs truck/autonomous vehicle 124 to arrive at manufacturer 120 at PT600 to pick up the complete quantity CQ600 of goods G600 and subsequently deliver the goods to warehouse 130. Other techniques for arranging shipments of goods using supply-chain coordinator 100 are possible as well; e.g., supply-chain coordinator 100 arranging shipment 622 by communicating directly with a vehicle that that is not an autonomous vehicle and/or a vehicle owned by the same entity that owns warehouse and supply-chain coordinator 100.

Upon production of complete quantity CQ600 of goods G600, truck 124 picks up complete quantity CQ600 of goods G600 and conveys the goods as part of shipment 622 to warehouse 130. Complete quantity CQ600 of goods G600 are then unloaded and stored at warehouse 130. Warehouse and supply-chain coordinator 100 arranges shipment 624 of a first portion FP600 of the complete quantity CQ600 of goods G600 from warehouse 130 to warehouse 140 via air freight 134, where FP600≤CQ600. In scenario 600, FP600 equals CQ600; that is, the complete quantity CQ600 of goods G600 is shipped via shipment 624/air freight 134 to warehouse 140. In other scenarios where FP600<CQ600, a remaining portion of a quantity (CQ600−FP600) of goods G600 can be stored at warehouse 130; i.e. for later shipment via air freight 134, sea freight 136, and/or via another shipment means.

Upon arrival of air freight 134, the first portion FP600 of goods G600 are unloaded from air freight 134 and subsequently stored at warehouse 140. Of the first portion FP600 of goods G600, a second portion SP600 of goods G600 are loaded onto truck 142 as part of shipment 626 and a third portion TP600 of goods G600 are loaded onto truck 144 as part of shipment 630. Both shipments 626 and 630 are arranged by warehouse and supply-chain coordinator 100.

In scenario 600, second portion SP600 and third portion TP600 equal first portion FP600; in other scenarios, some of second portion SP600 and/or third portion TP600 of goods G600 are stored in warehouse 140; i.e., for later shipment by truck 142, truck 144, and/or via another shipment means.

Upon arrival of truck 142 carrying shipment 626 at warehouse/distribution center 150, second portion SP600 of goods G600 are unloaded from truck 142 and stored at warehouse/distribution center 150. Then, warehouse and supply-chain coordinator 100 arranges for shipment of at least the quantity Q170 of goods G600 from warehouse/distribution center 150 to retailer 160 via shipment 628 carried by truck 152 and subsequent shipment of quantity Q170 of goods G600 from retailer 160 to customer 170 via drone 162 to fulfill the order placed as part of order-related data 610.

Upon arrival of truck 144 carrying shipment 630 at warehouse/fulfillment center 156, third portion TP600 of goods G600 are unloaded from truck 144 and stored at warehouse/fulfillment center 156. Then, warehouse and supply-chain coordinator 100 arranges for shipment of the quantity Q172 of goods G600 from warehouse/fulfillment center 156 to customer 172 via shipment 632 carried by truck 158 to fulfill the order placed as part of order-related data 612. Once the orders placed as part of order-related data 610, 612 are fulfilled, scenario 600 can be completed.

In scenario 600, warehouse and supply-chain coordinator 100 obtains at least shipping and tracking information for all shipments of supplies and goods, including shipments of goods G600, throughout the supply chain shown in FIG. 6. For example, upon receiving the order from customer 170 as part of order-related information 610 for quantity Q170 of goods G600, warehouse and supply-chain coordinator 100 searches its own data to determine whether goods G600 can be supplied from an existing stock of goods G600; e.g., a quantity of goods G600 that is greater than Q170 and is located in a warehouse or other facility in communications with warehouse and supply-chain coordinator 100. In scenario 600, warehouse and supply-chain coordinator 100 did not find the quantity Q170 of goods G600, and so warehouse and supply-chain coordinator 100 sends order 620 to manufacturer 120 for goods G600. Also, warehouse and supply-chain coordinator 100 updates shipping information for the order placed by customer 170 to indicate that the quantity Q170 of goods G600 are on order. In this instance, an estimated delivery date is determined when the quantity Q170 of goods G600 are estimated to arrive at customer 170; i.e., via shipments 622, 624, 626, 628, and a flight of drone 162.

Both while shipments 622, 624, 626, 628 are underway and as each of the shipments is completed, warehouse and supply-chain coordinator 100 updates the shipping information for customer 170. Warehouse and supply-chain coordinator 100 also maintains tracking information for the trucks and air freight used to convey goods G600 from manufacturer 120 to customer 170. That is, warehouse and supply-chain coordinator 100 maintains time and location information for each of shipments 622, 624, 626, 628; e.g., at time T622, shipment 622 is 50 miles (or 80 kilometers) west of warehouse 130 and is expected to arrive at warehouse 130 at a later time T623, and that shipment 624/air freight 134 is destined to leave from warehouse 130 at a time T624 destined for warehouse 140.

Also, warehouse and supply-chain coordinator 100 can maintain manifest information for some or all shipments in the supply chain shown in FIGS. 2-6. For example, the manifest information for shipment 622 includes a listing of items included in the shipment; e.g., the listing includes complete quantity CQ600 of goods G600 as well as any other goods shipped from manufacturer 120 to warehouse 130 via truck 124 that is part of shipment 622.

Figure 7:
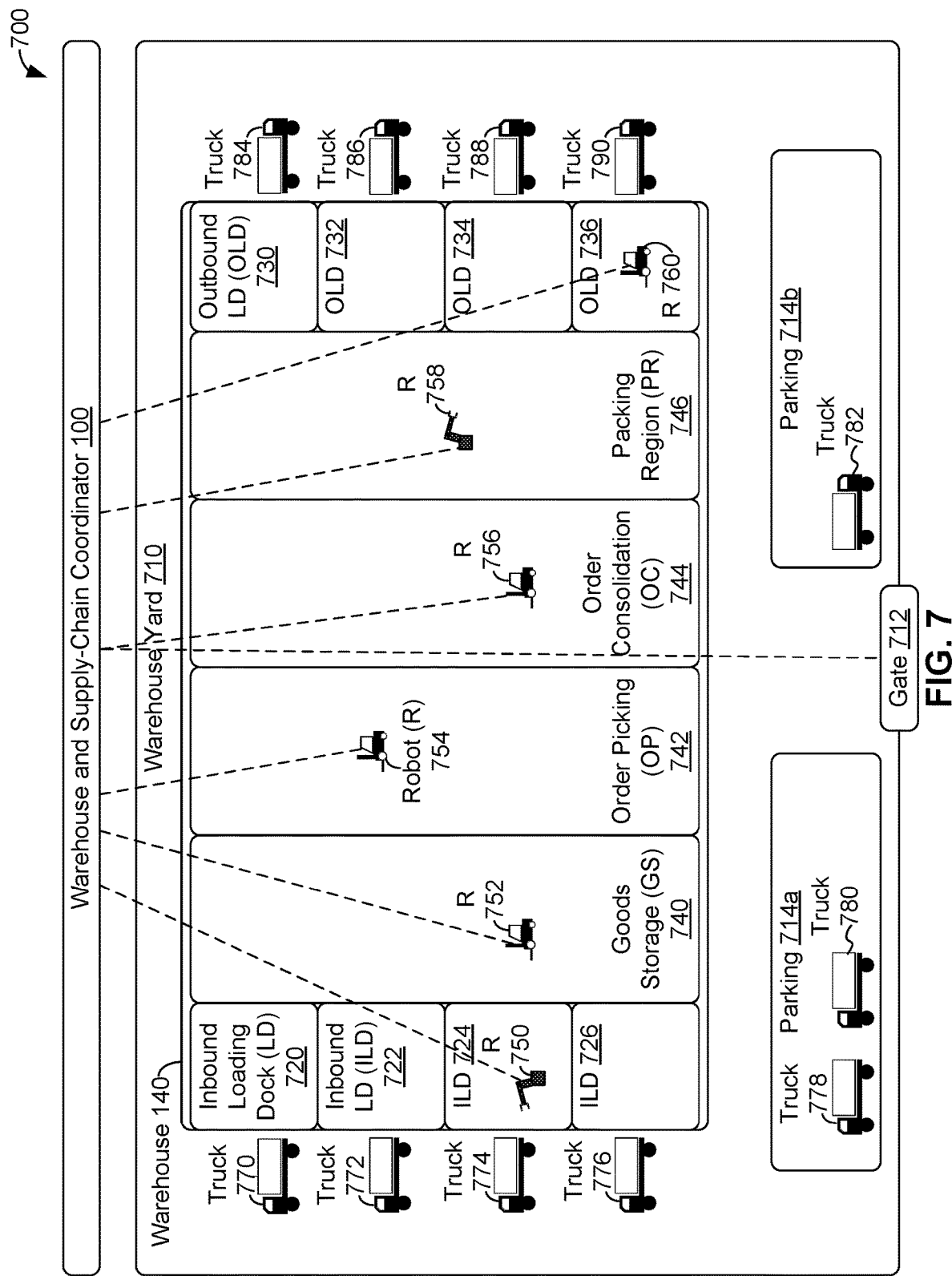
FIG. 7 depicts a system with a warehouse and supply chain coordinator, trucks, and robots associated with a warehouse, in accordance with an example embodiment.

FIG. 7 depicts system 700 with warehouse and supply chain coordinator 100 associated with warehouse 140, with system 700 including gate 712 and robots 750, 752, 754, 756, 758, 760, in communication with warehouse and supply chain coordinator 100, as indicated by dashed lines, in accordance with an example embodiment. In some examples, system 700 further includes some or all of trucks 770, 772, 774, 776, 778, 780, 782, 784, 786, 788, and 790.

Warehouse 140 includes four inbound loading docks (ILDs) 720, 722, 724, 726 where goods are unloaded from vehicles, such as trucks 770, 772, 774, 776 for storage within warehouse 140. Warehouse 140 also includes four outbound loading docks (OLDs) 730, 732, 734, 736 where goods are taken from warehouse 140 and loaded onto vehicles, such as trucks 784, 786, 788, 790, for shipment to one or more destinations. Between inbound loading docks 720, 722, 724, 726 and outbound loading docks 730, 732, 734, 736, warehouse 140 is divided into four areas: goods storage (GS) 740, order picking (OP) 742, order consolidation (OC) 744, and packing region (PR) 746. For example, a pallet of goods PG700 arriving at warehouse 140 via inbound loading dock 720 can be initially unloaded from a vehicle in warehouse yard 710 adjacent to inbound loading dock 720 to goods storage 740. Then, when an order O700 for pallet of goods PG700 is received, the pallet of goods PG700 can be taken from goods storage 740 to order picking 742 for selection as part of the order O700 and to order consolidation 744 to be grouped with other pallets of goods into group of pallets GRP700 to fulfill order O700. Then, group of pallets GRP700 can be taken to packing region 746 to be readied for shipment via an outbound loading dock; e.g, outbound loading dock 730 onto a vehicle such as truck 784 to fulfill order O700. In some examples, warehouse 140 has more or fewer inbound loading docks and/or outbound loading docks. In other examples, warehouse 140 has loading docks that are not distinguished between inbound loading docks and outbound loading docks. In still other example, warehouse 140 has more, fewer, and/or different regions than goods storage 740, order picking 742, order consolidation 744, and packing region 746.

Robots 750, 752, 754, 756, 758, 760 can be used to perform various tasks related to warehouse 140, such as, but not limited to, tasks related to: unloading pallets of goods from vehicles at inbound loading docks 720, 722, 724, 726, storing the unloaded pallets of goods within warehouse 140 (e.g., at goods storage 740), picking pallets of goods to fulfill orders, consolidating/grouping pallets of goods for shipment, packing pallets of goods for shipment, and loading pallets of goods onto vehicles at outbound loading docks 730, 732, 734, 736. In some examples, system 700 has more, fewer, and/or different robots. In the example shown in FIG. 7, warehouse and supply-chain coordinator 100 is in communication with each of robots 750, 752, 754, 756, 758, 760 so that warehouse and supply chain coordinator 100 can send commands and/or other messages to the robots and receive responses and/or other messages from the robots.

FIG. 7 shows warehouse 140 surrounded by warehouse yard 710, where vehicles, such as trucks 770-790, can maneuver in and around warehouse 140, load and unload goods to and from warehouse 140 using loading docks 720-736, and park in parking areas 714a, 714b. Warehouse 140 and warehouse yard 710 is protected by gate 712. Gate 712 can be opened and closed based on commands/messages from warehouse and supply-chain coordinator 100.

FIGS. 8, 9, 10, 11, 12, 13, 14, 15, and 16 illustrate scenario 800 where trucks arrive, load, unload, and depart a warehouse. Scenario 800 begins with truck 810 arriving at gate 712 of warehouse yard 710 and warehouse 140. Warehouse and supply-chain coordinator 100 determines that truck 810 has to park and wait for a time slot at an incoming loading dock, and so allocates parking spot 842 for truck 810, where truck 810 is parked. Warehouse and supply-chain coordinator 100 then allocates a time slot at incoming loading dock 724 starting at time T1 to truck 810, allocates space within warehouse 140 for storage of goods G1 carried by truck 810, and allocates robot 752 to unload truck 810. Goods G1 are inspected by robot 752 and are found to be in compliance with a contract for goods G1. After the successful inspection of goods G1, warehouse and supply-chain coordinator 100 directs robots 752 and 756 to unload goods G1 from truck 810 to area 922 in goods storage 740 of warehouse 140. Subsequently, truck 810 leaves warehouse 140 and warehouse yard 710.

Scenario 800 continues with warehouse and supply-chain coordinator 100 directing robots 752, 754, and 756 to move pallets P10, P11, and P12 to area 1112 in packing region 746 of warehouse 140 in preparation for arrival of truck 1210. Truck 1210 is delayed, and truck 1220 arrives before truck 1210. Upon arrival of truck 1220, warehouse and supply-chain coordinator 100 allows entry of truck 1220 via gate 712 and allocates a time slot to load truck 1220 at outbound loading dock 734 immediately. Truck 1220 enters warehouse yard 710 and parks at outbound loading dock 734. While truck 1220 is making its way to outbound loading dock 734, warehouse and supply-chain coordinator 100 directs robots 752 and 756 to rearrange pallet arrangement 1310 by moving pallets P20 and P21 closer to outbound loading dock 734 since pallets P20 and P21 are to be loaded onto truck 1220. Warehouse and supply-chain coordinator 100 also directs robots 752 and 756 to load pallets P20 and P21 onto truck 1220. After pallets P20 and P21 are loaded onto truck 1220, truck 1220 departs. Subsequently, truck 1210 arrives at warehouse 140 and parks at outbound loading dock 734. Warehouse and supply-chain coordinator 100 directs robots 752, 754, and 756 to load pallets P10, P11, and P12 onto truck 1210. After pallets P20 and P21 are loaded onto truck 1210, truck 1210 departs and warehouse and supply-chain coordinator 100 directs robots 752 and 760 to move pallets P30, P31, and P32 closer to outbound loading dock 734 in preparation for a next arriving truck. After pallets P30, P31, and P32 have been moved closer to outbound loading dock 734, scenario 800 can be completed.

Figure 8:
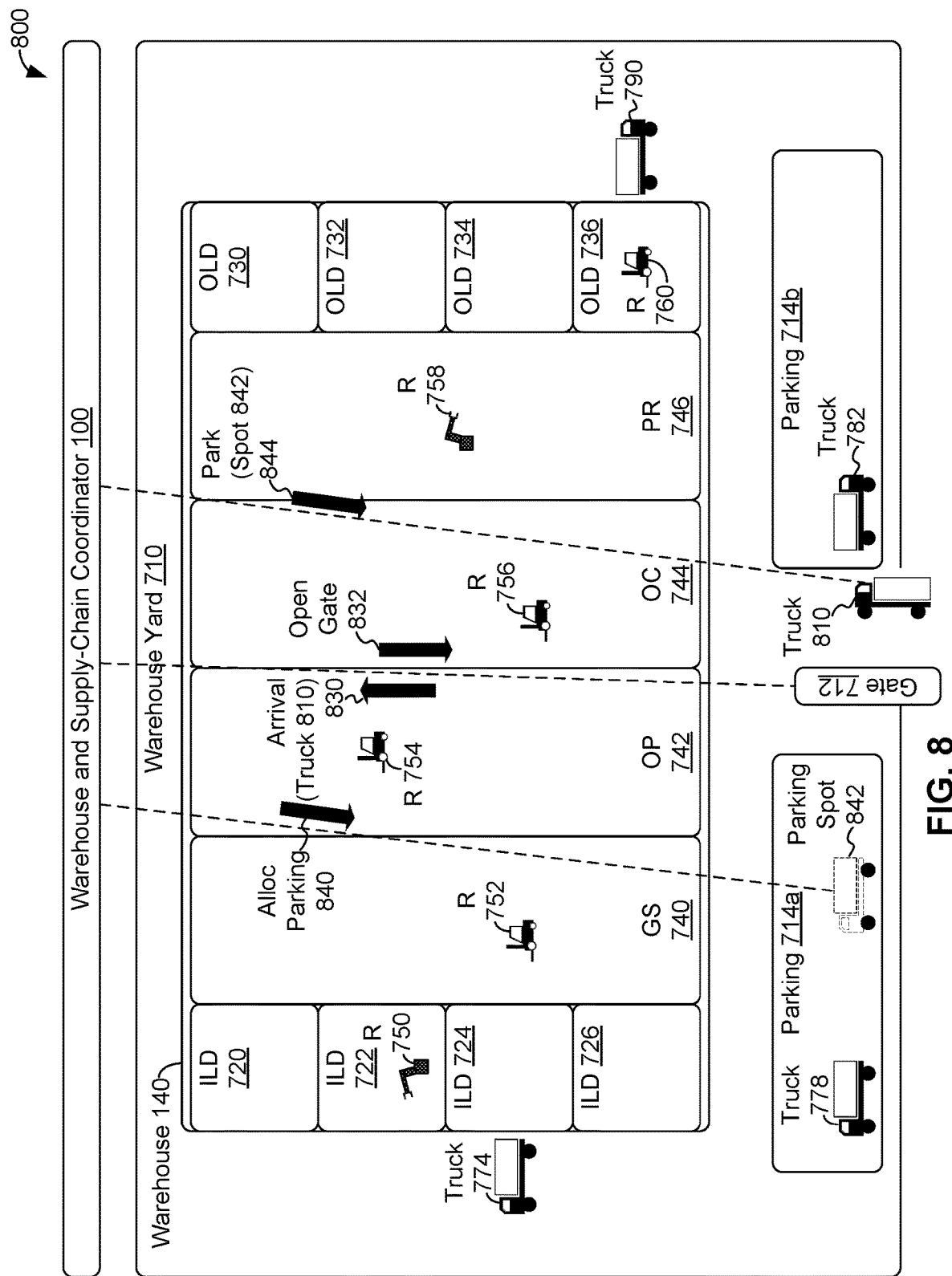
FIGS. 8, 9, 10, 11, 12, 13, 14, 15, and 16 illustrate a scenario where trucks arrive, load, unload, and depart a warehouse, in accordance with an example embodiment.

FIG. 8 shows that scenario 800 begins with truck 810 arriving at gate 712 of warehouse yard 710 that surrounds warehouse 140. In scenario 800, truck 810 carries goods G1 destined for warehouse 140. Upon arrival of truck 810, gate 712 sends arrival message 830 to inform warehouse and supply-chain coordinator 100 of the arrival of truck 810. In response, warehouse and supply-chain coordinator 100 sends open gate message 832 to gate 712 to open the gate and allow truck 810 to enter into warehouse yard 710.

After receiving arrival message 830, warehouse and supply-chain coordinator 100 determines that inbound loading dock 724 is to be used to load goods onto truck 810, and that inbound loading dock 724 is currently occupied with the loading of truck 774 as shown at a left side of FIG. 8. Warehouse and supply-chain coordinator 100 then allocates 840 a parking spot 842 to truck 810 and sends park message 844 directing truck 810 to park in parking spot 842.

Figure 9:
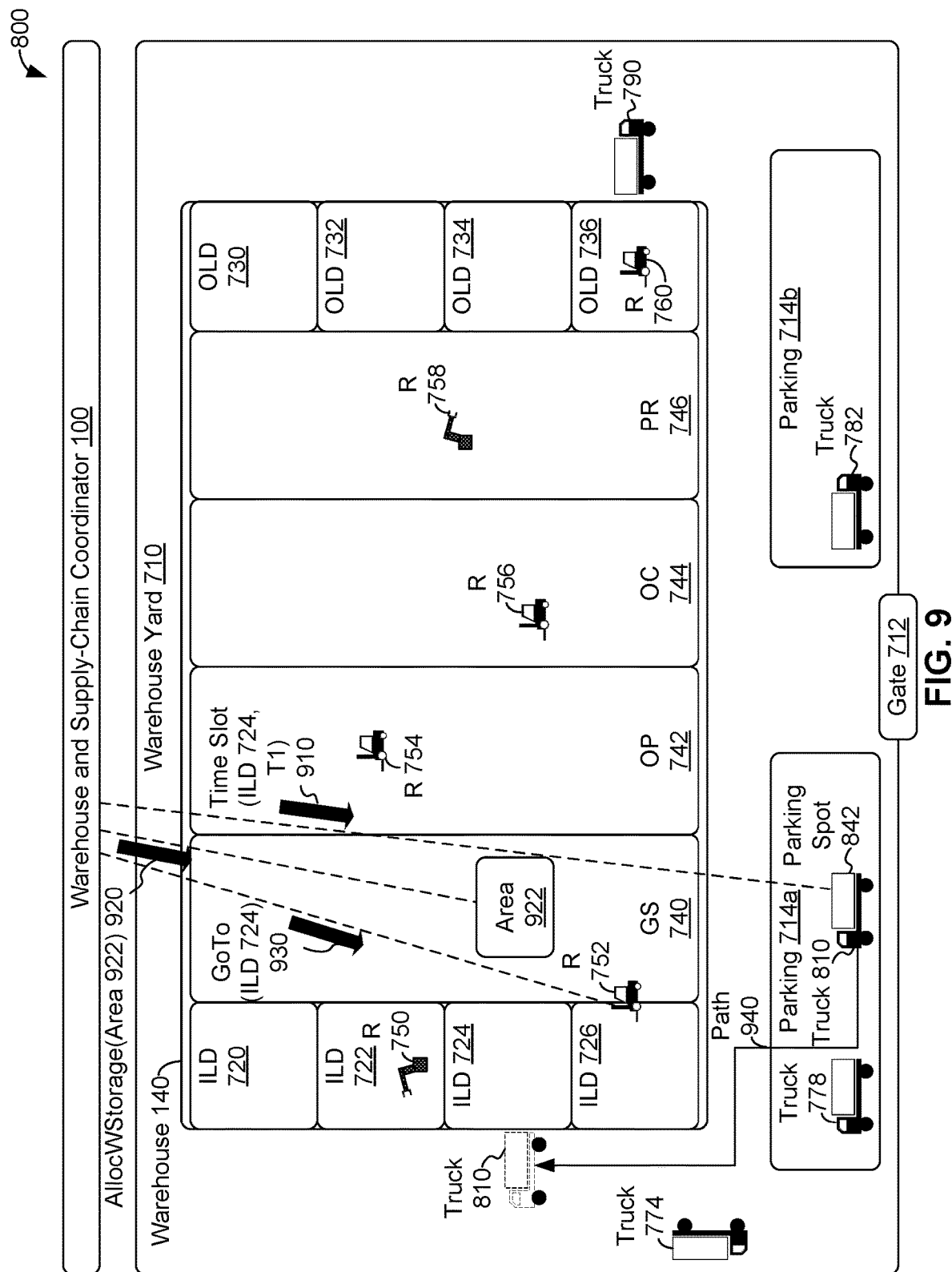

FIG. 9 shows that scenario 800 continues after truck 810 has parked in parking spot 842. Warehouse and supply-chain coordinator 100 allocates a time slot starting at time T1 for inbound loading dock 724 to truck 810, and informs truck 810 of this time slot allocation using time slot message 910.

Warehouse and supply-chain coordinator 100 also allocates an area, area 922, within goods storage 740 of warehouse 140 for storing pallets unloaded from truck 810, as indicated by allocate warehouse storage (AllocWStorage) message 920. Warehouse and supply-chain coordinator 100 further sends GoTo message 930 directing robot 752 to travel to incoming loading dock 724. Just before time T1, truck 774 departs from incoming loading dock 724 and truck 810 travels along path 940 to park at incoming loading dock 724 at time T1.

Figure 10:
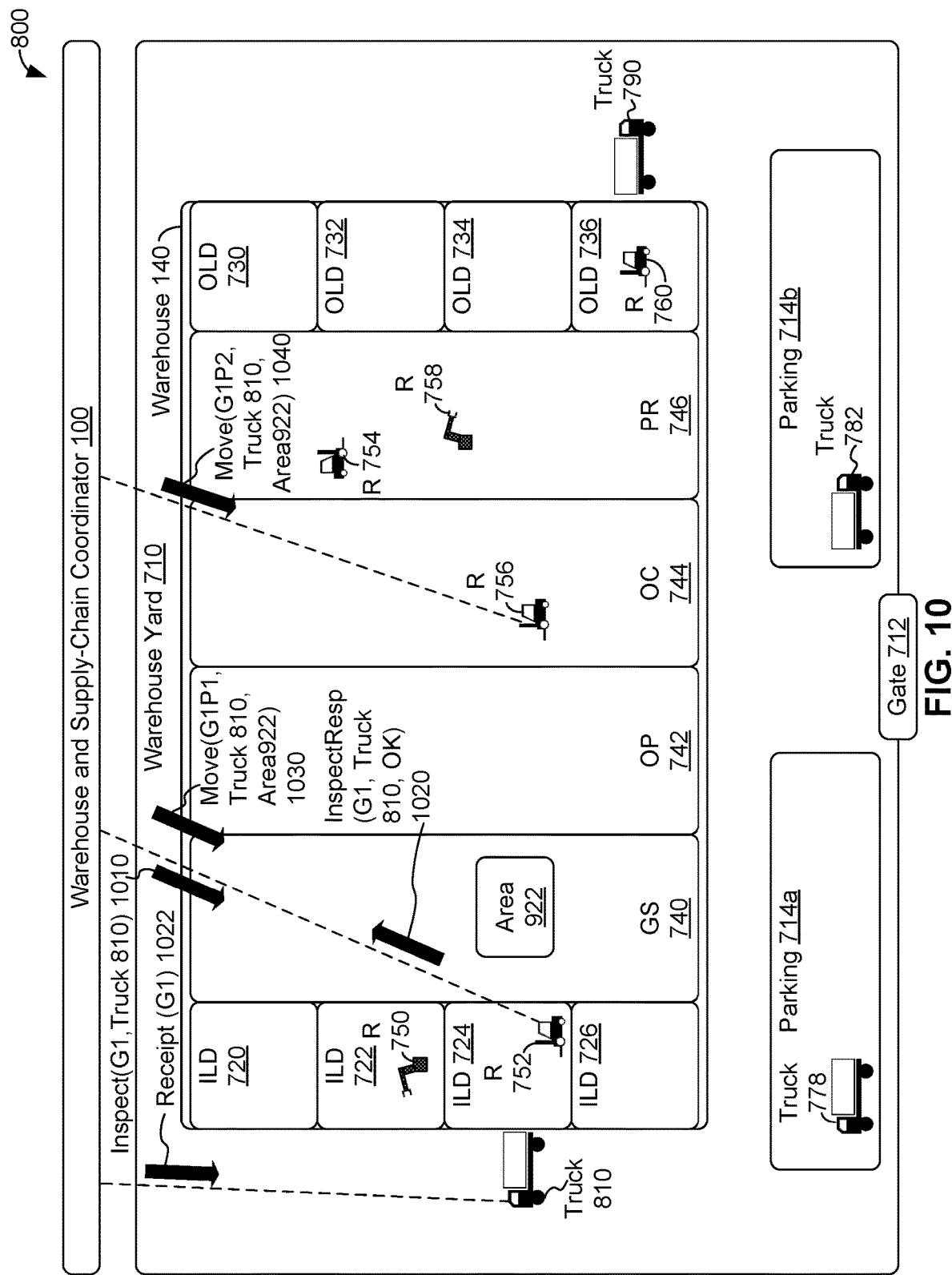

FIG. 10 shows that scenario 800 continues with truck 810 arriving at inbound loading dock 724 at time T1. Warehouse and supply-chain coordinator 100 sends inspect message 1010 to robot 752 to inspect goods G1 on truck 810. Upon reception of inspect message 1010, robot 752 inspects goods G1 to determine their compliance with a contract for the goods G1. In scenario 800, goods G1 aboard truck 810 are compliant with the contract, and so robot 752 sends inspect response (InspectResp) message 1020 indicating goods G1 are compliant "OK" with the contract. To inspect goods G1, robot 752 can visually inspect goods G1, scan text, bar codes, Radio Frequency ID (RFID), and/or Quick Response (QR) codes on and/or associated with goods G1, provide a video and/or audio information related to goods G1 on truck 810 for inspection by another entity, such as a warehouse and supply-chain coordinator 100 and/or a human inspector, physically examine goods G1 using one or more actuators and/or sensors, and/or use other reasonable techniques to inspect goods G1. As goods G1 are compliant with the contract, warehouse and supply-chain coordinator 100 sends receipt 1022 to truck 810 for goods G1 to indicate acceptance of goods G1 from truck 810 at warehouse 140.

In other scenarios, goods G1 are not compliant with the contract—in those scenarios, the inspect response message indicates that goods G1 are "NOT OK" or non-compliant with the contract. In these scenarios, warehouse and supply-chain coordinator 100 sends a rejection message rejecting goods G1 rather than a receipt 1022 for goods G1. Also in these other scenarios, at least the rejected goods G1 are not unloaded from truck 810.

In scenario 800, goods G1 are loaded on to two pallets—G1P1 and G1P2. After the successful inspection of goods G1, warehouse and supply-chain coordinator 100 sends move message 1030 to robot 752 to move pallet "G1P1" from truck 810 to area 922, and sends move message 1040 to robot 756 to move pallet "G1P2" from truck 810 to area 922. Once pallets G1P1 and G1P2 have been unloaded, truck 810 pulls away from incoming loading dock 724 and leaves warehouse yard 710 via gate 712.

Figure 11:
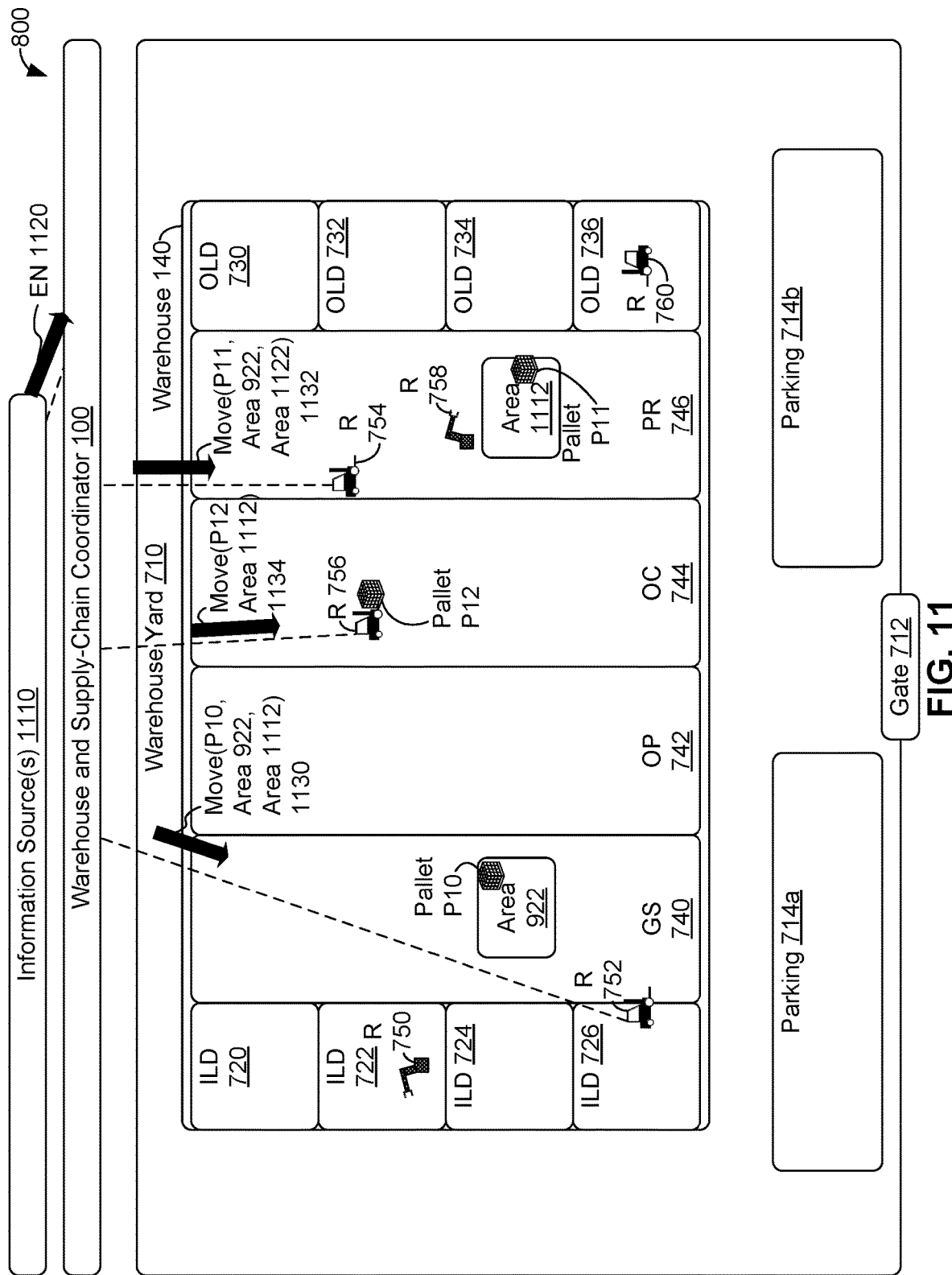

Scenario 800 continues, as shown in FIG. 11, with one or more information sources 1110 providing event notification 1120 to warehouse and supply-chain coordinator 100. In scenario 800, event notification 1120 causes warehouse and supply-chain coordinator 100 to "re-slot" or move within warehouse 140 three pallets: P10, P11, and P12. In scenario 800, event notification 1120 includes information about a weather related event, and goods in pallets P10, P11, and P12 can be used to address concerns with the weather related event; e.g., sun screen for a hot weather event, snow shovels for a winter storm event. Other types of events and related event information are possible, such as discussed above at least in the context of FIG. 3.

In response to event notification 1120, warehouse and supply-chain coordinator 100 re-slots pallets P10, P11, and P12 to area 1112 within packing region 746; i.e., makes pallets P10, P11, and P12 more readily available for shipment after re-slotting. In scenario 800, re-slotting occurs when warehouse 140 is not loading or unloading goods at loading docks 720, 722, 724, 726, 730, 732, 734, 736; in other scenarios, re-slotting occurs while goods are being loaded and/or unloaded at warehouse 140. In additional other scenarios, re-slotting occurs based on available storage within warehouse 140 (e.g., re-slot from relatively-full areas to relatively-empty areas of warehouse 140), based on expected vehicle arrivals/departures and/or shipments of goods, one or more velocities of goods, based on a re-slotting list of pallets maintained by warehouse and supply-chain coordinator 100, and/or for other reasons.

In still other scenarios, re-slotting involves re-slotting during robot "deadhead" time; e.g., if robot is instructed to take a pallet to a loading dock and return to a location L within warehouse 140, then the robot can return to location L (or another location) within warehouse 140 with a pallet being re-slotted rather than returning to location L empty/deadheaded (that is, not carrying anything back to location L). Other types of deadhead time; e.g., when the robot is not assigned to carry out a task, can be utilized for re-slotting as well.

To re-slot pallets P10, P11, and P12 to area 1112, warehouse and supply-chain coordinator 100 sends respective move messages 1130, 1132, 1134 to robots 752, 754, 756 to move all three of respective pallets P10, P11, and P12 to area 1112.

Figure 12:
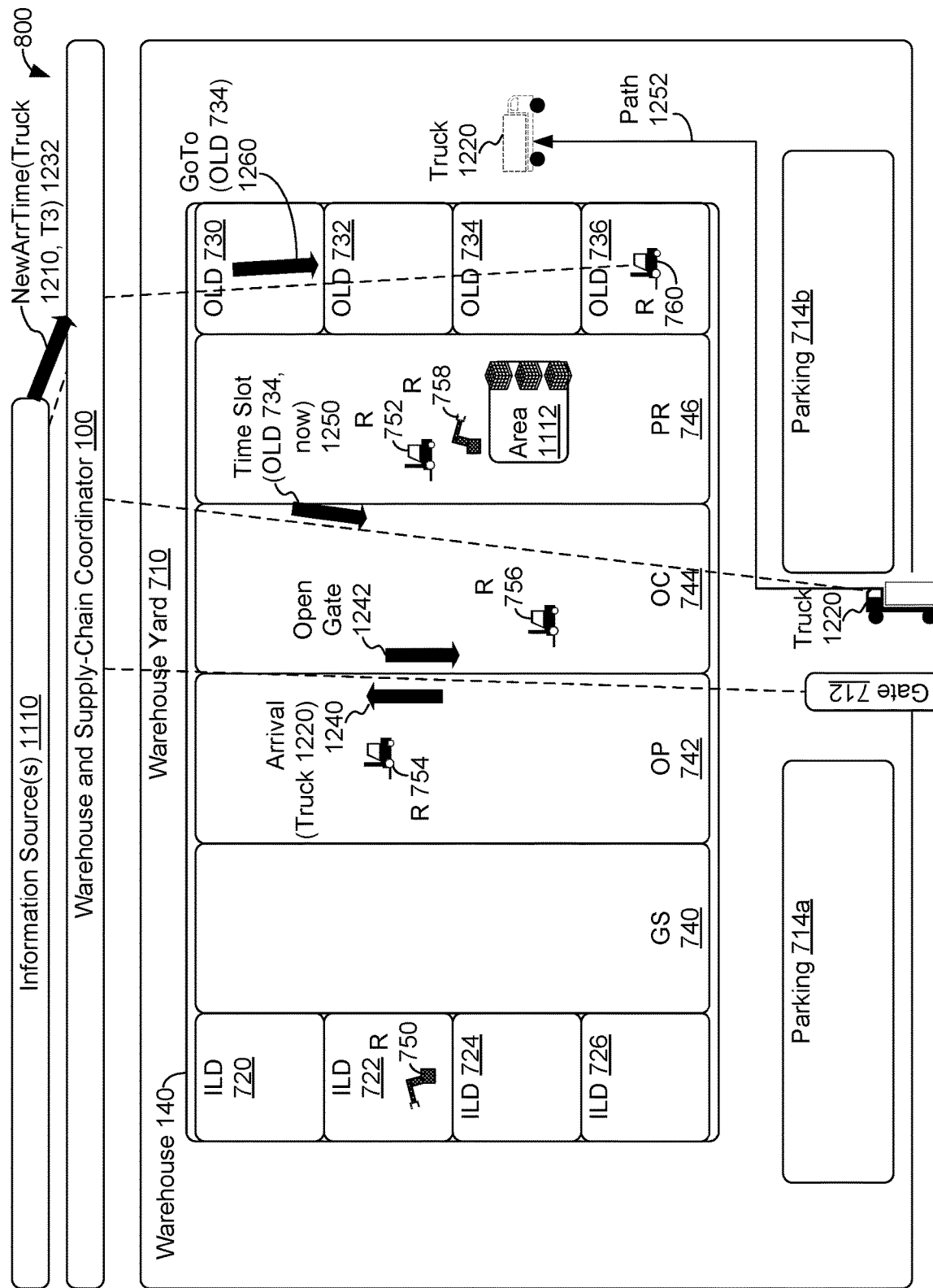

In scenario 800, trucks 1210, 1220, 1230 are expected to be the next three vehicles to arrive at warehouse 140 in that order. FIG. 12 shows that scenario 800 continues with information source(s) 1110 sending new arrival time ("NewArrTime") message 1232 informing warehouse and supply-chain coordinator 100 that truck 1210 has been delayed and is now expected to arrive at time T3 in the future.

FIG. 12 also shows truck 1220 arriving at gate 712 of warehouse yard 710. Gate 712 sends arrival message 1240 informing warehouse and supply-chain coordinator 100 that truck 1220 has arrived at gate 712. In response to arrival message 1240, warehouse and supply-chain coordinator 100 sends open gate message 1242 instructing gate 712 to open, thereby allowing truck 1220 access to warehouse yard 710. Warehouse and supply-chain coordinator 100 allocates a time slot starting immediately at outbound loading dock 734 and sends time slot message 1250 informing truck 1220 that it has a time slot at outbound loading dock 734 starting "now". In response to time slot message 1250, truck 1220 starts along path 1252 toward outbound loading dock 734. In preparation of the arrival of truck 1220 at outbound loading dock 734, warehouse and supply-chain coordinator 100 sends GoTo message 1260 directing robot 760 to travel toward outbound loading dock 734.

In some scenarios, the time slot at outbound loading dock 734 is previously allocated to truck 1210, as truck 1210 is expected to be a next arriving vehicle at outbound loading dock 734. For example, if vehicle loading and/or unloading is not performed at warehouse 140 during a "no-load" interval, such as during an overnight shift, then a timeslot for a first arriving vehicle after the no-load interval can be previously allocated by warehouse and supply-chain coordinator 100. In these scenarios, the time slot at outbound loading dock 734 to truck 1210 can be released before the time slot is allocated to truck 1220, as discussed above regarding time slot message 1250.

Figure 13:
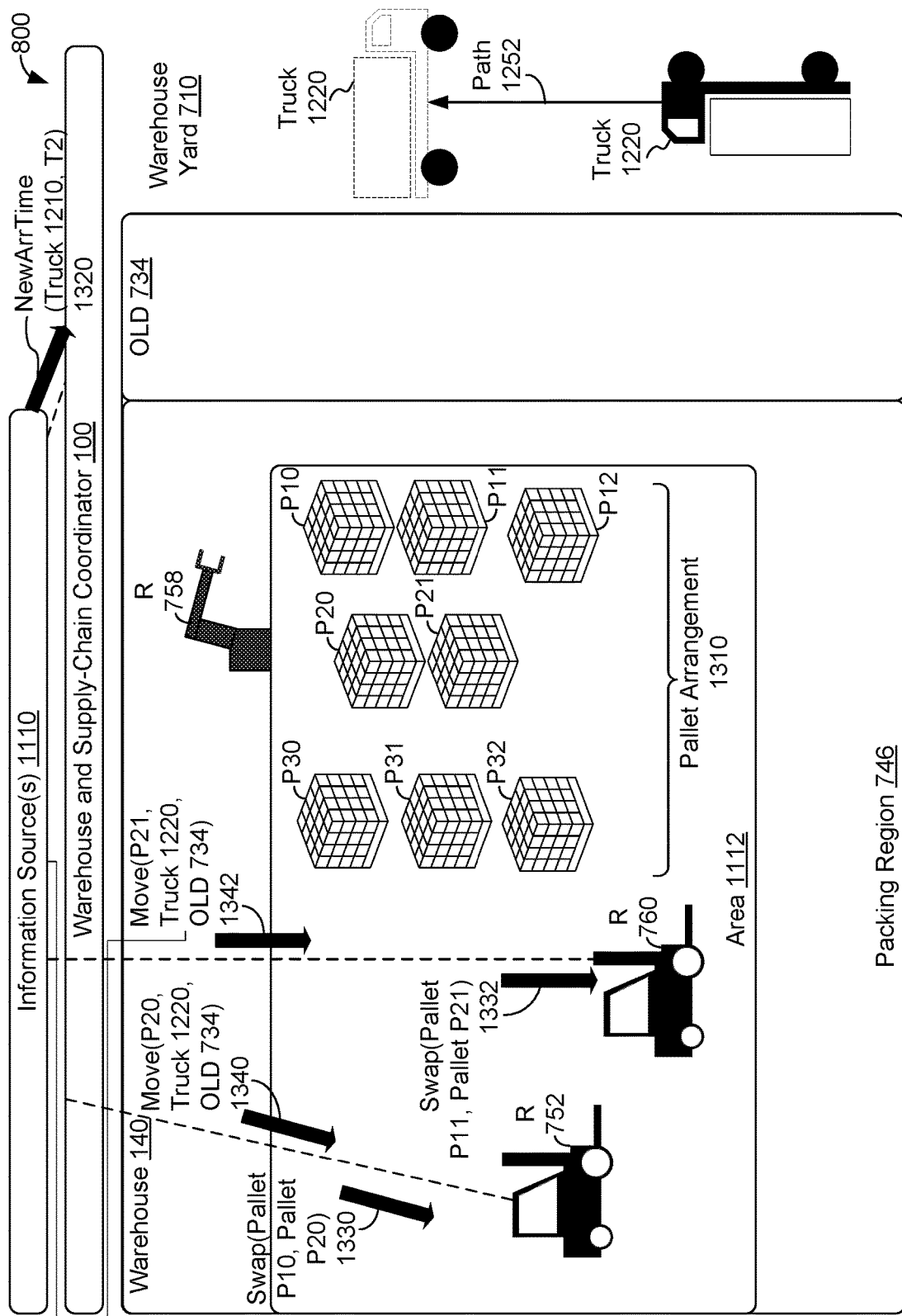

FIG. 13 shows a portion of warehouse 140 that includes outbound loading dock 734, packing region 746, and all of area 1112, as well as a portion of warehouse yard 710 near outbound loading dock 734. Scenario 800 continues with truck 1220 continuing on path 1252 toward outbound loading dock 734. Warehouse and supply-chain coordinator 100 determines to rearrange pallet arrangement 1310 as much as possible before truck 1220 arrives at outbound loading dock 734.

FIG. 13 shows that pallet arrangement 1310 has three columns of pallets: a first column of pallets P10, P11, and P12 destined for loading onto truck 1210, a second column of pallets P20 and P21 destined for loading onto truck 1220, and a third column of pallets P30, P31, and P32 destined for loading onto truck 1230, where the first column of pallets is closer to outbound loading dock 734 that the second column of pallets, which in turn is closer to outbound loading dock 734 that the third column of pallets. Pallet arrangement 1310 is so organized to enable faster loading for truck 1210, which was expected to be the next truck arriving at outbound loading dock 734; i.e., the first column of pallets are both destined for loading onto truck 1210 and are closest to outbound loading dock 734. But, as mentioned above, truck 1210 has been delayed and truck 1220 is now the next truck arriving outbound loading dock 734. In some examples, each column of pallets can be considered to be a queue entry of a pallet arrangement, where such queue entries are discussed below at least in the context of FIGS. 17-22.

To help speed loading of truck 1220, warehouse and supply-chain coordinator 100 determines to swap the first and second columns of pallets, thus placing pallets P20 and P21 destined for truck 1220 closer to outbound loading dock 734 for faster loading onto truck 1220. In scenario 800, though, there is not enough time to fully swap the first and second columns of pallets before truck 1220 arrives and parks at outbound loading dock 734. So, warehouse and supply-chain coordinator 100 sends swap message 1330 to robot 752 to swap pallets P10 and P20, and sends swap message 1332 to robot 760 to swap pallets P11 and P21, thus moving the two pallets destined for truck 1220 (P20 and P21) closer to outbound loading dock 734, while pallet P12 destined for truck 1210 remains in the first column of pallet arrangement 1310.

Scenario 800 continues with truck 1220 arriving at outbound loading dock 734. After truck 1220 arrives at outbound loading dock 734, warehouse and supply-chain coordinator 100 instructs robots 752 and 760 to load truck 1220. In particular, warehouse and supply-chain coordinator 100 sends move message 1340 to robot 752 to move pallet "P20" to "Truck 1220" that is loaded at "OLD" (outbound loading dock) "734", and sends move message 1342 to robot 752 to move pallet "P21" to "Truck 1220" that is loaded at "OLD 734". In other scenarios, rather than swapping pallets, robots 752 and 760 load truck 1220 with pallets P20 and P21 that are initially in the second column of pallet arrangement 1310.

Figure 14:
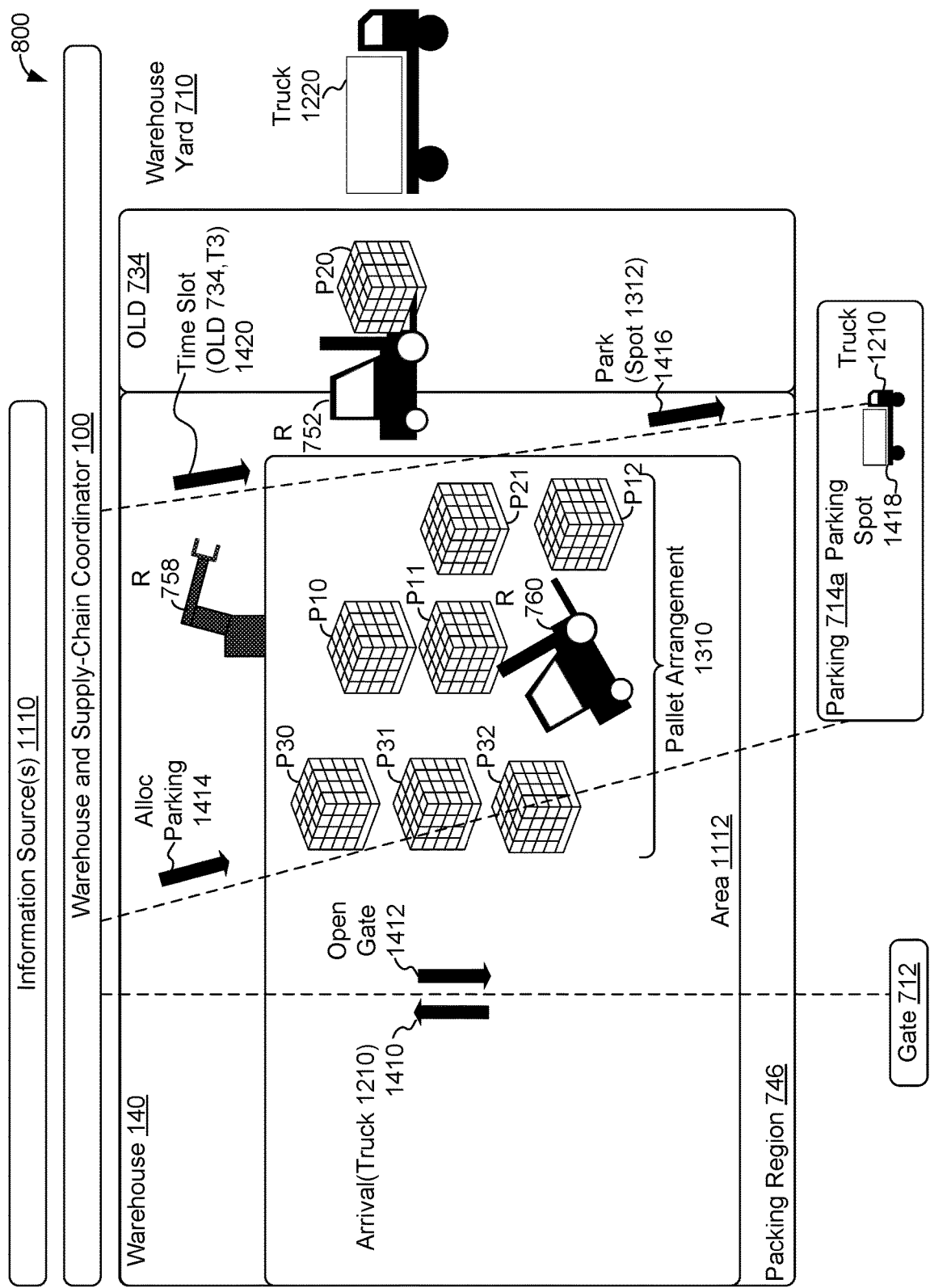

FIG. 14 shows robots 752 and 760 loading respective pallets P20 and P21 onto truck 1220. While truck 1220 is being loaded, truck 1210 arrives at gate 712. Gate 712 sends arrival message 1410 informing warehouse and supply-chain coordinator 100 of the arrival of truck 1210. In response to arrival message 1410, warehouse and supply-chain coordinator 100 instructs gate 712 to open via open gate message 1412, thereby permitting truck 1210 to enter warehouse yard 710.

Warehouse and supply-chain coordinator 100 determines that truck 1210 has to park and wait until truck 1220 is loaded before proceeding to outgoing loading dock 734 and so allocates parking spot 1418 for truck 1210 as indicated by allocate parking message 1414. Warehouse and supply-chain coordinator 100 sends park message 1416 to inform truck 1210 to park at parking spot 1418. Warehouse and supply-chain coordinator 100 then allocates a time slot at outgoing loading dock 734 starting at time T3 to truck 1210 and sends time slot message 1420 to inform truck 1210 about the allocated time slot.

Figure 15:
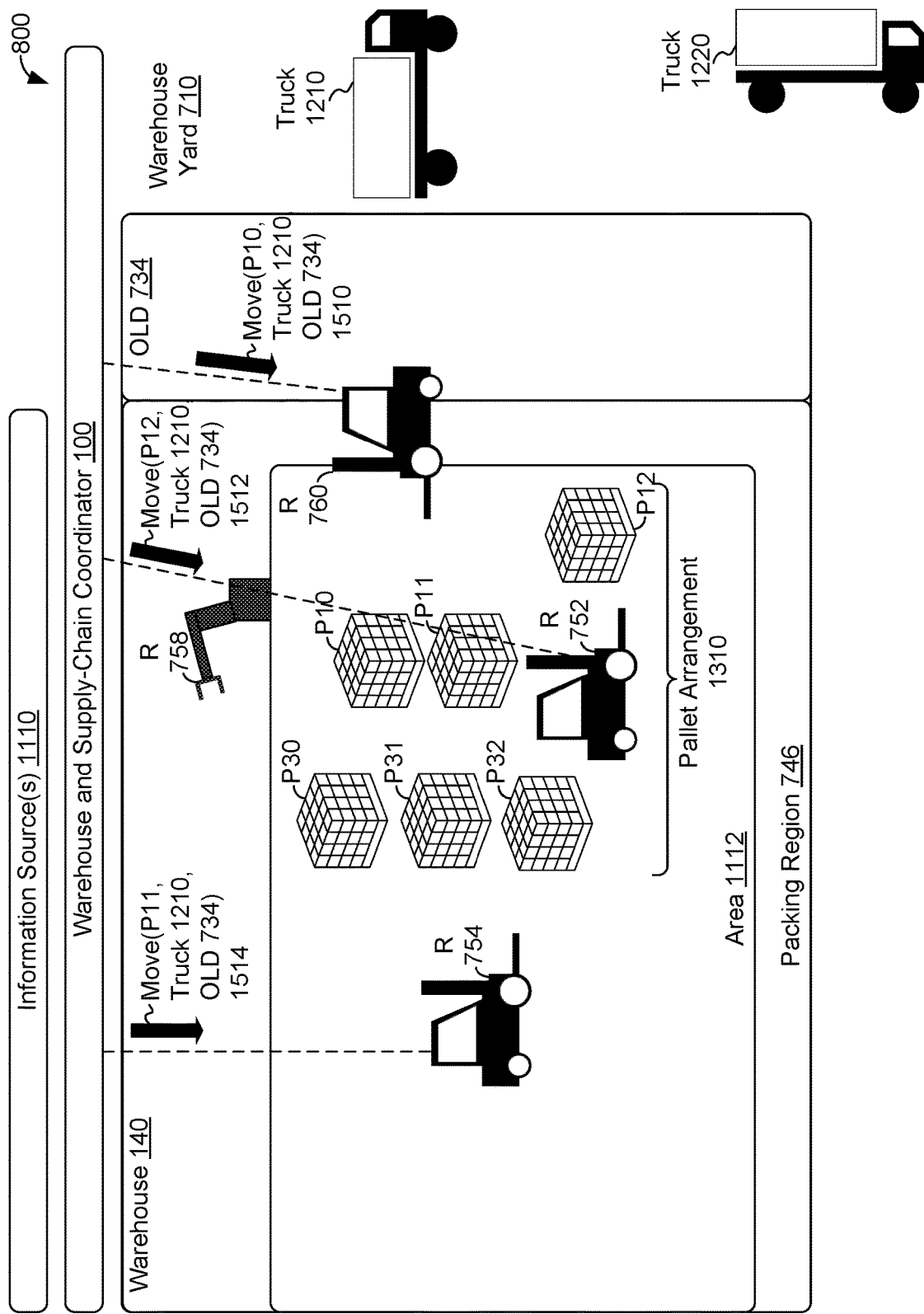

Scenario 800 continues with robots 752 and 760 finishing loading of pallets P20 and P21 onto truck 1220, and the subsequent departure of truck 1220, as shown in FIG. 15. Then, time T3 arrives and truck 1210 drives from parking spot 1418 to outgoing loading dock 734. Upon arrival of truck 1210 at outgoing loading dock 734, warehouse and supply-chain coordinator 100 directs robots 752, 754, and 756 to load truck 1210. More specifically, warehouse and supply-chain coordinator 100 sends respective move messages 1510, 1512, and 1514 to respective robots 760, 752, and 754 to move respective pallets "P10","P11", and "P12" onto "Truck 1210" at "OLD 734". After truck 1210 is loaded, truck 1210 departs from outgoing loading dock 734.

Figure 16:
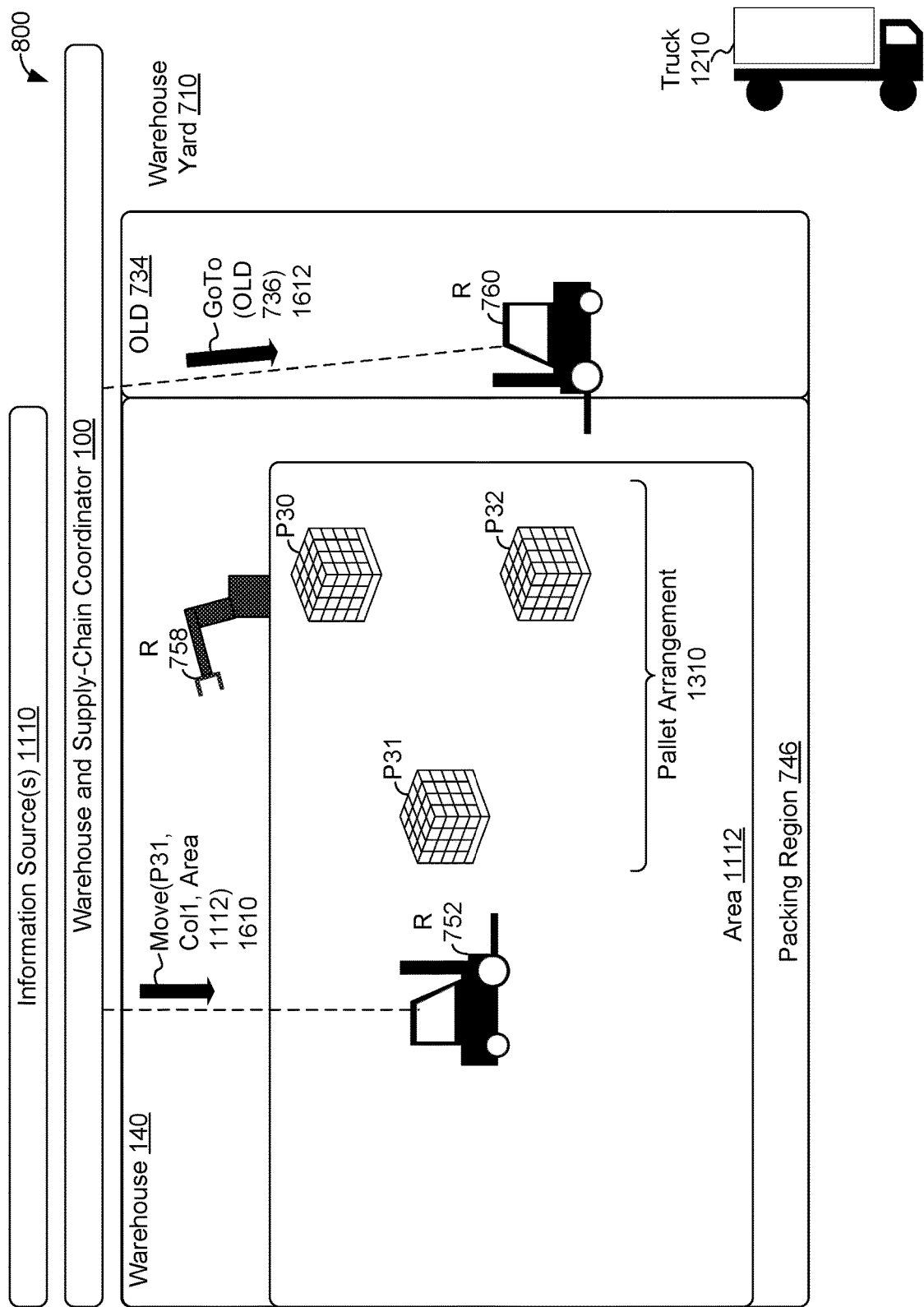

FIG. 16 shows scenario 800 continuing with truck 1210 on its way from outgoing loading dock 734. FIG. 16 also shows the first column of pallet arrangement 1310 with two pallets P30 and P32. Warehouse and supply-chain coordinator 100 sends move message 1610 to direct robot 752 to move pallet P31 to the first column "Col1" of pallet arrangement 1310 in "Area 1112". After robot 752 has moved pallet P31 to the first column of pallet arrangement 1310, the first column has all three pallets—P30, P31, and P32—destined for truck 1230, which is the next arriving truck at outgoing loading dock 734. Warehouse and supply-chain coordinator 100 also sends GoTo message 1612 instructing robot 760 to move to outgoing loading dock 736. Once pallet P31 has been moved to the first column of pallet arrangement 1310 and robot 760 has moved to outgoing loading dock 736, scenario 800 can be completed.

Figure 17:
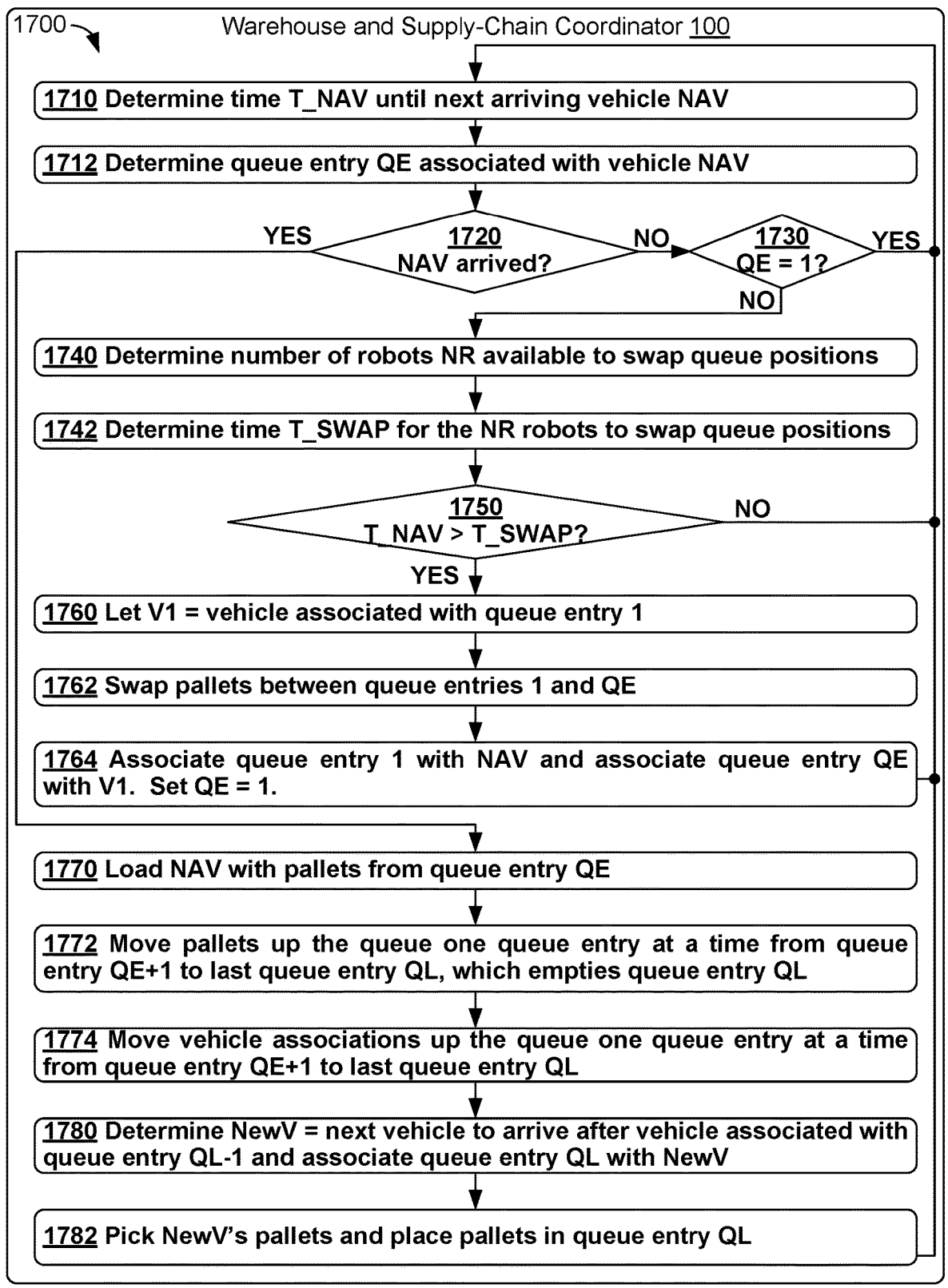
FIG. 17 is a flow chart of a method, in accordance with an example embodiment.

FIG. 17 is a flow chart of method 1700, in accordance with an example embodiment. Method 1700 is used to maintain a pallet arrangement, such as pallet arrangement 1310. The pallet arrangement can include QL>0 "queue entries", or spaces that can hold one or more pallets of goods, where each queue entry is sequentially numbered starting at one and ending at QL. An example pallet arrangement of queue entries where QL=3 is shown on a left side of FIG. 18 as pallet arrangement 1860 located in loading dock 1850 of warehouse 1870 where queue entry 1 of pallet arrangement 1860 is closest to an edge of loading dock 1850 where one or more vehicles can be loaded with pallets. Queue entry 1 is followed by queue entry 2, which in turn is followed by queue entry 3. Queue entry 3 is followed by the remainder of warehouse 1870.

FIG. 17 indicates that method 1700 can be performed by warehouse and supply-chain coordinator 100; e.g., method 1700 can be included in one or more computer-readable instructions that, when executed by one or more processors of a computing device, cause the computing device to perform some or all of the functions of method 1700 while performing herein-described features of warehouse and supply-chain coordinator 100. In other examples, method 1700 can be performed by one or more other entities other than warehouse and supply-chain coordinator 100.

FIG. 17 indicates that method 1700 begins at block 1710, where warehouse and supply-chain coordinator 100 determines a time T_NAV until a next arriving vehicle NAV arrives at a facility, such as a warehouse. In some examples, warehouse and supply-chain coordinator 100 determines whether or not next arriving vehicle NAV will arrive before a pre-determined time, such as prior to an onset of a upcoming no-load period. Then, if next arriving vehicle NAV will not arrive until after the pre-determined time, warehouse and supply-chain coordinator 100 can terminate method 1700.

At block 1712, warehouse and supply-chain coordinator 100 determines a queue entry QE associated with vehicle NAV; e.g., a queue entry that holds pallets destined to be loaded onto vehicle NAV at the facility.

At block 1720, warehouse and supply-chain coordinator 100 determines whether vehicle NAV has arrived at the facility. For example, warehouse and supply-chain coordinator 100 can receive a message that vehicle NAV has entered a gate at the facility, such as gate 712 of warehouse 140 and warehouse yard 710 discussed above in the context of FIGS. 7-16. As another example, a robot or other agent at the facility can detect vehicle NAV and send a message informing warehouse and supply-chain coordinator 100 of the arrival of vehicle NAL. As yet another example, vehicle NAV can send a message indicating that the vehicle NAV has arrived at the facility warehouse and supply-chain coordinator 100. Other techniques for informing warehouse and supply-chain coordinator 100 of an arrival of vehicle NAV and/or for warehouse and supply-chain coordinator 100 to determine that vehicle NAV has arrived at the facility are possible as well.

If vehicle NAV has arrived at the facility, warehouse and supply-chain coordinator 100 proceeds to block 1770. Otherwise, vehicle NAV has not arrived at the facility and warehouse and supply-chain coordinator 100 proceeds to block 1730.

At block 1730, warehouse and supply-chain coordinator 100 determines whether QE, which is the queue entry associated with vehicle NAV, is equal to one; that is, if the queue entry associated with vehicle NAV is the closest queue entry to the loading dock where vehicle NAV will arrive. If QE equals one, then warehouse and supply-chain coordinator 100 proceeds to block 1710. Otherwise, QE does not equal one and warehouse and supply-chain coordinator 100 proceeds to block 1740.

At block 1740, warehouse and supply-chain coordinator 100 determines a number of robots NR available to swap queue entries; that is, a number of robots that can move pallets from queue entry 1 to queue entry QE (at block 1740, QE≠1) and vice versa. In some embodiments, if NR=0, then no robots are available to swap pallets, and so warehouse and supply-chain coordinator 100 can proceed to block 1710.

At block 1742, warehouse and supply-chain coordinator 100 determines a time T_SWAP for the NR robots available to swap queue entries. For example, warehouse and supply-chain coordinator 100 can estimate T_SWAP for NR robots based on historical data, one or more mathematical models, data performed during a test or experiment of swapping pallets, and/or using other techniques and/or data.

The value of T_SWAP may not be strictly inversely proportional the number of robots, as adding additional robots may provide additional speedup of operations. In one example where NR=1, suppose the actions shown in Table 1 are those taken by one robot RS1 to swap one pallet PS1 located at location LS1 in queue entry 1 with another pallet PS2 located at location LS2 in queue entry 2.

TABLE 1

1. Go to location LS1.
2. Pick up pallet PS1.
3. Take pallet PS1 to location TEMP1.
4. Place pallet PS1 at TEMP1.

TABLE 1-continued

5. Go to location LS2.
6. Pick up pallet PS2.
7. Take pallet PS2 to location LS1.
8. Place pallet PS2 at LS1.
9. Go to location TEMP1.
10. Pick up pallet PS1.
11. Take pallet PS1 to location LS2.
12. Place pallet PS1 at location LS2. .

As another example where NR=2, suppose the actions shown in Table 2 are those taken by two robots RS1 and RS2 to swap one pallet PS1 located at location LS1 in queue entry 1 with another pallet PS2 located at location LS2 in queue entry 2.

TABLE 2

| Robot RS1 | Robot RS2 |
| --- | --- |
| 1. Go to location LS1. | 1. Go to location LS2. |
| 2. Pick up pallet PS1. | 2. Pick up pallet PS2. |
| 3. Take pallet PS1 to location LS2. | 3. Take pallet PS2 to location LS1. |
| 4. Place pallet PS1 at location LS2. | 4. Place pallet PS2 at location LS1. |

In particular examples, warehouse and supply-chain coordinator 100 coordinates robots RS1 and RS2 so that robot RS2 takes pallet PS2 to location LS1 while robot RS1 takes pallet PS1 to location LS2. That is, warehouse and supply-chain coordinator 100 coordinates robots RS1 and RS2 so that robot RS1 moves pallet PS1 from location LS1 to location LS2 at or about the same time that robot RS2 moves pallet PS2 from location LS2 to location LS1.

The example described by Table 2 assumes that robots RS1 and RS2 both take approximately or exactly the same amount of time to perform respective steps 1, 2, and 3 listed in Table 2. Under this assumption, when robot RS1 tries to place pallet PS1 at location LS2, robot RS2 will have already cleared pallet PS2 from location LS2, and so robot RS1 will be free to place pallet PS1 at location LS2 without delay. Similarly, when robot RS2 tries to place pallet PS2 at location LS1, robot RS1 will have already cleared pallet PS1 from location LS1, and so robot RS2 will be free to place pallet PS2 at location LS1 without delay. In cases where this assumption does not hold, warehouse and supply-chain coordinator 100 coordinates robots RS1 and RS2 so that that one robot may wait for a pallet to be cleared. For example, if robot RS1 is not near LS1 at a time one or more commands to swap pallets PS1 and PS2, but RS2 is near LS2 at that time, then warehouse and supply-chain coordinator 100 can instruct robot RS2 to pick up pallet PS2 and wait until robot RS1 has picked up pallet PS1 before robot RS2 moves toward location LS1.

If T_SWAP were inversely proportional to the number of robots, then the two-robot example shown above in Table 2 would take (approximately) ½ as long as the one-robot example shown in Table 1. However, while one robot has to place a pallet in a temporary location (LTEMP) to perform a swap, two robots need not place a pallet in a temporary location, thus reducing the number of operations performed by each robot to be ⅓ of the number of operations than one robot, thereby increasing speedup. Thus, T_SWAP for NR=2 may be (approximately) ⅓ of the value of T_SWAP for NR=1, which is less than ½ of the value of T_SWAP that may be expected (assuming inverse proportionality) by doubling NR from 1 to 2. Other examples of reductions of T_SWAP that are more than inversely proportional are possible as well.

In the case where NR=0, T_SWAP is infinite. In some of these examples, T_SWAP can be represented as a "practical infinity"; that is, a number that is less than infinity that is much larger than usual/expected. For example, T_SWAP when NR=0 can have a practically infinite value representing a day or longer if swapping pallets typically takes no more than a few minutes.

At block 1750, warehouse and supply-chain coordinator 100 determines whether T_NAV is greater than T_SWAP; that is, whether the amount of time until vehicle NAV arrives is greater than the amount of time to swap pallets. If T_NAV is greater than T_SWAP, then warehouse and supply-chain coordinator 100 proceeds to block 1760. Otherwise, T_SWAP is greater than or equal to T_NAV, and warehouse and supply-chain coordinator 100 proceeds to block 1710.

In some examples, rather than or along with comparing T_NAV and T_SWAP, the value of T_SWAP is compared to a threshold amount of time THR_SWAP to swap pallets between queue entries 1 and QE. If T_SWAP is greater than THR_SWAP, then warehouse and supply-chain coordinator 100 proceeds to block 1760 to swap pallets between queue entries 1 and QE. Otherwise, warehouse and supply-chain coordinator 100 proceeds to block 1710 without swapping pallets. In still other examples, rather than or along with comparing T_NAV and T_SWAP, the value of T_NAV is compared to a threshold amount of time THR_NAV for a vehicle to arrive at the facility. If T_NAV is greater than THR_NAV, then warehouse and supply-chain coordinator 100 proceeds to block 1760 to swap pallets between queue entries 1 and QE. Otherwise, warehouse and supply-chain coordinator 100 proceeds to block 1710 without swapping pallets.

In even other examples, warehouse and supply-chain coordinator 100 can determine whether to swap pallets between queue entries 1 and QE; i.e., proceed to block 1760, based on an estimated QE-load time and an estimated Q1-load time. Warehouse and supply-chain coordinator 100 can estimate the QE-load time to be the time to load the next arriving vehicle with its pallets held in queue entry QE and can estimate the Q1-load time to the time to load the next arriving vehicle with its pallets held in queue entry 1. Then, warehouse and supply-chain coordinator 100 can determine a difference DIFF_QE-LOAD=QE-load time−Q1-load time. Warehouse and supply-chain coordinator 100 can consider DIFF_QE-LOAD an estimated amount of time saved by swapping pallets for the next arriving vehicle from queue entry QE to queue entry 1. Then, along with or instead of comparing T_NAV and T_SWAP at block 1750, warehouse and supply-chain coordinator 100 can compare DIFF_QE-LOAD and T_SWAP. If DIFF_QE-LOAD is greater than T_SWAP, warehouse and supply-chain coordinator 100 can proceed to block 1760 to swap pallets between queue entries 1 and QE. Otherwise, warehouse and supply-chain coordinator 100 proceeds to block 1710 without swapping pallets.

Other data and related comparisons can be used to determine whether or not to swap pallets as well.

At block 1760, warehouse and supply-chain coordinator 100 can determine a vehicle V1 that is associated with queue entry 1.

At block 1762, warehouse and supply-chain coordinator 100 directs the NR robots to swap pallets between queue entry 1 and queue entry QE. For example, warehouse and supply-chain coordinator 100 can direct the NR robots to use some or all of the techniques mentioned above in the context of Tables 1 and/or 2 to swap pallets between queue entry 1 and queue entry QE.

At block 1764, warehouse and supply-chain coordinator 100 can associate queue entry 1 with vehicle NAV and associate queue entry QE with vehicle V1; i.e., swap vehicle associations of queue entries 1 and QE in keeping with the swap of pallets between queue entries 1 and QE performed at block 1762. Upon completion of block 1764, warehouse and supply-chain coordinator 100 proceeds to block 1710.

At block 1770, warehouse and supply-chain coordinator 100 has determined that vehicle NAV has arrived at the loading dock. Then, warehouse and supply-chain coordinator 100 directs one or more robots to load pallets from queue entry QE onto the now-arrived vehicle. After being loaded with the pallets from queue entry QE, vehicle NAV can leave the loading dock.

At block 1772, warehouse and supply-chain coordinator 100 directs one or more robots to move pallets up one queue entry at a time from queue entry QE+1 to a last queue entry; e.g., queue entry QL. Moving pallets up one queue entry at a time can involve moving pallets from a non-empty first queue entry to an adjacent empty second queue entry, thereby emptying the first queue entry. Table 3 shows example operations required for one robot to move up one pallet:

TABLE 3

1. Go to location Q1 in the non-empty queue entry.
2. Pick up pallet PQ1 (at location Q1).
3. Take pallet PQ1 to location Q2 in the empty queue entry.
4. Place pallet PQ1 at Q2.

For example, suppose QL=3 and QE=1 at an onset of block 1772. Then, queue entries 2 and 3 are be moved up during block 1772. To move up queue entry 2, the pallets in queue entry 2 (the non-empty first queue entry) would be moved to queue entry 1 (the adjacent empty second queue entry), as the pallets in queue entry 1 were loaded on to vehicle NAV during block 1770, leaving queue entry 1 empty of pallets. After queue entry 2 has been moved up, queue entry 1 is non-empty, queue entry 2 is empty, and queue entry 3 has pallets. Then, when queue entry 3 is moved up, the pallets in queue entry 3 are moved up to queue entry 2, thereby emptying queue entry 3 of pallets.

At block 1774, warehouse and supply-chain coordinator 100 moves vehicle associates up the queue one queue entry at a time from queue entry QE+1 to a last queue entry QL; e.g., queue entry QL. Continuing the QL=3 and QE=1 example from block 1772, the vehicle entries associated with queue entries 2 and 3 are to be moved up during block 1774. Further suppose that queue entry 1 is associated with vehicle NAV, queue entry 2 is associated with a vehicle V2, and queue entry 3 is associated with vehicle V3, and that a vehicle array is used to store the vehicle associations, where an index into the vehicle array represents the queue entry; e.g., vehicle[ ] is an array of three vehicle association values, where vehicle[1]=NAV, vehicle[2]=V2, and vehicle[3]=V3. Then, a loop can be performed to move up the vehicle entries, such as

```
for i = (QE + 1) to QL
    vehicle[i−1] = vehicle[i];
end for
```

At the end of this loop, vehicle[1]=V2, vehicle[2]=V3, and vehicle[3]=V3. Other representations of associations between queue entries and vehicles other than the vehicle array vehicle[ ] are possible as well.

At block 1780, warehouse and supply-chain coordinator 100 determines NewV, which is a next vehicle to arrive after the vehicle now associated with queue entry QL−1 and associates NewV with queue entry QL. Continuing the example of blocks 1772 and 1774 above where QL=3, warehouse and supply-chain coordinator 100 can associate NewV with queue entry QL by assigning vehicle[QL]= NewV. After associating NewV with queue entry QL in this example, the resulting vehicle array has: vehicle[1]=V2, vehicle[2]=V3, and vehicle[3]=NewV.

In some examples, at block 1780, warehouse and supply-chain coordinator 100 determines whether or not next arriving vehicle NewV will arrive before a pre-determined time, such as prior to an onset of a upcoming no-load period. Then, if next arriving vehicle NewV will not arrive until after the pre-determined time, warehouse and supply-chain coordinator 100 can proceed to block 1710 rather than proceeding to block 1782.

At block 1782, warehouse and supply-chain coordinator 100 instructs one or more robots to pick pallets destined for vehicle NewV from the facility (e.g., warehouse) and place these pallets in queue entry QL. For example, warehouse and supply-chain coordinator 100 can determine a pallet P_NEWV located at a location L_NEWV in the facility is destined for loading onto vehicle New and instruct a robot to follow the example procedures in Table 4 to move pallet P_NEWV to queue entry QL:

TABLE 4

1. Go to location L_NEWV.
2. Pick up pallet P_NEWV.
3. Take pallet P_NEWV to location L_QL in queue entry QL.
4. Place pallet P_NEWV at location L_QL.

Continuing the example of blocks 1772, 1774, and 1780 above with QL=3 and vehicle[3]=NewV, during block 1782, robots in the facility obtain/pick pallets destined for vehicle NewV and place/put those pallets in queue entry QL, which was emptied at block 1772. After the execution of the procedures of block 1772, 1774, 1780, and 1782, queue entry 1 has pallets for vehicle V2, queue entry 2 has pallets for vehicle V3, and queue entry 3 has pallets for vehicle NewV, and the vehicle array has: vehicle[1]=V2, vehicle [2]=V3, and vehicle[3]=NewV. Upon completion of the procedures of block 1782, warehouse and supply-chain coordinator 100 proceeds to block 1710.

FIGS. 18, 19, 20, and 21 illustrate a scenario 1800 where trucks 1810, 1820 and van 1830 arrive at loading dock 1850 of warehouse 1870 with pallets of a pallet arrangement being loaded into the trucks using the techniques of method 1700, in accordance with an example embodiment.

Scenario 1800 involves a period of time from a time T1 to time T8, through consecutive intermediate times T2, T3, T4, T5, T6, and T7, where pallet arrangement 1860 is modified according to the procedures of method 1700, discussed in the context of FIG. 17. Pallet arrangement 1860 has three queue entries during scenario 1800: queue entry 1, queue entry 2, and queue entry 3. Queue entry 1 is closest to an edge of loading dock 1850 for loading vehicles, queue entry 2 is just behind queue entry 1, and queue entry 3 is just behind queue entry 1. Behind queue entry 3 is a remainder of warehouse 1870, where a plurality of pallets are stored and a plurality of robots operate. During scenario 1800, at least the robots of warehouse 1870 are in communication with a warehouse and supply-chain coordinator, such as warehouse and supply-chain coordinator 100, that is embodied as one or more computing devices executing computer-readable instructions that include instructions, that when executed by the one or more computing devices, cause the warehouse and supply-chain coordinator at least to carry out the procedures of method 1700. In scenario 1800, trucks 1810, 1820, and van 1830 are initially expected to arrive in that order, but truck 1810 is delayed. The actual order of vehicle arrival for scenario 1800 is: truck 1820 arriving at time T1, van 1830 arriving at time T5, and truck 1810 arriving at time T7. After truck 1810 is loaded at time T8, queue entries and related associations are moved up per method 1700. After truck 1810 is loaded and all queue entries and related associations are moved up, scenario 1800 is completed.

Figure 18:
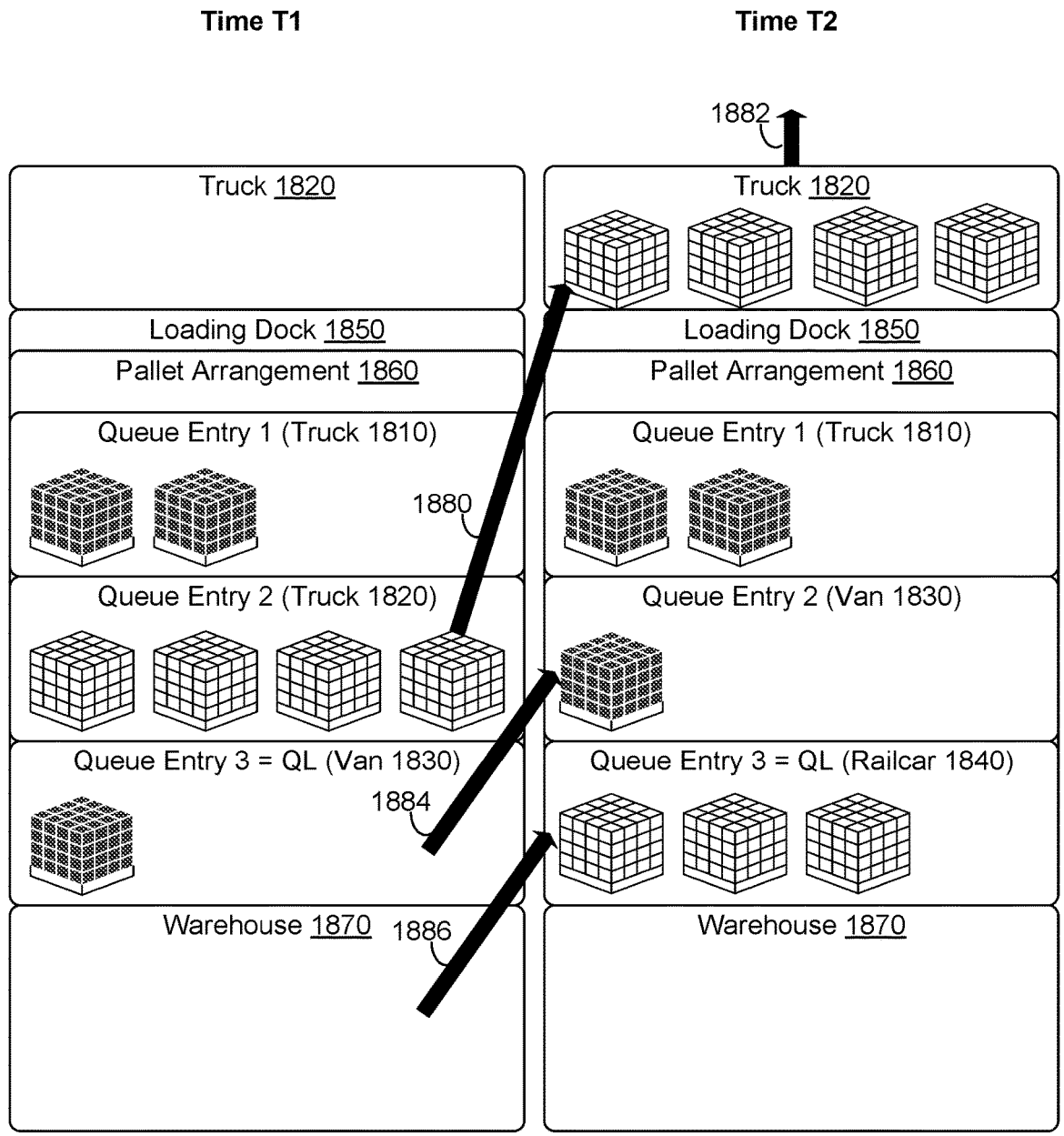
FIGS. 18, 19, 20, and 21 illustrate a scenario where trucks arrive at a loading dock with pallets of a pallet arrangement being loaded into the trucks, in accordance with an example embodiment.

A left side of FIG. 18 shows that, at an onset of scenario 1800, truck 1820 has just arrived at loading dock 1850 of warehouse 1870. Loading dock 1850 includes pallet arrangement 1860 having three queue entries: queue entry 1 holding two pallets and being associated with truck 1810, queue entry 2 holding four pallets and being associated with truck 1820, and queue entry 3 holding one pallet and being associated with truck 1820. At time T1, truck 1810 was expected to arrive before truck 1820, and truck 1820 arrived before there was time to swap pallets between queue entries 1 and 2; that is, in the context of method 1700, T_SWAP>T_NAV at block 1750 until NAV=truck 1820 arrived with QE=2.

In some scenarios, the warehouse and supply-chain coordinator initially reserves a time slot TS1 at loading dock 1850 for truck 1810, where time slot TS1 at loading dock 1850 is for a time period that includes time T1. Then, when the warehouse and supply-chain coordinator is informed truck 1810 is delayed, the warehouse and supply-chain coordinator: releases time slot TS1 for truck 1810, determines that truck 1820 is a next arriving vehicle after truck 1810, and reserves time slot TS1 for truck 1820. Then, truck 1820 arrives during timeslot TS1. In particular of these scenarios, the warehouse and supply-chain coordinator also reserves another time slot TS2 that is immediately after time slot TS1 for truck 1810.

In particular scenarios, reserving a time slot for a truck TRK can include granting access to warehouse 1870 to truck TRK up to a beginning of the time slot and/or releasing a time slot for truck TRK can include revoking access to warehouse 1870 to truck TRK. In these scenarios, releasing time slot TS1 for truck 1810 includes revocation of access to warehouse 1870 for truck 1810, reserving time slot TS1 for truck 1820 includes granting of access to warehouse 1870 for truck 1820 until a beginning of time slot TS1, and reserving time slot TS2 for truck 1810 includes granting of access to warehouse 1870 for truck 1810 until a beginning of time slot TS2.

At time T2 as shown on a right side of FIG. 18, truck 1820 is loaded with the pallets held in queue entry 2 as indicated by arrow 1880 using the procedures of block 1770 of method 1700. After being loaded, truck 1820 departs from loading dock 1850 as indicated by arrow 1882. Once the procedures of block 1770 are completed, the warehouse and supply-chain coordinator executes the procedures of blocks 1772 and 1774 of method 1700 to move up the pallets of queue entry 3 to queue entry 2, as indicated by arrow 1884, and to associate queue entry 2 with van 1830. A new vehicle, railcar 1840, is determined to be the next vehicle to arrive at warehouse 1870 after van 1830 and is associated with queue entry 3 at block 1780 of method 1700. Then, as indicated by arrow 1886, the warehouse and supply-chain coordinator directs one or more robots to pick pallets for railcar 1840 from warehouse 1870 and place those pallets into queue entry 3 in keeping with the procedures of block 1782 of method 1700.

Figure 19:
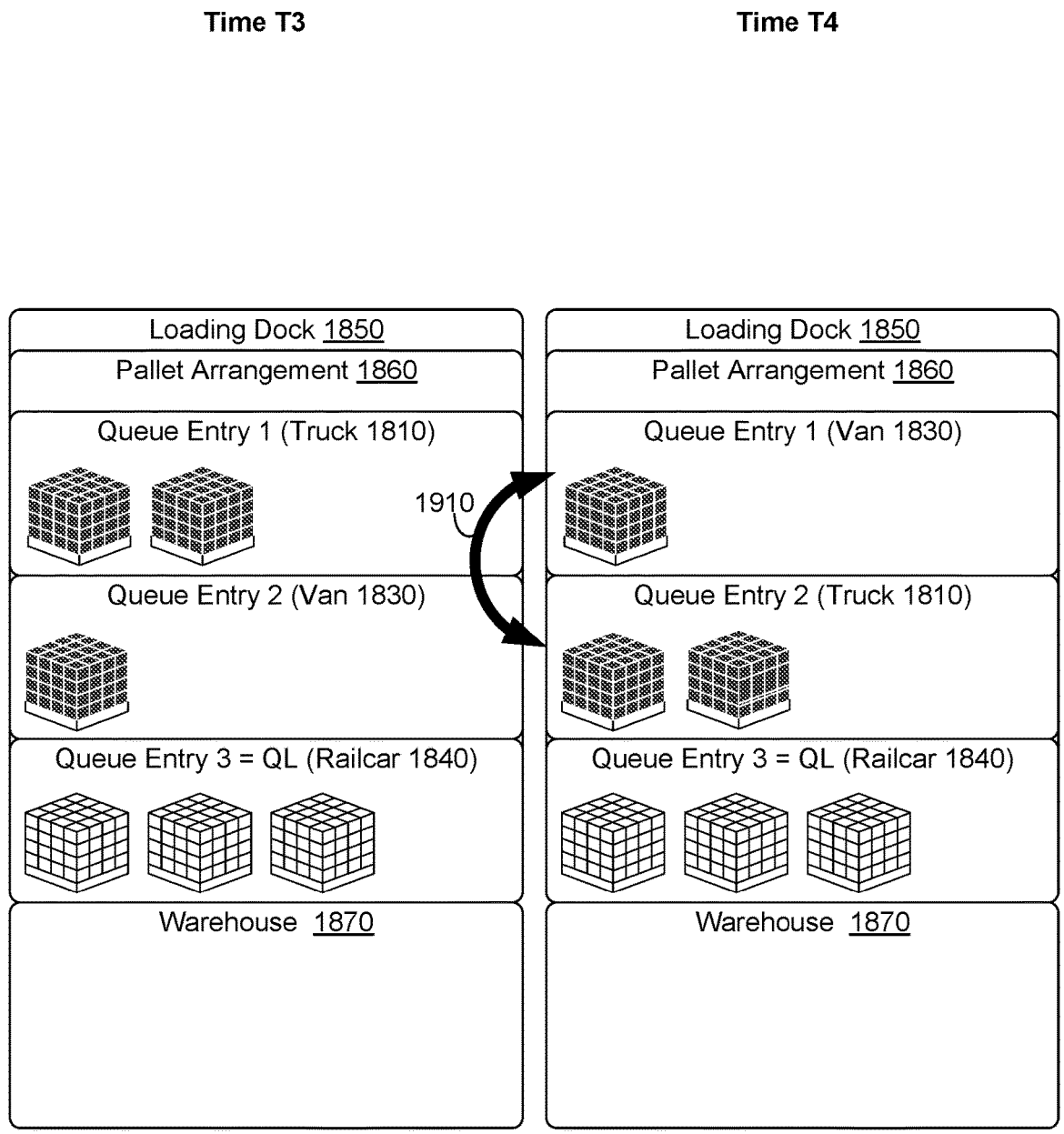

At time T3 of scenario 1800 as shown on a left side of FIG. 19, truck 1820 has left, and the procedures described above with respect to time T2 have been completed. Resulting pallet arrangement 1860 has queue entry 1 holding pallets associated with truck 1810, queue entry 2 holding a pallet associated with van 1830, and queue entry 3 holding pallets associated with railcar 1840.

At time T3, the warehouse and supply-chain coordinator executes blocks 1710 and 1712 of method 1700 to determine that a next arriving vehicle NAV is van 1830 which is associated with queue entry QE=2 will arrive in T_NAV units of time. At T3, van 1830 has not yet arrived at warehouse 1870, so execution of method 1700 proceeds from block 1720, to block 1730 where QE=2, to block 1740. After execution of blocks 1740 and 1742, the warehouse and supply-chain coordinator determines a number NR>0 of robots available to swap queue entries and a time T_SWAP that is less than T_NAV. As such, execution of method 1700 proceeds to block 1760, where V1 is set to truck 1810, and then to block 1762, where the warehouse and supply-chain coordinator direct the NR robots found available at block 1740 to swap pallets between queue entry 1 (associated with truck 1810) and queue entry 2 (associated with van 1830).

At shown by arrow 1910 at time T4 on a right side of FIG. 19, the NR robots proceed to swap pallets between queue entries 1 and 2. The warehouse and supply-chain coordinator executes the procedures of block 1764 to associate queue entry 1 with van 1830 and associate queue entry 2 with truck 1810.

Figure 20:
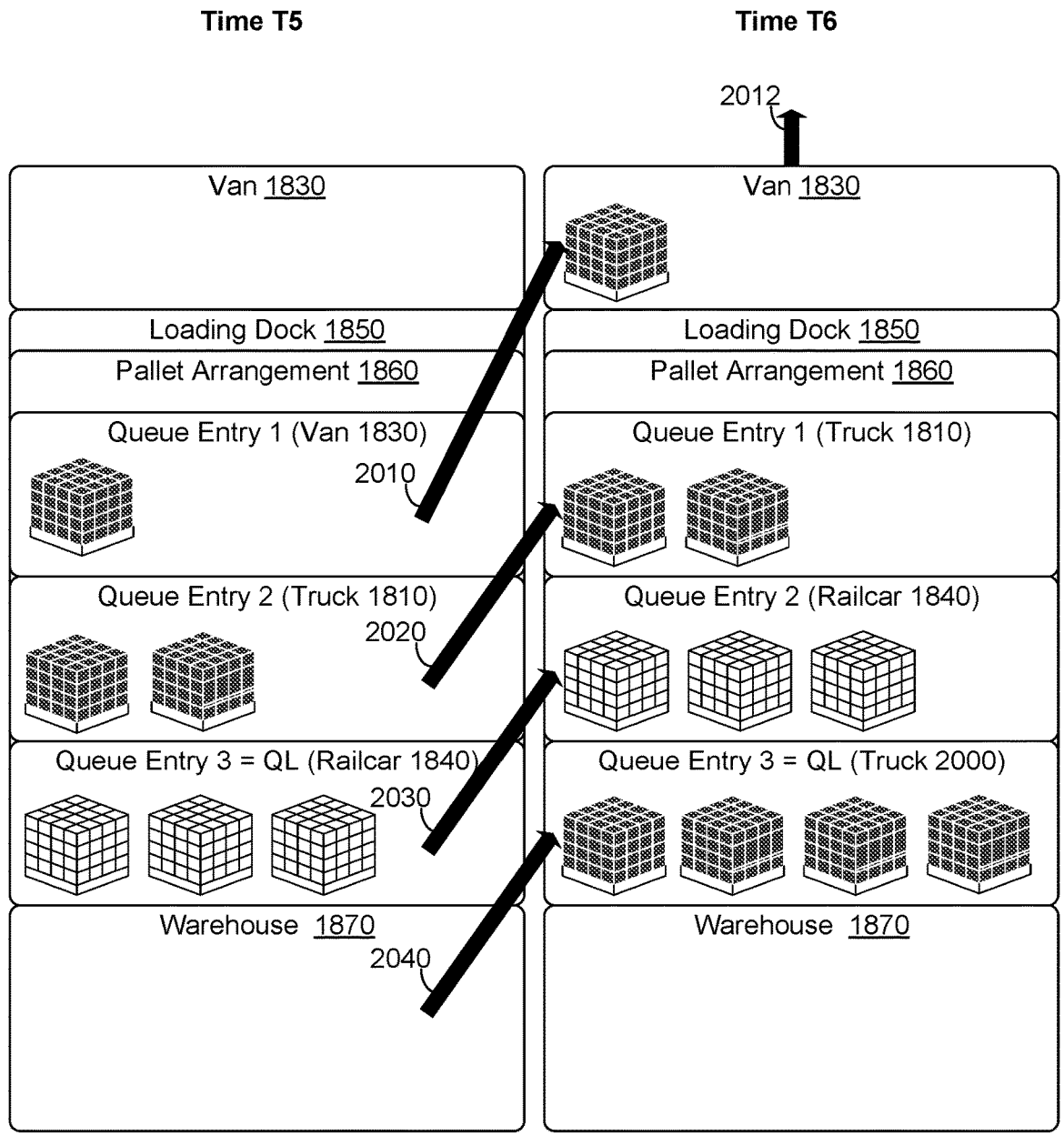

At time T5 as shown on a left side of FIG. 20, the procedures of blocks 1762 and 1764 discussed above with respect to time T4 have completed. Resulting pallet arrangement 1860 has queue entry 1 holding a pallet associated with van 1830, queue entry 2 holding pallets associated with truck 1810, and queue entry 3 holding pallets associated with railcar 1840. Also at time T5, van 1830 arrives at loading dock 1850.

The warehouse and supply-chain coordinator executes blocks 1710 and 1712 of method 1700 to determine that a next arriving vehicle NAV is van 1830 which is associated with queue entry QE=1 will arrive in T_NAV amount of time=0 time units. As van 1830 has arrived, execution of method 1700 proceed from block 1720 to block 1770, where the rehouse and supply-chain coordinator directs one or more robots in warehouse 1870 to load van 1830 with the pallet held in queue entry 1.

In some scenarios, the warehouse and supply-chain coordinator has reserved time slot TS2 at loading dock 1850 for truck 1810, where time slot TS2 at loading dock 1850 is immediately after time slot TS1, and where time slot TS2 is for a time period that includes T5. Then, when the warehouse and supply-chain coordinator is informed truck 1810 is delayed beyond time T5, the warehouse and supply-chain coordinator: releases time slot TS2 for truck 1810, determines that van 1830 is a next arriving vehicle after truck 1810, and reserves time slot TS2 for truck 1820. Then, van 1820 arrives during timeslot TS2. In particular of these scenarios, the warehouse and supply-chain coordinator also reserves another time slot TS3 that is immediately after time slot TS2 for truck 1810.

In particular scenarios, releasing time slot TS2 for truck 1810 includes revocation of access to warehouse 1870 for truck 1810, reserving time slot TS2 for van 1830 includes granting of access to warehouse 1870 for van 1830 until a beginning of time slot TS2, and reserving time slot TS3 for truck 1810 includes granting of access to warehouse 1870 for truck 1810 until a beginning of time slot TS3.

At time T6 as shown on a right side of FIG. 20, van 1830 is loaded with the pallet held in queue entry 1 using the procedures of block 1770 of method 1700 as indicated by arrow 2010. After being loaded, van 1830 departs from loading dock 1850 as indicated by arrow 2012. Once the procedures of block 1770 are completed, the warehouse and supply-chain coordinator executes the procedures of blocks 1772 and 1774 of method 1700 to: (1) to direct one or more robots move up the pallets of queue entry 2 to queue entry 1 as indicated by arrow 2020 and to associate queue entry 2 with truck 1810, and (2) to direct one or more robots move up the pallets of queue entry 3 to queue entry 2 as indicated by arrow 2030 and to associate queue entry 2 with railcar 1840. A new vehicle, truck 2000, is determined to be the next vehicle to arrive after railcar 1840 at warehouse 1870 and is associated with queue entry 3 at block 1780 of method 1700. Then, as indicated by arrow 2040, the warehouse and supply-chain coordinator directs one or more robots to pick pallets for truck 2000 from warehouse 1870 and place those pallets into queue entry 3 in keeping with the procedures of block 1782 of method 1700.

Figure 21:
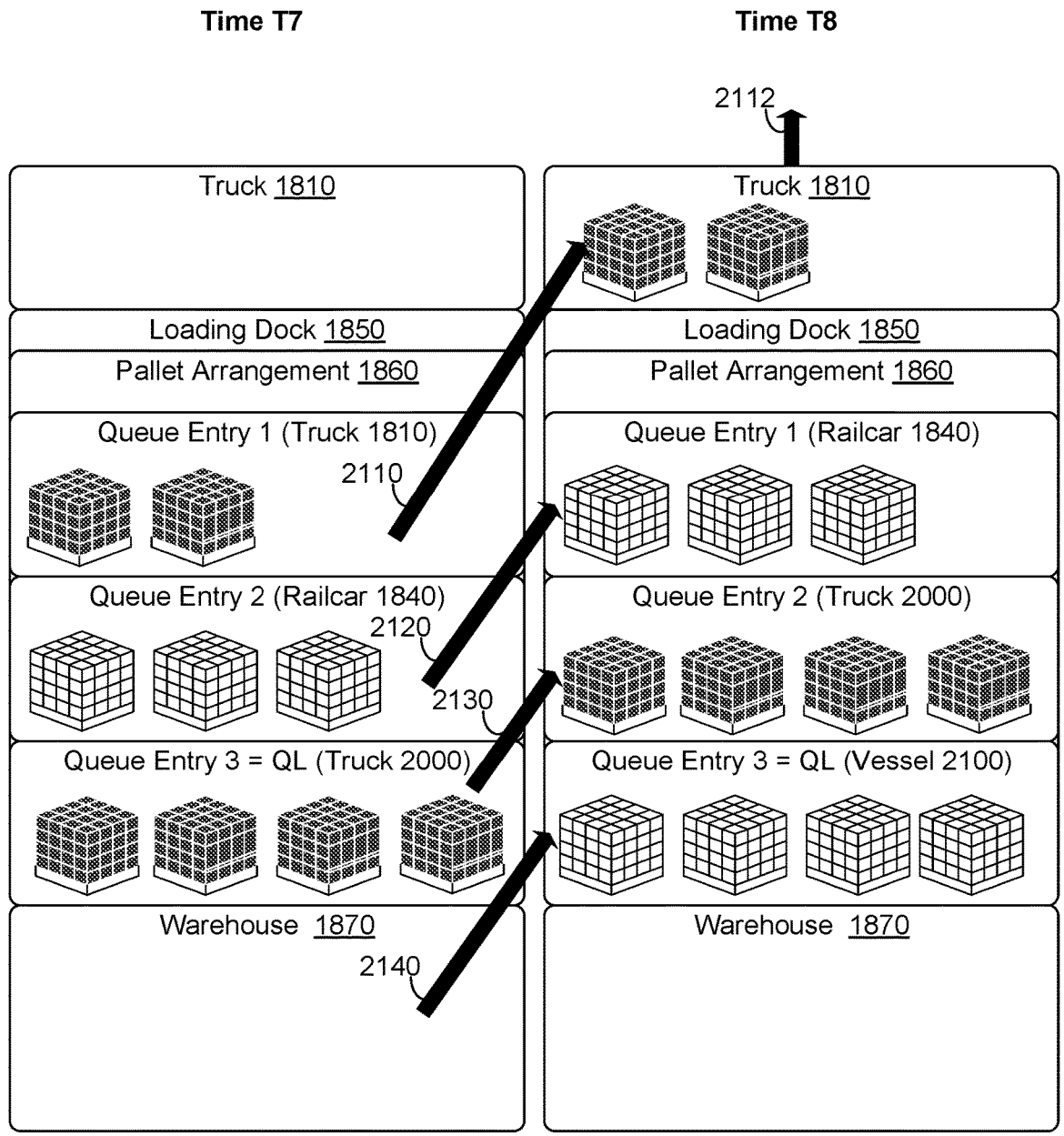

At time T7 of scenario 1800 as shown on a left side of FIG. 21, van 1830 has departed and the procedures described above with respect to time T6 have been completed. Resulting pallet arrangement 1860 has queue entry 1 holding pallets associated with truck 1810, queue entry 2 holding pallets associated with railcar 1840, and queue entry 3 holding pallets associated with truck 2000.

Also at time T7, truck 1810 arrives at loading dock 1850. The warehouse and supply-chain coordinator executes blocks 1710 and 1712 of method 1700 to determine that a next arriving vehicle NAV is truck 1810 which is associated with queue entry QE=1 will arrive in T_NAV amount of time=0 time units. As truck 1810 has arrived, execution of method 1700 proceed from block 1720 to block 1770, where the rehouse and supply-chain coordinator directs one or more robots in warehouse 1870 to load truck 1810 with the pallets held in queue entry 1. In some scenarios, the warehouse and supply-chain coordinator has reserved a time slot TS3 for truck 1810 at loading dock 1850, where time slot TS3 is for a time period that includes time T7.

At time T8 as shown on a right side of FIG. 21, truck 1810 is loaded with the pallets held in queue entry 1 using the procedures of block 1770 of method 1700 as indicated by arrow 2110. After being loaded, truck 1810 departs from loading dock 1850 as indicated by arrow 2112. Once the procedures of block 1770 are completed, the warehouse and supply-chain coordinator executes the procedures of blocks 1772 and 1774 of method 1700 to: (1) to direct one or more robots move up the pallets of queue entry 2 to queue entry 1 as indicated by arrow 2120 and to associate queue entry 2 with railcar 1840, and (2) to direct one or more robots move up the pallets of queue entry 3 to queue entry 2 as indicated by arrow 2130 and to associate queue entry 2 with truck 2000. A new vehicle, vessel 2100, is determined to be the next vehicle after truck 2000 to arrive at warehouse 1870 and is associated with queue entry 3 at block 1780 of method 1700. Then, as indicated by arrow 2140, the warehouse and supply-chain coordinator directs one or more robots to pick pallets for vessel 2100 from warehouse 1870 and place those pallets into queue entry 3 in keeping with the procedures of block 1782 of method 1700. After all of the pallets for vessel 2100 have been placed into queue entry 3, scenario 1800 can be completed.

Figure 22:
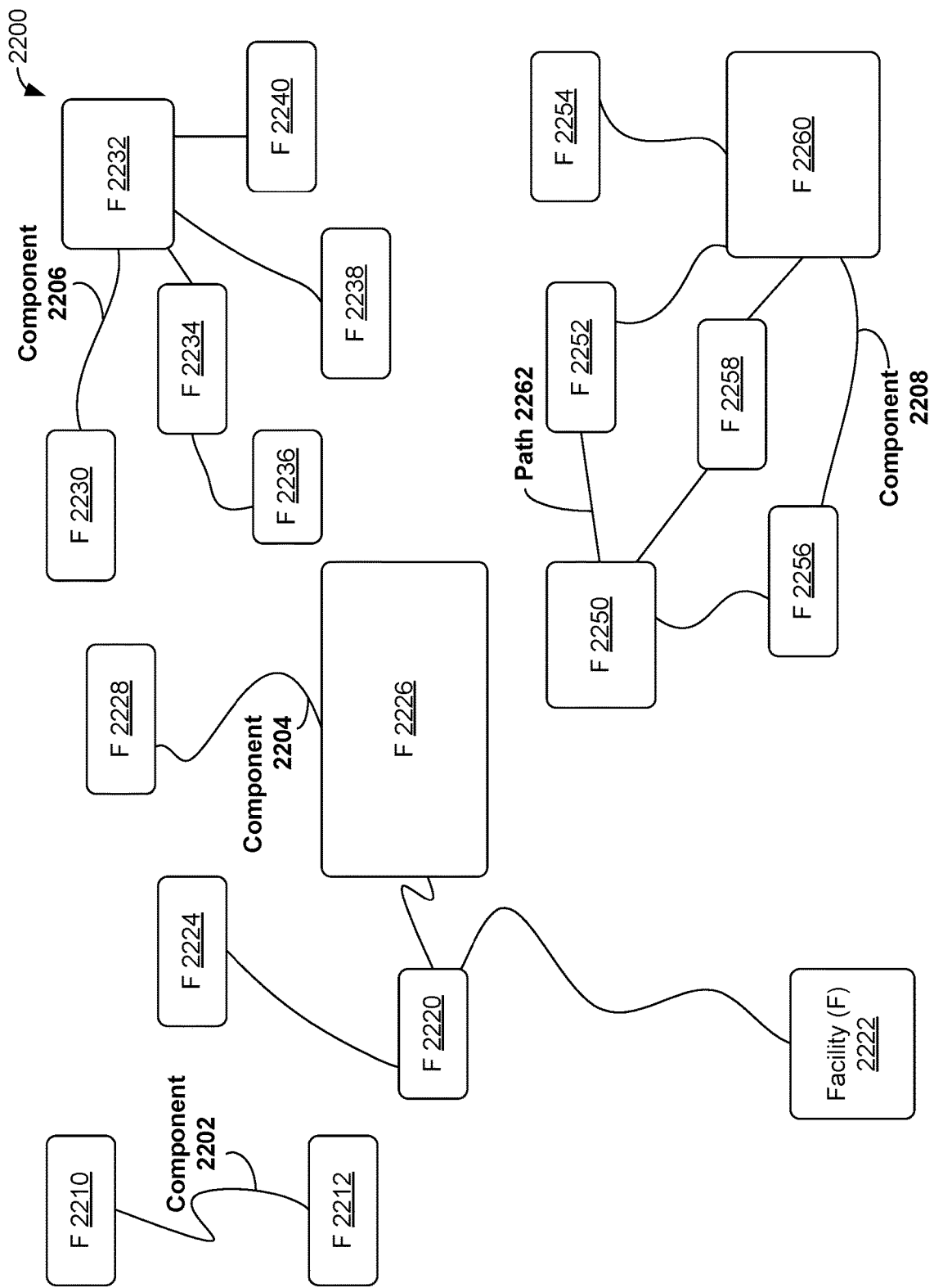
FIG. 22 is a block diagram of another supply chain, in accordance with an example embodiment.

FIG. 22 is a block diagram of supply chain 2200, in accordance with an example embodiment. A supply chain can have one or more components, where a component includes one or more facilities connected by zero or more paths. A facility is an entity of a supply chain that has a fixed location, such as, but not limited to, one or more buildings associated with a supplier, a manufacturer, a warehouse, a distribution center, a maintenance center, and/or a fulfillment center. A relative size of a facility in FIGS. 22-24 indicates a concentration of an inventory of goods and/or a capacity of the facility; e.g., in FIG. 22, a rectangle depicting facility 2232 is larger than a rectangle depicting facility 2234, indicating that facility 2232 has a larger concentration of inventory of goods and/or a capacity than facility 2234. A path between facilities can be used to communicate goods, vehicles, information, and/or other material objects between connected facilities, such as path 2262 that connects facilities 2250 and 2252.

Supply chain 2200 has four disconnected components: component 2202 shown at upper left of FIG. 22 that includes facilities (Fs) 2210 and 2212 connected by one path; component 2204 shown at center left of FIG. 22 that includes facilities 2220, 2222, 2224, 2226, 2228 connected by four paths; component 2206 shown at upper right of FIG. 22 that includes facilities 2230, 2232, 2234, 2236, 2238, 2240 connected by five paths; and component 2208 shown at lower right of FIG. 22 that includes facilities 2250, 2252, 2254, 2256, 2258, 2260 connected by seven paths. In some examples, goods, vehicles, information, and/or other material moving between two facilities in supply chain 2200 has to pass through one or more intermediate facilities; e.g., goods traveling between facility 2230 and facility 2234 have to pass through facility 2232.

In the example supply chain 2200, each of the four components 2202, 2204, 2206, 2208 comprises a separate sub-supply chain, and in the example shown in FIG. 22, the four components are not interconnected. In some examples of supply chain 2200, each component is owned separately; e.g., component 2202 is owned by owner A, component 2204 is owned by owner B, component 2206 is owned by owner C, and component 2208 is owned by owner D, where each of owners A, B, C, and D are different. In other examples of supply chain 2200, some or all components 2202, 2204, 2206, 2208 are co-owned.

As indicated in FIG. 22, the four components 2202, 2204, 2206, 2208 of supply chain 2200 do not directly interconnect. Then, one or more intermediate facilities can be used to ship goods and/or other material between components 2202, 2204, 2206, and 2208; e.g, goods shipped from component 2206 to component 2204 can be routed through facility 2236 of component 2206 and through facility 2226 of component 2204 for shipment to their destination in component 2204.

In other examples, two or more non-intermeshing components send partially-loaded vehicles to the same relatively-small region (e.g., a region having only one zip-code or postal code), leading to inefficient coverage of the relatively-small region. Further, routing goods and/or other material through an intermediate facility can increase costs and time due to loading, unloading, and perhaps extra breakage/spoilage of the goods and/or other material at the intermediate facility. To reduce such inefficiencies related to partial loads and intermediate facilities, part or all of various components of a supply chain can be consolidated.

Figure 23:
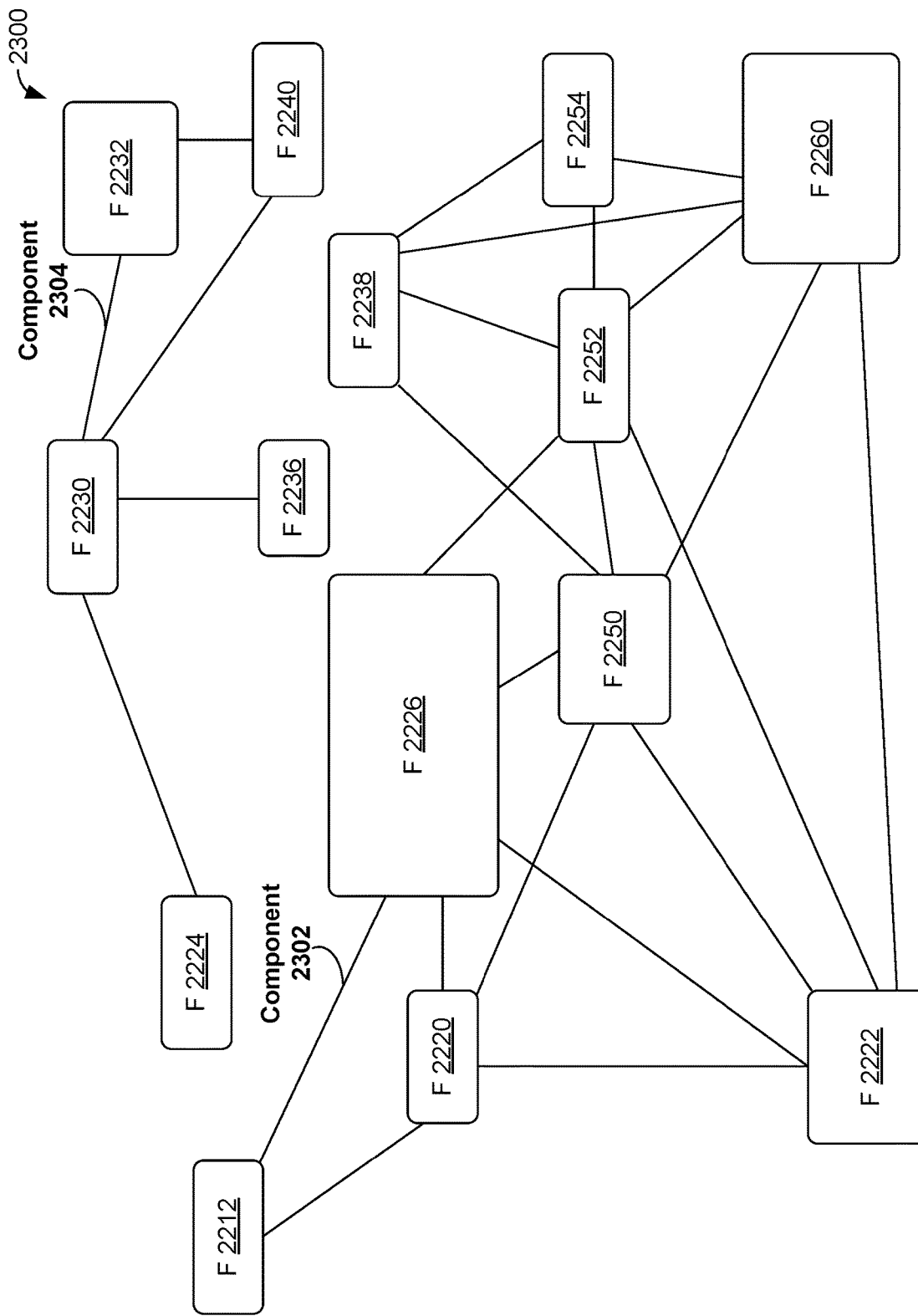
FIG. 23 is a block diagram of still another supply chain, in accordance with an example embodiment.

FIG. 23 shows supply chain 2300 where components 2202, 2204, and 2208 have been substantially consolidated into component 2302, and where component 2206 has been somewhat consolidated to become component 2304. FIG. 23 shows that consolidated component 2302 has nine facilities 2212, 2220, 2222, 2226, 2238, 2250, 2252, 2254, 2260, which is fewer than the thirteen facilities in components 2202, 2204, and 2208. Also, paths between facilities have changed consolidated component 2302; e.g., paths have been added between facility 2238 and each of facilities 2250, 2252, 2254, and 2260.

The addition of paths between facilities reduces and/or eliminates use of intermediate facilities in transporting goods and/or other material between facility 2238 and each of facilities 2250, 2252, 2254, and 2260. By consolidating components 2202, 2204, and 2208, partial truckloads can be reduced. For example, if a partially loaded truck PLT2202 was sent from component 2202 of supply chain 2200 to zip code ZC1 and a partially loaded truck PLT2204 was also sent from component 2204 of supply chain 2200 to zip code ZC1, then these partial truckloads can be consolidated by coordinated management of component 2302 to send one truck to zip code ZC1 rather than two partially loaded trucks. Such coordinated management of component 2302 can be provided by a herein-described warehouse and supply-chain coordinator, such as warehouse and supply-chain coordinator 100. The warehouse and supply-chain coordinator can recognize two partial truck loads going to the same destination or nearby region, such as an area covered by one zip code, determine a facility that has most, if not all, of the goods to be carried in the two partial truck loads, and send one truck from that facility with the goods to the destination or nearby region to deliver the goods of the two partial truck loads. Consolidation of truck loads can be performed based on other and/or additional reasons than geography, such as a type of goods/vehicle to be used (e.g., refrigerated goods, gas/liquid goods, use of a refrigerated truck, tanker truck, air freight, or sea vessel), a priority of the goods/shipment (e.g., may continue to have partial loads for high-priority shipments and/or high-value goods).

Figure 24:
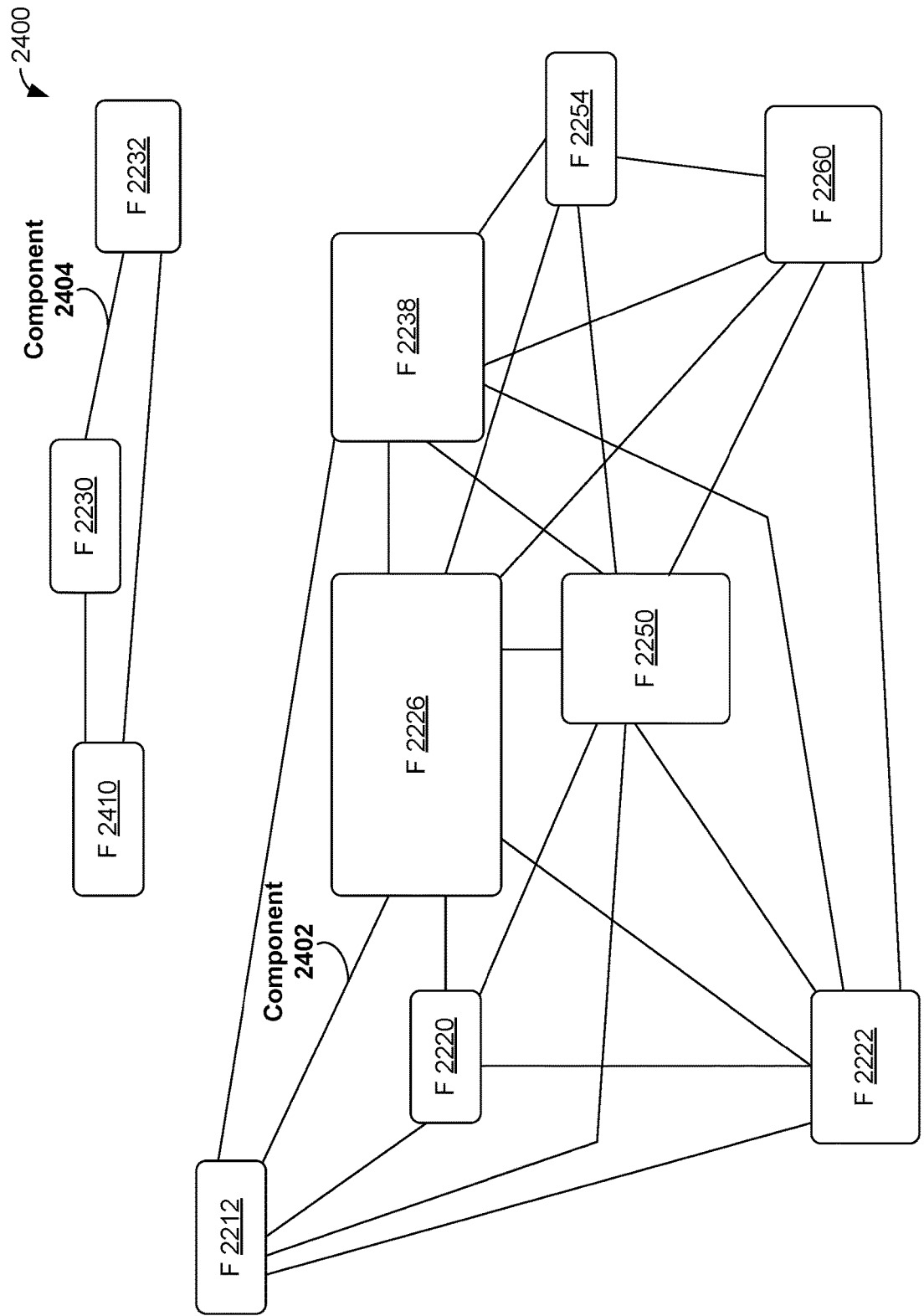
FIG. 24 is a block diagram of yet another supply chain, in accordance with an example embodiment.

FIG. 24 is a block diagram of supply chain 2400, in accordance with an example embodiment. Supply chain 2400 shows effects of further consolidation to supply chain 2300. Component 2302 of supply chain 2300 has been consolidated to become component 2402 of supply chain 2400. Component 2402 has one fewer facility and two more paths, with one facility—facility 2226—being directly connected to all of the other seven facilities 2212, 2220, 2222, 2238, 2250, 2254, 2260 of component 2402, while no facility of component 2302 was directly connected to all other facilities of that component. With fewer facilities and more paths than in component 2302, fewer facilities have to be maintained and fewer intermediate facilities are likely to be used in component 2402, and thus making component 2402 more time-efficient and cost-effective than component 2302.

Also, component 2404 has been consolidated to use only three facilities—facilities 2230, 2232, and 2410—which are all directly interconnected. In comparison, component 2304 of supply chain 2300 used five facilities, only one of which was fully connected. With fewer facilities and more paths than in component 2304, fewer facilities have to be maintained and fewer intermediate facilities are likely to be used in component 2404, and thus making component 2404 more time-efficient and cost-effective than component 2304.

In some examples, component 2402, component 2404, and/or supply chain 2400 is configured, such as by the herein-described warehouse and supply-chain coordinator, to provide on-demand logistics and/or supply chain services; i.e., provide logistics as a service in a similar fashion to cloud computing devices provide various computing services on demand. That is, the warehouse and supply-chain coordinator enables reception of an order from a customer for warehousing, transportation, goods manufacture, supply provisioning, and/or other various logistics/supply-chain related services, and component 2402, component 2404, and/or supply chain 2400 provides those services to the customer without the customer having to manage details of where goods are stored, transportation of goods through the supply chain, obtaining goods from suppliers and manufacturers, and supervision of warehouses.

Example Methods of Operation

FIG. 25 is a flowchart of method 2500, in accordance with an example embodiment. Method 2500 can be executed by a computing device. In some examples, the computing device includes computer-readable instructions/software that, when executed by one or more processors of the computing device, cause the computing device to perform some or all of the functionality of a warehouse and supply-chain coordinator; e.g., warehouse and supply-chain coordinator 100.

Method 2500 can begin at block 2510, where the computing device can determine a first estimated arrival time for a first vehicle at a loading dock of a warehouse, such as discussed above at least in the context of FIGS. 2-21.

In some embodiments, determining the first estimated arrival time can include reserving a first time slot at the loading dock for the first vehicle, where the first time slot includes the first estimated arrival time, such as discussed above at least in the context of FIGS. 9, 14, and 21.

In other embodiments, the warehouse includes a first parking location; then, determining the first estimated arrival time for the first vehicle at the loading dock can include: granting warehouse access to the first vehicle at the first estimated arrival time; determining whether the first vehicle has access to the loading dock at the first estimated arrival time; and after determining that first vehicle does not have access to the loading dock at the first estimated arrival time, reserving the first parking location for the first vehicle starting at the first estimated arrival time, such as discussed above at least in the context of FIGS. 8, 9, 14, 15, and 18-20.

At block 2520, the computing device can determine a second estimated arrival time for a second vehicle at the loading dock of the warehouse, where the first estimated arrival time is before the second estimated arrival time, such as discussed above at least in the context of FIGS. 8-21.

At block 2530, the computing device can determine a pallet arrangement at the loading dock of the warehouse, where the pallet arrangement includes a first pallet associated with the first vehicle and a second pallet associated with the second vehicle, and where the first pallet is closer to the loading dock than the second pallet, such as discussed above at least in the context of FIGS. 13-21. In some embodiments, the pallet arrangement can include at least a first queue entry and a second queue entry, each of the first queue entry and the second queue entry for holding one or more pallets, where a location of the first queue entry is closer to the loading dock than a location of the second queue entry, and where the first queue entry holds the first pallet and the second queue entry holds the second pallet, such as discussed above at least in the context of FIGS. 13-21.

At block 2540, the computing device can, after determining the pallet arrangement, determine that the first estimated arrival time has changed to be after the second estimated arrival time, such as discussed above at least in the context of FIGS. 13-21.

At block 2550, the computing device can, in response to determining that the first estimated arrival time has changed to be after the second estimated arrival time, instruct a robot to modify the pallet arrangement so that the second pallet is closer to the loading dock than the first pallet before the second estimated arrival time, such as discussed above at least in the context of FIGS. 13-21.

In some embodiments, in response to determining that the first estimated arrival time has changed to be after the second estimated arrival time, instructing a robot to modify the pallet arrangement so that the second pallet is closer to the loading dock than the first pallet before the second estimated arrival time can include: determining a second arrival time indicating an amount of time until second vehicle arrives at the warehouse; determining an amount of time to swap pallets between the first queue entry and the second queue entry; determining whether the second arrival time is greater than the amount of time to swap pallets; and after determining that the second arrival time is greater than the amount of time to swap pallets, instructing the robot to: move the second pallet from the second queue entry to the first queue entry, and move the first pallet from the first queue entry to the second queue entry, such as discussed above at least in the context of FIGS. 17-21.

In particular embodiments, determining the amount of time to swap pallets between the first queue entry and the second queue entry can include determining the amount of time to swap pallets between the first queue entry and the second queue entry based on a number of robots available to swap pallets, such as discussed above at least in the context of FIGS. 17-21. In other particular embodiments, method 2500 can further include: after moving the first pallet from the first queue entry to the second queue entry: associating the first queue entry with the second vehicle; and associating the second queue entry with the first vehicle, such as discussed above at least in the context of FIGS. 17-21. In still other particular embodiments, method 2500 can further include: after moving the first pallet from the first queue entry to the second queue entry, determining that the second vehicle has arrived at the warehouse; and instructing the robot to load the second vehicle with at least the second pallet in the first queue entry, such as discussed above at least in the context of FIGS. 17-21. In even other particular embodiments, the pallet arrangement has a number of queue entries QE that is greater than or equal to two; then, method 2500 can further include: after instructing the robot to load the second vehicle with at least the second pallet in the first queue entry, instructing the robot to move pallets from the second queue entry to the first queue entry; associating the first queue entry with the first vehicle; determining a new vehicle that is a next vehicle to arrive at the warehouse after each vehicle associated with a queue entry; associating the QEth queue entry with the new vehicle; and instructing the robot to move pallets associated with the new vehicle to the QEth queue entry, such as discussed above at least in the context of FIGS. 17-21.

In other embodiments, the pallet arrangement includes a first queue entry and a second queue entry, the first queue entry holding at least a first pallet at a first location, and the second queue entry holding at least a second pallet at a second location; then, instructing the robot to modify the pallet arrangement can include: instructing the robot to go to the first location; instructing the robot to pick up the first pallet at the first location; instructing a second robot to go to the second location; instructing the second robot to pick up the second pallet at the second location; instructing the robot to take the first pallet to the second location; instructing the second robot to take the second pallet to the first location while the first robot is taking the first pallet to the second location; instructing the robot to place the first pallet at the second location; and instructing the second robot to place the second pallet at the first location, such as discussed above at least in the context of FIGS. 17-21.

In some embodiments, method 2500 can further include: after determining that the first estimated arrival time has changed to be after the second estimated arrival time, the computing device: releasing the reservation of the first time slot at the loading dock; and reserving a second time slot at the loading dock for the second vehicle, where the second time slot includes the second estimated arrival time, such as discussed above at least in the context of FIGS. 12, 14, and 18-21. In particular embodiments, the first estimated arrival time has changed to a third estimated arrival time; then, method 2500 can further include: determining whether the third estimated arrival time is during the second time slot; and after determining that the third estimated arrival time is during the second time slot, reserving a third time slot at the loading dock for the first vehicle, where the third time slot is immediately after the second time slot, such as discussed above at least in the context of FIGS. 12, 14, and 18-21.

In other embodiments, method 2500 can further include: after determining that the first estimated arrival time has changed to be after the second estimated arrival time: revoking warehouse access to the first vehicle at the first estimated arrival time; determining that the first estimated arrival time has changed to be a third estimated arrival time; and granting warehouse access to the first vehicle at the third estimated arrival time, such as discussed above at least in the context of FIGS. 8, 9, and 18-20.

In still other embodiments, method 2500 can further include: after the first vehicle arrives at the warehouse: directing an inspecting robot to inspect goods carried by the first vehicle to determine whether the goods carried by the first vehicle are in conformity with a contract for the goods; and after determining that the goods carried by the first vehicle are in conformity with the contract, moving the goods carried by the first vehicle into the warehouse; and sending a receipt for the goods carried by the first vehicle, such as discussed above at least in the context of FIGS. 10 and 11. In particular embodiments, method 2500 can further include: after determining that the goods carried by the first vehicle are not in conformity with the contract, rejecting delivery of the goods carried by the first vehicle, such as discussed above at least in the context of FIG. 10.

In still other embodiments, method 2500 can further include: receiving a first order to deliver a pallet of goods from the warehouse for the first vehicle via the loading dock; and after receiving the first order to deliver the pallet of goods, instructing the robot to move the pallet of goods to the pallet arrangement at the loading dock, such as discussed above at least in the context of FIGS. 12-16. In particular embodiments, method 2500 can further include: after receiving the first order to deliver the pallet of goods, receiving a second order to deliver the pallet of goods from the warehouse at a second time of delivery via a second loading dock of the warehouse; determining whether the second order has a higher priority that the first order; and after determining that the second order has a higher priority that the first order, instructing the robot to move the pallet of goods to the second loading dock by the second time of delivery.

In even other embodiments, method 2500 can further include determining a first estimated departure time from the warehouse for the first vehicle; determine a pallet of deliverable goods to be delivered via the first vehicle; and directing a robot to take the pallet of deliverable goods to the pallet arrangement before the first estimated departure time.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
determining a first estimated arrival time for a first vehicle at a loading dock of a warehouse;
determining a second estimated arrival time for a second vehicle at the loading dock of the warehouse, wherein the first estimated arrival time is before the second estimated arrival time;
determining a pallet arrangement at the loading dock of the warehouse, wherein the pallet arrangement comprises a first pallet associated with the first vehicle and a second pallet associated with the second vehicle, wherein the pallet arrangement comprises at least a first queue entry and a second queue entry, wherein a location of the first queue entry is closer to the loading dock than a location of the second queue entry, and wherein the first queue entry holds the first pallet and the second queue entry holds the second pallet;
after determining the pallet arrangement, determining that the first estimated arrival time has changed to be after the second estimated arrival time; and
in response to determining that the first estimated arrival time has changed to be after the second estimated arrival time, determining, based on a number of robots available to swap pallets, an amount of time to swap pallets between the first queue entry and the second queue entry;
determining whether an amount of time until the second estimated arrival time is greater than the amount of time to swap pallets; and
after determining that the amount of time until the second estimated arrival time is greater than the amount of time to swap pallets, instructing, based on the number of robots available to swap pallets, at least one available robot to modify the pallet arrangement so that the second pallet is closer to the loading dock than the first pallet before the second estimated arrival time, wherein the instructing comprises instructing the at least one available robot to:
move the second pallet from the second queue entry to the first queue entry, and
move the first pallet from the first queue entry to the second queue entry.

2. The method of claim 1, wherein determining the first estimated arrival time comprises:
reserving a first time slot at the loading dock for the first vehicle, wherein the first time slot includes the first estimated arrival time.

3. The method of claim 2, further comprising:
after determining that the first estimated arrival time has changed to be after the second estimated arrival time:
releasing the reservation of the first time slot at the loading dock; and
reserving a second time slot at the loading dock for the second vehicle, wherein the second time slot includes the second estimated arrival time.

4. The method of claim 3, wherein the first estimated arrival time has changed to a third estimated arrival time, and wherein the method further comprises:
determining whether the third estimated arrival time is during the second time slot; and
after determining that the third estimated arrival time is during the second time slot, reserving a third time slot at the loading dock for the first vehicle, wherein the third time slot is immediately after the second time slot.

5. The method of claim 1, wherein the warehouse comprises a first parking location, and wherein determining the first estimated arrival time for the first vehicle at the loading dock comprises:
granting warehouse access to the first vehicle at the first estimated arrival time;
determining whether the first vehicle has access to the loading dock at the first estimated arrival time; and
after determining that first vehicle does not have access to the loading dock at the first estimated arrival time, reserving the first parking location for the first vehicle starting at the first estimated arrival time.

6. The method of claim 5, wherein the method further comprises:
after determining that the first estimated arrival time has changed to be after the second estimated arrival time:
revoking warehouse access to the first vehicle at the first estimated arrival time;
determining that the first estimated arrival time has changed to be a third estimated arrival time; and
granting warehouse access to the first vehicle at the third estimated arrival time.

7. The method of claim 1, further comprising:
after the first vehicle arrives at the warehouse:
directing an inspecting robot to inspect goods carried by the first vehicle to determine whether the goods carried by the first vehicle are in conformity with a contract for the goods; and
after determining that the goods carried by the first vehicle are in conformity with the contract:
moving the goods carried by the first vehicle into the warehouse; and
sending a receipt for the goods carried by the first vehicle.

8. The method of claim 7, further comprising:
after determining that the goods carried by the first vehicle are not in conformity with the contract, rejecting delivery of the goods carried by the first vehicle.

9. The method of claim 1, further comprising:
after moving the first pallet from the first queue entry to the second queue entry:
associating the first queue entry with the second vehicle; and
associating the second queue entry with the first vehicle.

10. The method of claim 1, further comprising:
after moving the first pallet from the first queue entry to the second queue entry:

determining that the second vehicle has arrived at the warehouse; and instructing the at least one available robot to load the second vehicle with at least the second pallet in the first queue entry.

11. The method of claim 10, wherein the pallet arrangement has a number of queue entries QE that is greater than or equal to two, and wherein the method further comprises:

after instructing the at least one available robot to load the second vehicle with at least the second pallet in the first queue entry:

instructing the at least one available robot to move pallets from the second queue entry to the first queue entry;

associating the first queue entry with the first vehicle;

determining a new vehicle that is a next vehicle to arrive at the warehouse after each vehicle associated with a queue entry;

associating the QEth queue entry with the new vehicle; and instructing the at least one available robot to move pallets associated with the new vehicle to the QEth queue entry.

12. The method of claim 1, further comprising:

receiving a first order to deliver a pallet of goods from the warehouse for the first vehicle via the loading dock; and after receiving the first order to deliver the pallet of goods, instructing the at least one available robot to move the pallet of goods to the pallet arrangement at the loading dock.

13. The method of claim 12, further comprising:

after receiving the first order to deliver the pallet of goods, receiving a second order to deliver the pallet of goods from the warehouse at a second time of delivery via a second loading dock of the warehouse;

determining whether the second order has a higher priority that the first order; and after determining that the second order has a higher priority that the first order, instructing the at least one available robot to move the pallet of goods to the second loading dock by the second time of delivery.

14. The method of claim 1, further comprising:

determining a first estimated departure time from the warehouse for the first vehicle;

determining a pallet of deliverable goods to be delivered via the first vehicle; and directing the at least one available robot to take the pallet of deliverable goods to the pallet arrangement before the first estimated departure time.

15. The method of claim 1, wherein instructing the at least one available robot to modify the pallet arrangement comprises:

instructing a first available robot to go to the first location;

instructing the first available robot to pick up the first pallet at the first location;

instructing a second available robot to go to the second location;

instructing the second available robot to pick up the second pallet at the second location;

instructing the first available robot to take the first pallet to the second location;

instructing the second available robot to take the second pallet to the first location while the first robot is taking the first pallet to the second location;

instructing the first available robot to place the first pallet at the second location; and instructing the second available robot to place the second pallet at the first location.

16. A computing device, comprising:

one or more processors; and data storage including at least computer-executable instructions stored thereon that, when executed by the one or more processors, cause the computing device to:

determine a first estimated arrival time for a first vehicle at a loading dock of a warehouse;

determine a second estimated arrival time for a second vehicle at the loading dock of the warehouse, wherein the first estimated arrival time is before the second estimated arrival time;

determine a pallet arrangement at the loading dock of the warehouse, wherein the pallet arrangement comprises a first pallet associated with the first vehicle and a second pallet associated with the second vehicle, wherein the pallet arrangement comprises at least a first queue entry and a second queue entry, wherein a location of the first queue entry is closer to the loading dock than a location of the second queue entry, and wherein the first queue entry holds the first pallet and the second queue entry holds the second pallet;

after determining the pallet arrangement, determine that the first estimated arrival time has changed to be after the second estimated arrival time; and in response to determining that the first estimated arrival time has changed to be after the second estimated arrival time, determine, based on a number of robots available to swap pallets, an amount of time to swap pallets between the first queue entry and the second queue entry;

determine whether an amount of time until the second estimated arrival time is greater than the amount of time to swap pallets; and after determining that the amount of time until the second estimated arrival time is greater than the amount of time to swap pallets, instruct, based on the number of robots available to swap pallets, at least one available robot to modify the pallet arrangement so that the second pallet is closer to the loading dock than the first pallet before the second estimated arrival time, wherein the instructing comprises instructing the at least one available robot to:

move the second pallet from the second queue entry to the first queue entry, and move the first pallet from the first queue entry to the second queue entry.

17. A non-transitory computer readable medium having stored thereon instructions, that when executed by one or more processors of a computing device, cause the computing device to perform functions comprising:

determining a first estimated arrival time for a first vehicle at a loading dock of a warehouse;

determining a second estimated arrival time for a second vehicle at the loading dock of the warehouse, wherein the first estimated arrival time is before the second estimated arrival time;

determining a pallet arrangement at the loading dock of the warehouse, wherein the pallet arrangement comprises a first pallet associated with the first vehicle and a second pallet associated with the second vehicle, wherein the pallet arrangement comprises at least a first queue entry and a second queue entry, wherein a location of the first queue entry is closer to the loading dock than a location of the second queue entry, and wherein the first queue entry holds the first pallet and the second queue entry holds the second pallet;

after determining the pallet arrangement, determining that the first estimated arrival time has changed to be after the second estimated arrival time; and after determining that the first estimated arrival time has changed to be after the second estimated arrival time, determining, based on a number of robots available to swap pallets, an amount of time to swap pallets between the first queue entry and the second queue entry;

determining whether an amount of time until the second estimated arrival time is greater than the amount of time to swap pallets; and after determining that the amount of time until the second estimated arrival time is greater than the amount of time to swap pallets, instructing, based on the number of robots available to swap pallets, at least one available robot to modify the pallet arrangement so that the second pallet is closer to the loading dock than the first pallet before the second estimated arrival time, wherein the instructing comprises instructing the at least one available robot to:

move the second pallet from the second queue entry to the first queue entry, and move the first pallet from the first queue entry to the second queue entry.

* * * * *